US012660031B2

(12) United States Patent　　(10) Patent No.:　US 12,660,031 B2
Li et al.　　　　　　　　　　　　(45) Date of Patent:　　Jun. 16, 2026

(54) PATH SELECTION OR PATH SWITCHING AND CHARGING FOR PROXIMITY SERVICE COMMUNICATION

(71) Applicant: InterDigital Patent Holdings, Inc., Wilmington, DE (US)

(72) Inventors: Hongkun Li, Malvern, PA (US); Michael F. Starsinic, Newtown, PA (US); Quang Ly, North Wales, PA (US); Catalina Mihaela Mladin, Hatboro, PA (US); Jiwan L. Ninglekhu, Royersford, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 557 days.

(21) Appl. No.: 17/640,066

(22) PCT Filed: Aug. 3, 2020

(86) PCT No.: PCT/US2020/044744
§ 371 (c)(1),
(2) Date: Mar. 3, 2022

(87) PCT Pub. No.: WO2021/045859
PCT Pub. Date: Mar. 11, 2021

(65) Prior Publication Data
US 2022/0322202 A1　　Oct. 6, 2022

Related U.S. Application Data

(60) Provisional application No. 63/006,741, filed on Apr. 8, 2020, provisional application No. 62/947,606, filed
(Continued)

(51) Int. Cl.
　*H04W 40/12*　　(2009.01)
　*H04L 12/14*　　(2024.01)
　　　　(Continued)

(52) U.S. Cl.
　CPC ............ *H04W 76/23* (2018.02); *H04L 12/14* (2013.01); *H04L 12/1407* (2013.01);
　　　　(Continued)

(58) Field of Classification Search
　CPC ....... H04W 40/12; H04W 4/40; H04W 40/20; H04W 4/24; H04W 4/46; H04W 36/033;
　　　　(Continued)

(56) References Cited

U.S. PATENT DOCUMENTS

2016/0088468 A1*　3/2016　Sharma ................. H04M 15/93
　　　　　　　　　　　　　　　　　　　370/329
2018/0376308 A1　12/2018　Xiao et al.
　　　　(Continued)

FOREIGN PATENT DOCUMENTS

CN　　108029148 A　　5/2018
CN　　108886510 A　　11/2018
　　　　(Continued)

OTHER PUBLICATIONS

3GPP TS 23287-200, Architecture enhancements for 5G System (5GS) to support Vehicle-to-Everything (V2X) services (Release 16) Aug. 2019 (Year: 2019).*
(Continued)

*Primary Examiner* — Omer S Mian
(74) *Attorney, Agent, or Firm* — Flaster Greenberg P.C.

(57)　　　　　ABSTRACT
A 5G network may support path switch mechanisms from a direct path to an indirect path to the network, and vice versa.
(Continued)

Methods and systems are disclosed for performing the path switching process.

19 Claims, 42 Drawing Sheets

Related U.S. Application Data on Dec. 13, 2019, provisional application No. 62/896,669, filed on Sep. 6, 2019.

(51) Int. Cl.
| | |
|---|---|
| *H04L 69/14* | (2022.01) |
| *H04M 15/00* | (2024.01) |
| *H04W 4/24* | (2024.01) |
| *H04W 4/40* | (2018.01) |
| *H04W 4/46* | (2018.01) |
| *H04W 36/00* | (2009.01) |
| *H04W 40/20* | (2009.01) |
| *H04W 76/23* | (2018.01) |

(52) U.S. Cl.
CPC ............ *H04L 69/14* (2013.01); *H04M 15/66* (2013.01); *H04W 4/24* (2013.01); *H04W 4/40* (2018.02); *H04W 4/46* (2018.02); *H04W 36/033* (2023.05); *H04W 40/12* (2013.01); *H04W 40/20* (2013.01)

(58) Field of Classification Search
CPC ........ H04W 76/23; H04W 4/70; H04L 12/14; H04L 12/1403; H04L 12/1407; H04L 69/14; H04M 15/66; H04M 15/8016; H04M 15/8033; H04M 15/8044; H04M 15/8055; H04M 15/81; H04M 15/93
See application file for complete search history.

(56) References Cited

U.S. PATENT DOCUMENTS

| | | | | |
|---|---|---|---|---|
| 2019/0174449 | A1 | 6/2019 | Shan et al. | |
| 2020/0128575 | A1* | 4/2020 | Shrader ............. | H04W 72/1268 |
| 2020/0178048 | A1 | 6/2020 | Kim et al. | |
| 2022/0279607 | A1* | 9/2022 | Burbidge .............. | H04W 76/10 |
| 2022/0304085 | A1* | 9/2022 | Lee ........................ | H04W 76/23 |
| 2023/0198787 | A1* | 6/2023 | Qiao ..................... | H04W 76/10 |
| | | | | 370/329 |

FOREIGN PATENT DOCUMENTS

| | | | |
|---|---|---|---|
| EP | 3410663 | A1 | 12/2018 |
| WO | 2018066876 | A1 | 4/2018 |
| WO | 2019/161269 | A1 | 8/2019 |

OTHER PUBLICATIONS

3GPP, "3rd Generation Partnership Project; Technical Specification Group Services and System Aspects; Architecture enhancements for 5G System (SGS) to support Vehicle-to-Everything (V2X) services (Release 16)", 3GPP TS 23.287 V2.0.0, Aug. 2019, pp. 1-50.

3rd Generation Partnership Project; "Technical Specification Group Core Network and Terminals; User Equipment (UE) to V2X control function; protocol aspects; Stage 3 (Release 15)", 3GPP TS 24.386 V15.2.0, Dec. 2018, 35 pages.

3GPP TR 23.786 V16.1.0, "Study on architecture enhancements for the Evolved Packet System (EPS) and The 5G System (5GS)to support advanced V2X services", 3GPP TR 23.786 Technical Specification Group Services and System Aspects (Release 16), Jun. 2019, 119 pages.

"Policy and charging control framework for the 5G System (5GS); Stage 2 (Release 19)", 3GPP TS 23.503 V19.4.0 3rd Generation Partnership Project; Technical Specification Group Services and System Aspects;, Jun. 2025, 193 Pages.

S2-173096, "solution on URSP enhancement to support UE-to-NW relay solution", Samsung : S2-173096 SA WG2 Meeting #121 6.5.10 Hangzhou, China TS 23.501: N3IWF selection function, May 15-19, 2017, 5 pages.

S2-1900425, "UE triggered UE policy provisioning procedure", Intel, Qualcomm Incorporated S2-1900425 3GPP TSG-SA WG2 Meeting #130, Jan. 21-25, 2019, 3 pages.

S2-1901919, "Procedure for PCF based Service Authorization and Provisioning to UE", Samsung, Convida Wireless, S2-1901919 SA WG2 Meeting #131 eV2XARC / Rel-16 Tenerife, Spain, Feb. 25-Mar. 1, 2019, 2 pages.

"Solution to support end-to-end security for Layer-3 UE-to-Network Relay", Qualcomm Incorporated S2-2004282 SA WG2 Meeting #139E Elbonia, Jun. 1-12, 2020, 5 pages.

"URSP enhancements to support UE-to-Network Relay solutions", Qualcomm Incorporated S2-2004291r01 SA WG2 Meeting #139E Elbonia,, Jun. 1-12, 2020, 3 pages.

S2-2004727, "Solution to support end-to-end security for Layer-3 UE-to-Network Relay", Qualcomm Incorporated, AT&T, Ericsson, Samsung, Nokia S2-2004727 SA WG2 Meeting #139E 5G_ProSe/ Rel. 17 Elbonia, Jun. 1-12, 2020, 5 pages.

* cited by examiner a. 5GC Path b. ProSe Communication Path

Existing Path: (a) 5GC Path (b) ProSe Communication Path for UE-to-UE
Connection for NCIS

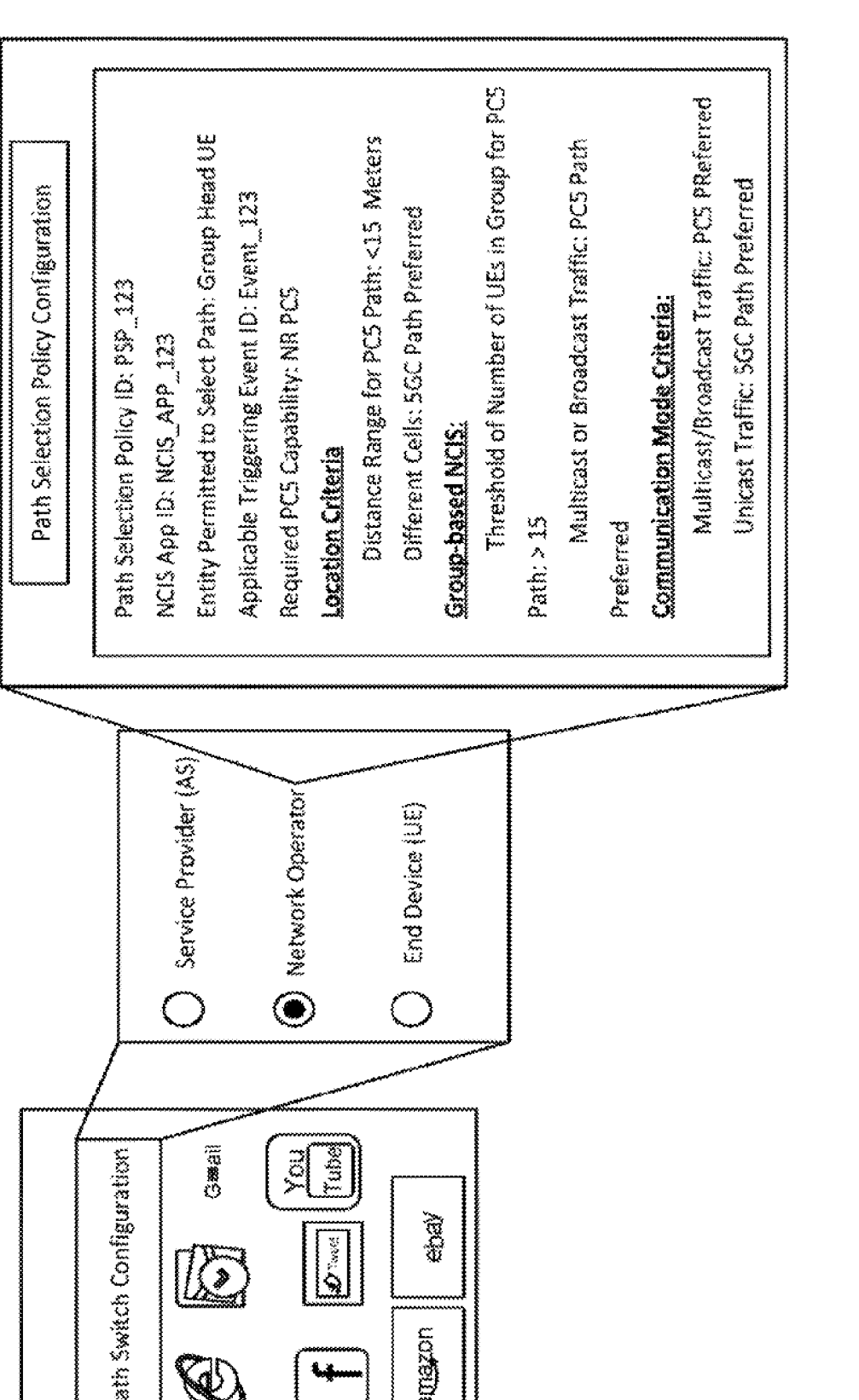

Path Selection Policy Configuration

Path Selection Policy ID: PSP_123

NCIS App ID: NCIS_APP_123

Entity Permitted to Select Path: Group Head UE

Applicable Triggering Event ID: Event_123

Required PC5 Capability: NR PC5

Location Criteria

Distance Range for PC5 Path: <15  Meters

Different Cells: 5GC Path Preferred

Group-based NCIS:

Threshold of Number of UEs in Group for PC5

Path: > 15

Multicast or Broadcast Traffic: PC5 Path

Preferred

Communication Mode Criteria:

Multicast/Broadcast Traffic: PC5 PReferred

Unicast Traffic: 5GC Path Preferred

○ Service Provider (AS)

◉ Network Operator

○ End Device (UE)

Path Switch Configuration

FIG. 33

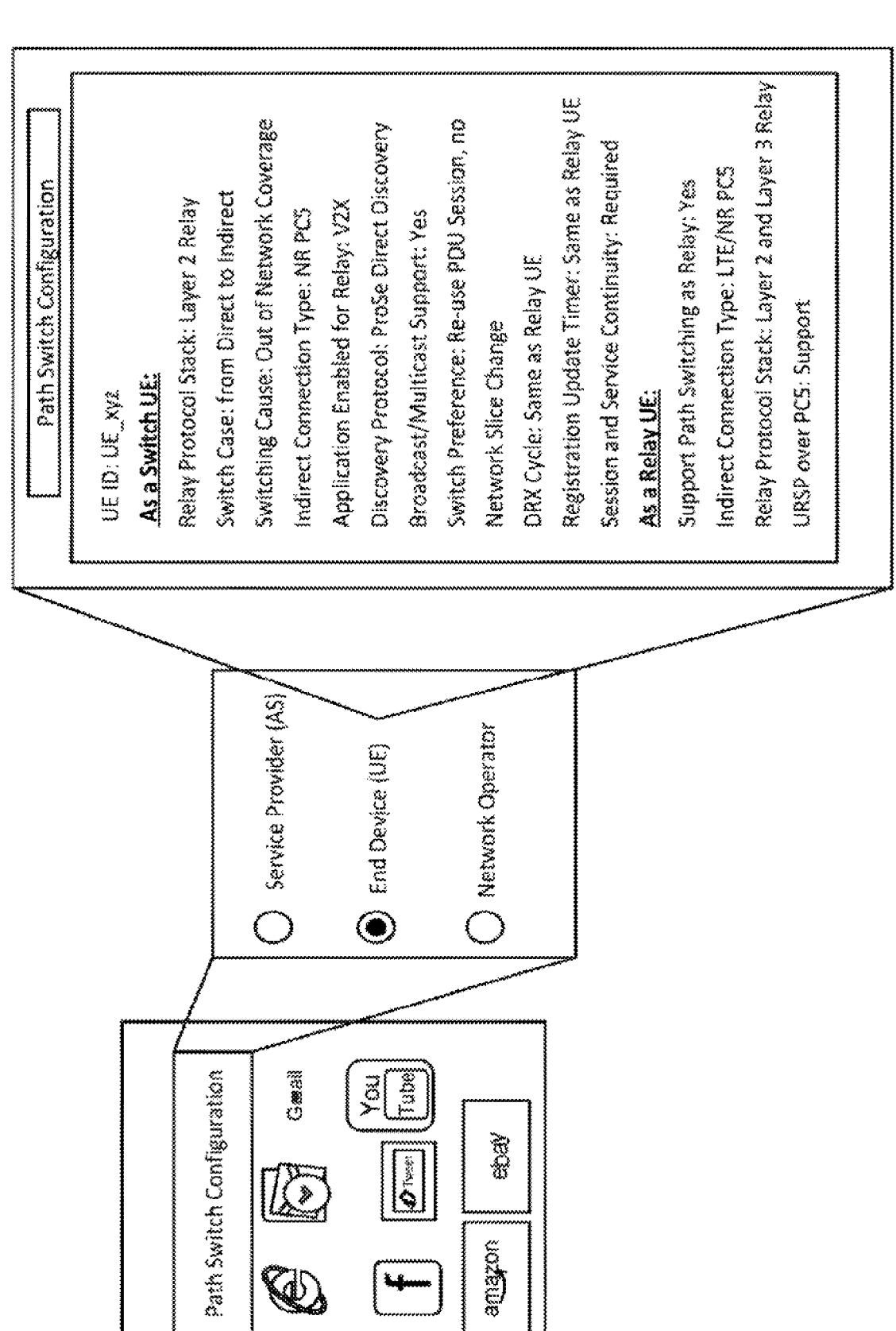

Path Switch Configuration

UE ID: UE_xyz

As a Switch UE:

Relay Protocol Stack: Layer 2 Relay

Switch Case: from Direct to Indirect

Switching Cause: Out of Network Coverage

Indirect Connection Type: NR PC5

Application Enabled for Relay: V2X

Discovery Protocol: ProSe Direct Discovery

Broadcast/Multicast Support: Yes

Switch Preference: Re-use PDU Session, no

Network Slice Change

DRX Cycle: Same as Relay UE

Registration Update Timer: Same as Relay UE

Session and Service Continuity: Required

As a Relay UE:

Support Path Switching as Relay: Yes

Indirect Connection Type: LTE/NR PC5

Relay Protocol Stack: Layer 2 and Layer 3 Relay

URSP over PC5: Support

Service Provider (AS)

End Device (UE)

Network Operator

Path Switch Configuration

Gmail

You Tube ebay amazon

FIG. 34

PATH SELECTION OR PATH SWITCHING AND CHARGING FOR PROXIMITY SERVICE COMMUNICATION

CROSS-REFERENCE TO RELATED APPLICATIONS

This application is the National Stage Application of International Patent Application No. PCT/US2020/044744, filed Aug. 3, 2020 which claims the benefit of U.S. Provisional Patent Application No. 62/896,669, filed on Sep. 6, 2019, entitled "Path Switch in 5G Network," U.S. Provisional Patent Application No. 62/947,606, filed on Dec. 13, 2019, entitled "Path Switching and Charging for D2D Communications," U.S. Provisional Patent Application No. 63/006,741, filed on Apr. 8, 2020, entitled "Path Switching and Charging for D2D Communications," and the contents of which are hereby incorporated by reference herein.

BACKGROUND

For 5GS, the proximity services are expected to be an important system wide enabler to support various applications and services. In Release 16 the PC5 based architecture and communications were developed to support advanced V2X services. However, there were more proximity related service requirements than service requirements covered by the existing Rel-16 SA2 work, e.g. eV2XARC. For example, the direct mode, D2D, communication mechanisms, including UE-to-Network Relay are lacking in 5GS, creating a significant gap to enable Mission Critical services over 5GS. There are other upcoming applications that rely on the proximity services.

As such, the 5G System needs to be enhanced to support the proximity-based services with one common architecture to take advantage of economy of scale, e.g. such an architecture can be used for both public safety and commercial related proximity services, where applicable. A new Release 17 study SP-190443, Study on System enhancement for Proximity based Services in 5GS, was formed in SA2 to identify and evaluate potential enhancements to the 5G System architecture to support proximity-based services. Among the potential objectives of the study, support of network-controlled path selection and path switching between Uu interface and PC5 interface were identified. The path switching of user traffic shall minimize user experience interruption.

This background information is provided to reveal information believed by the applicant to be of possible relevance. No admission is necessarily intended, nor should be construed, that any of the preceding information constitutes prior art.

SUMMARY

Disclosed herein are methods, systems, and devices for 5G systems such as path switching and network controlled interactive service. In summary, following examples are disclosed that may help achieve the path switch process or address the path selection and switching issue for network controlled interactive service (NCIS).

The following example ideas are disclosed: mechanism of path switch from a direct path to an indirect path; mechanism of path switch from an indirect path to a direct path; enhancement for the path switch process in the context of multi-hop relay; network triggered path switch procedure; procedure for a UE to join an NCIS Group; architecture and procedures for collecting offline charging information for PC5 activity; architecture and procedures for collecting online charging information for PC5 activity; architecture and procedures for performing lawful intercept for PC5 activity; protocols that can be used to report charging, analytic information, or intercepted information to the network; path selection policy is disclosed to enable UEs in a NCIS group or network to select between a 5GC path and a PC5 path to deliver the NCIS application data traffic to other UE(s); procedures for performing the path switching from a 5GC path to a PC5 path for unicast traffic between 2 UEs, including possible triggers, or events that trigger the path switch; or procedures for performing the path switching from a PC5 path to a 5GC path for unicast traffic between 2 UEs, including possible triggers, or events that trigger the path switch, among other things.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 33 illustrates an example user interface that may be generated based on the methods, systems, and devices herein;

FIG. 34 illustrates an example user interface for path selection policy configuration for an NCIS application that may be generated based on the methods, systems, and devices herein;

DETAILED DESCRIPTION

Figure 1:
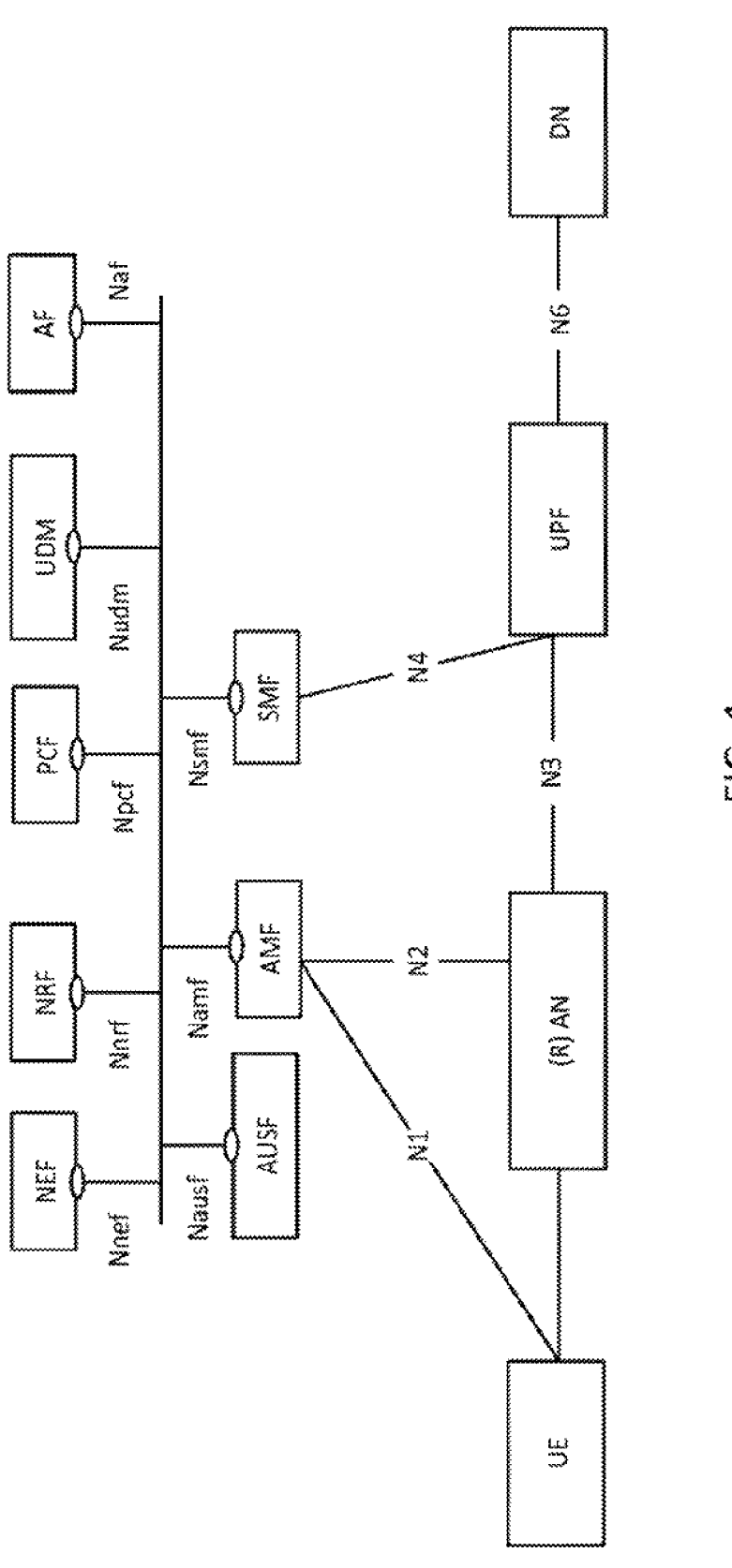
FIG. 1 illustrates an example 5G System architecture in the non-roaming reference architecture with service-based interfaces within the Control Plane.
Figure 2:
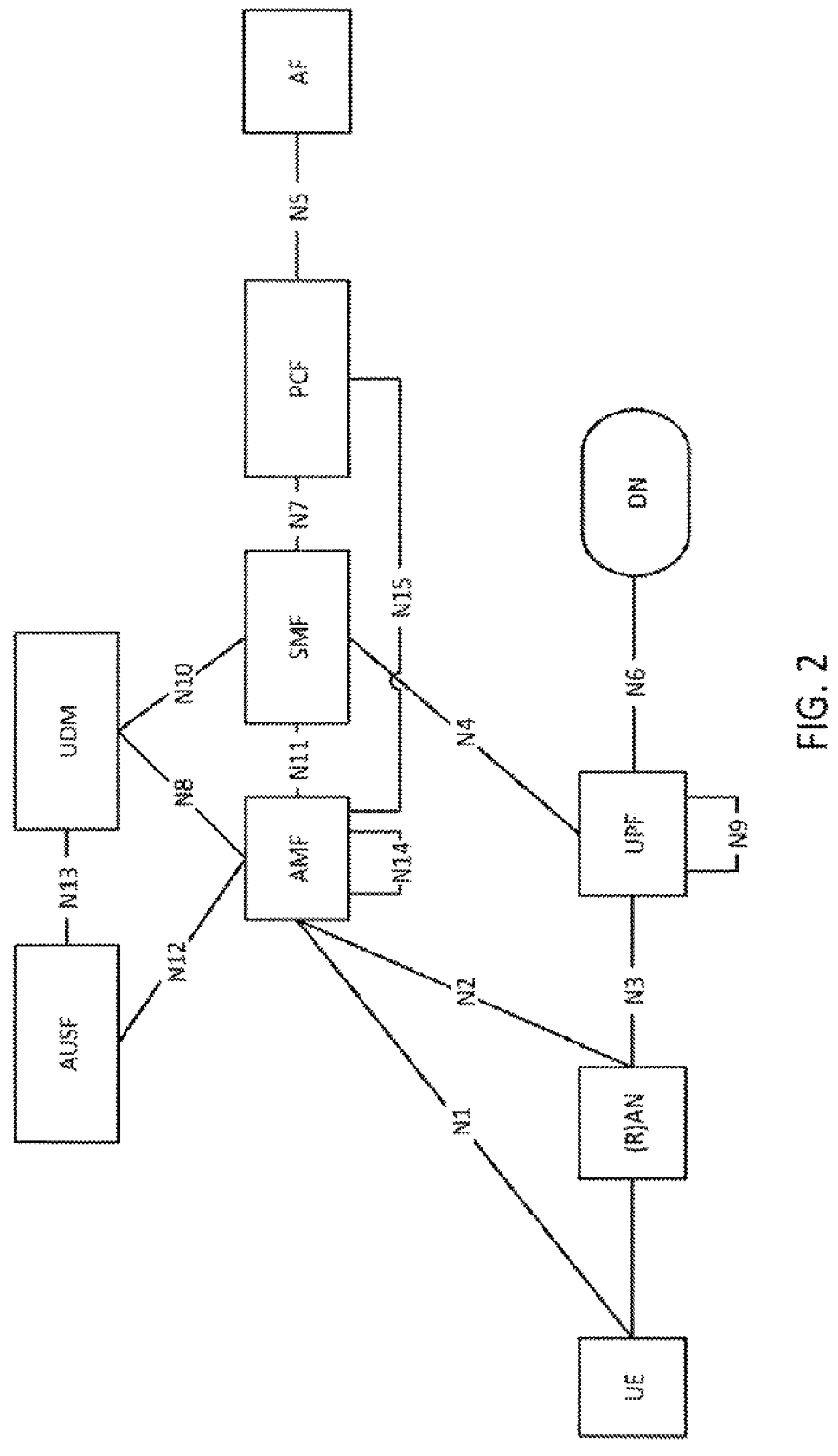
FIG. 2 illustrates an example 5G System architecture in the non-roaming case.
Figure 3:
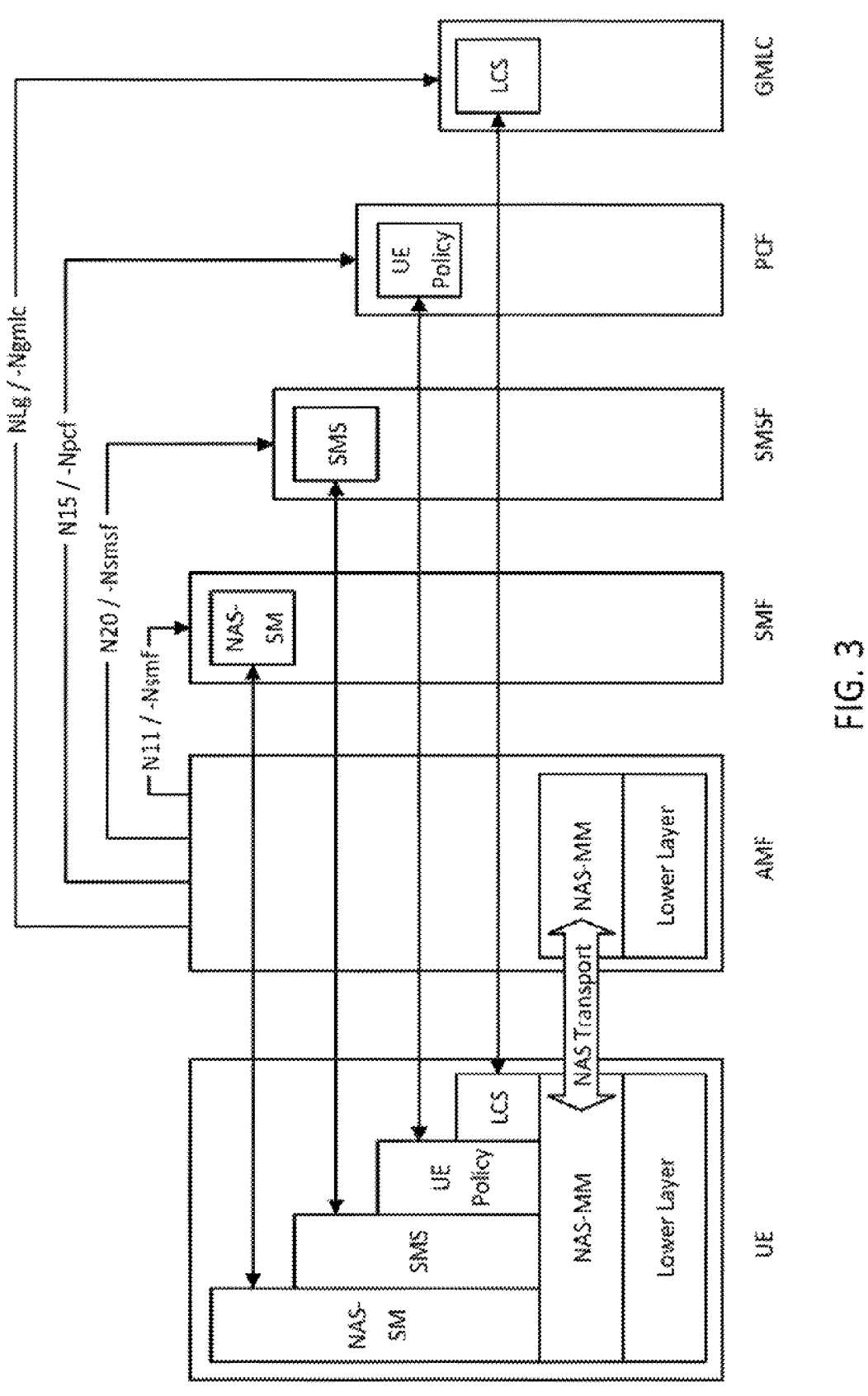
FIG. 3 illustrates an example NAS transport system for SM, SMS, UE Policy and LCS.

FIG. 1 illustrates an exemplary 5G system in the non-roaming reference architecture with service-based interfaces within the Control Plane. FIG. 2 illustrates an exemplary 5G System architecture in the non-roaming case, using the reference point representation showing how various network functions interact with each other. The end-to-end communications, between the Application in the UE and the Application in the external network, may use services provided by the 3GPP system or services provided by a Services Capability Server (SCS), which may reside in the DN.

It is worth noting that the mobility management and session management functions are separated. A single N1 NAS connection may be used for both Registration Management and Connection Management (RM/CM) and for SM-related messages and procedures for a UE. The single N1 termination point is located in the AMF. The AMF forwards SM related NAS information to the SMF. AMF may handle the Registration Management and Connection Management of NAS signaling exchanged with the UE, while SMF handles the Session management of NAS signaling exchanged with the UE.

In addition, the architecture defines several types of control signaling that can be transferred on top of NAS-MM protocol, such as UE policy between PCF and UE, Location Service (LCS) between Gateway Mobile Location Centre (GMLC), or UE.

Proximity Services (ProSe) have been developed in EPS from Rel-12 to support both commercial and public safety services. In Rel-14, the Proximity Services (specifically the direct communication) has been enhanced to support V2X services over LTE. ProSe enables the direct communication between 2 UEs, which support various use cases, such as V2x and public safety. Stage 2 ProSe procedures are specified in [1] 3GPP TS 23.303, such as ProSe direct discovery, ProSe direct communication and ProSe UE-to-Network Relay (see 3GPP TS 23.303, Proximity-based services (ProSe), Stage 2, Release 15).

Figure 4:
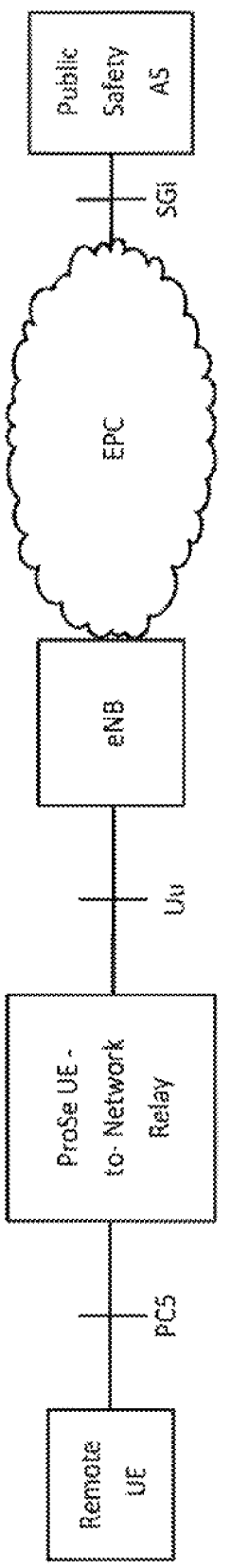
FIG. 4 illustrates an example architecture model using a ProSe UE to Network Relay.

LTE ProSe UE-to-Network Relay entity provides the functionality to support connectivity to the network for Remote UEs. FIG. 4 shows the architecture model using a ProSe UE-to-Network Relay. The ProSe UE-to-Network Relay may relay unicast traffic (DL and UL) to remote UE and broadcast traffic using one-to-many ProSe Direct Communication.

Figure 5:
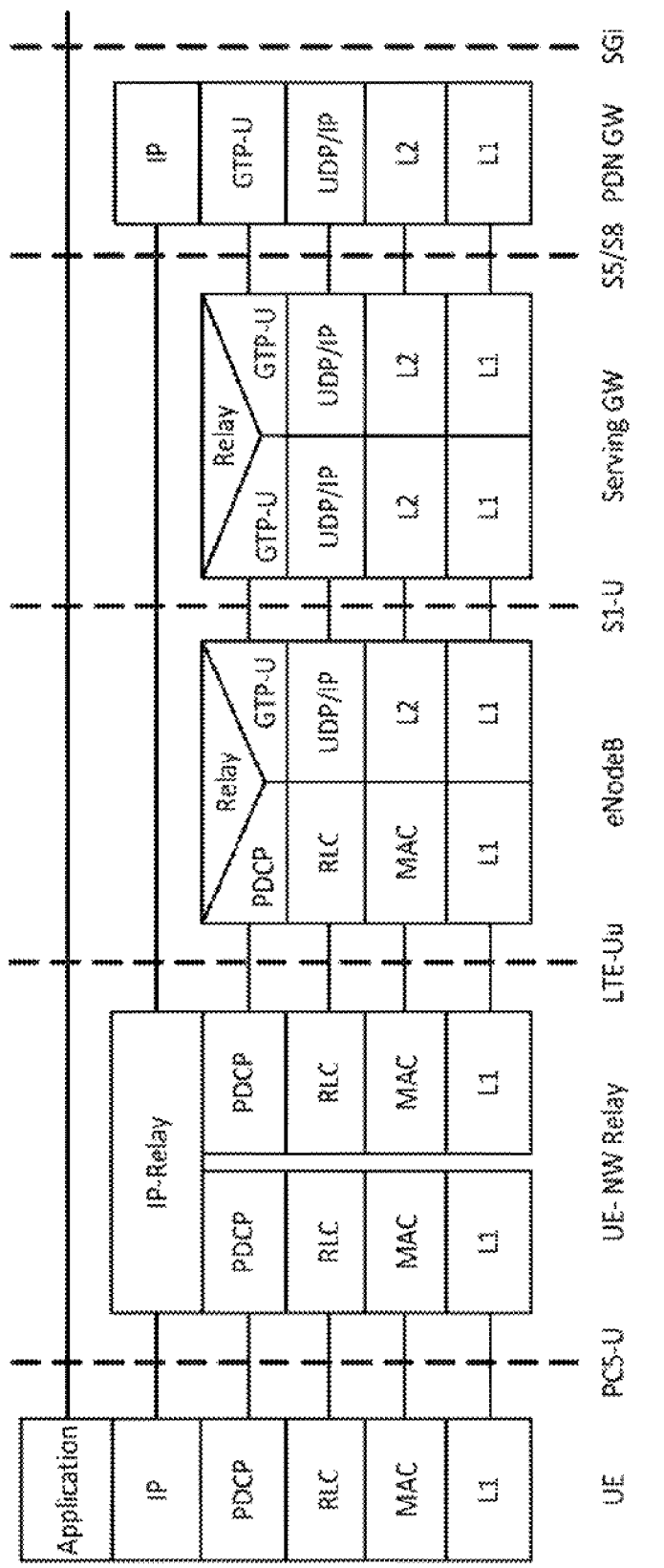
FIG. 5 illustrates an example User Plane Protocol Stack for UE to Network Relay defined in LTE ProSe.

A UE may be considered to be a Remote UE for a certain ProSe UE-to-Network relay if it has successfully established a PC5 link to this ProSe UE-to-Network Relay. A Remote UE nay be located within E-UTRAN coverage or outside of E-UTRAN coverage. If a Remote UE maintains both PC5 and Uu, the EPS core network entities on the Uu side of the Remote UE should not be aware of the ProSe UE-to-Network Relay path via PC5. FIG. 5 shows the user plane protocol stack for UE-to-Network relay that may apply to layer-3 forwarding.

Figure 6:
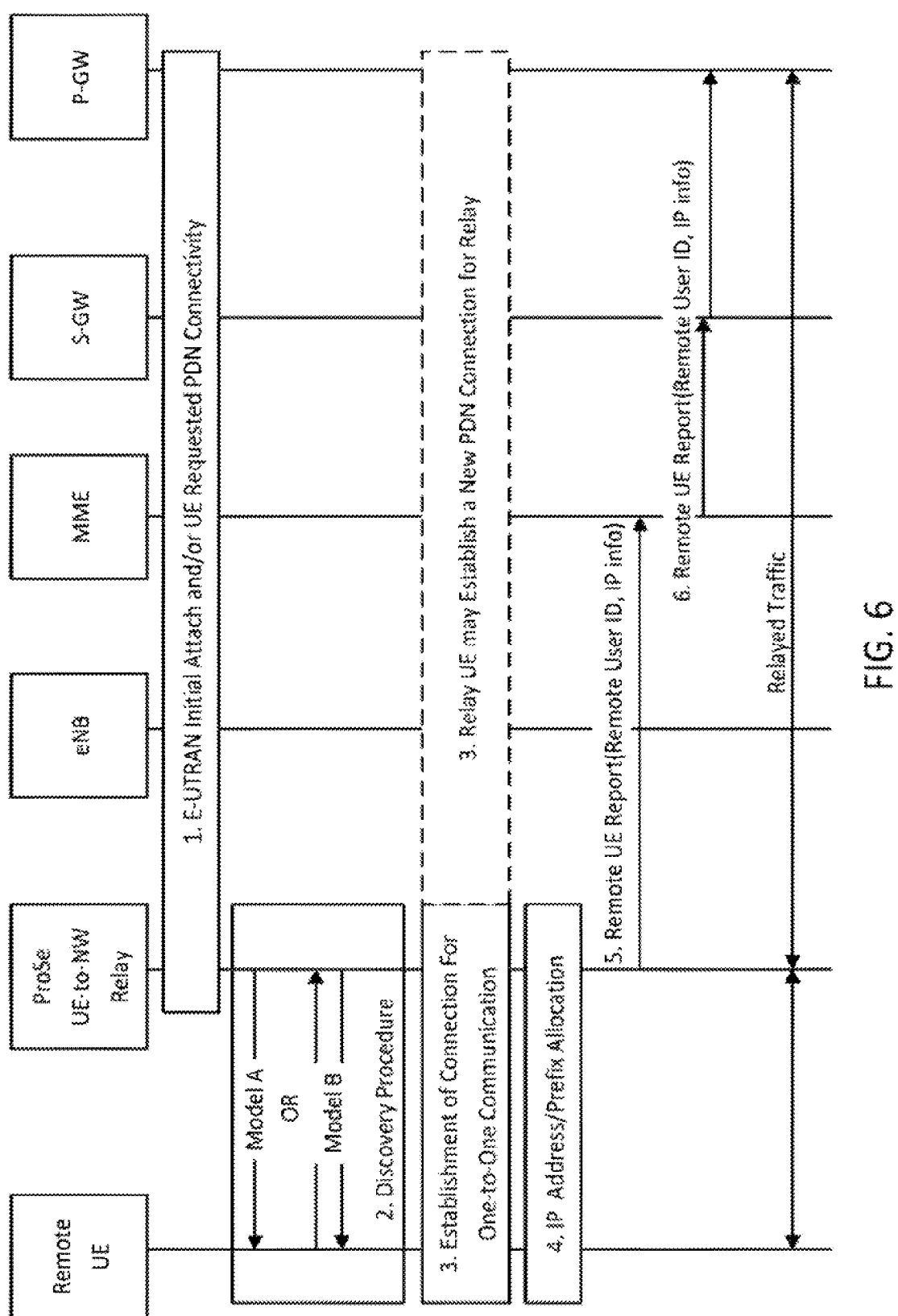
FIG. 6 illustrates an example procedure of direct communication via the UE-to-Network relay for 3GPP LTE ProSe.

FIG. 6 shows an exemplary procedure for direct communication via the relay for 3GPP ProSe. A ProSe UE-to-Network Relay capable UE may attach to the network (if it is not already connected) and connect to a PDN connection enabling the necessary relay traffic, or it may need to connect to additional PDN connection(s) in order to provide relay traffic towards Remote UE(s). PDN connection(s) supporting UE-to-Network Relay should be used for Remote ProSe UE(s) relay traffic.

The following may be performed for direct communication via the relay for 3GPP ProSe. The ProSe UE-to-Network Relay performs initial E-UTRAN Attach (if not already attached) or establishes a PDN connection for relaying (if no appropriate PDN connection for this relaying exists). The Remote UE performs discovery of a ProSe UE-to-Network Relay using Model A or Model B discovery. The Remote UE selects a ProSe UE-to-Network Relay and establishes a connection for One-to-one ProSe Direct Communication. If there is no PDN connection associated with the ProSe Relay UE ID or if an additional PDN connection for relaying is needed, the ProSe UE-to-Network Relay initiates a new PDN connection establishment procedure for relaying. Ipv6 prefix or Ipv4 address may be allocated for the remote UE. From this point the uplink and downlink relaying may start.

In addition, with regard to direct communication via the relay for 3GPP ProSe, the ProSe UE-to-Network Relay may send a Remote UE Report (Remote User ID, IP info) message to the MME for the PDN connection associated with the relay. The Remote User ID is an identity of the Remote UE user (provided via User Info) that was successfully connected during connection establishment. The MME may store the Remote User IDs and the related IP info in the ProSe UE-to-Network Relay's EPS bearer context for the PDN connection associated with the relay. The MME may forward the Remote UE Report message to the S-GW and S-GW forwards the message to the P-GW of the UE-to-Network Relay UE. The ProSe UE-to-Network Relay may report multiple Remote UEs in one Remote UE Report message.

Path Switch in R15 Study on Enhancements to ProSe for EPC: There was a R15 study in 3GPP SA2 to enhance the ProSe UE-to-Network Relay for LTE EPC, the results of the study are captured in TR 23.733 (see 3GPP TR 23.733, Study on architecture enhancements to ProSe UE-to-Network Relay, Release 15). The main objective of the study was to investigate and evaluate the necessary enhancements to the EPC to support a generic Layer 2 Evolved ProSe UE-to-Network Relay, including procedures for the network to identify, authenticate, authorize, control, address, and reach an Evolved ProSe Remote UE via an Evolved ProSe UE-to-Network Relay UE.

Conventionally, in the context of service continuity, a Remote UE may change from a direct path (Uu) to an indirect (PC5) path to the network, or vice-versa (including Remote UE and Relay UE under the same eNB or different eNBs). This is possible due to mobility, RAT change to GERAN/UTRAN, or loss of E-UTRAN coverage of Relay UE. The problem is how to guarantee the service continuity for a Remote UE switching between a direct path and an indirect path.

Figure 7:
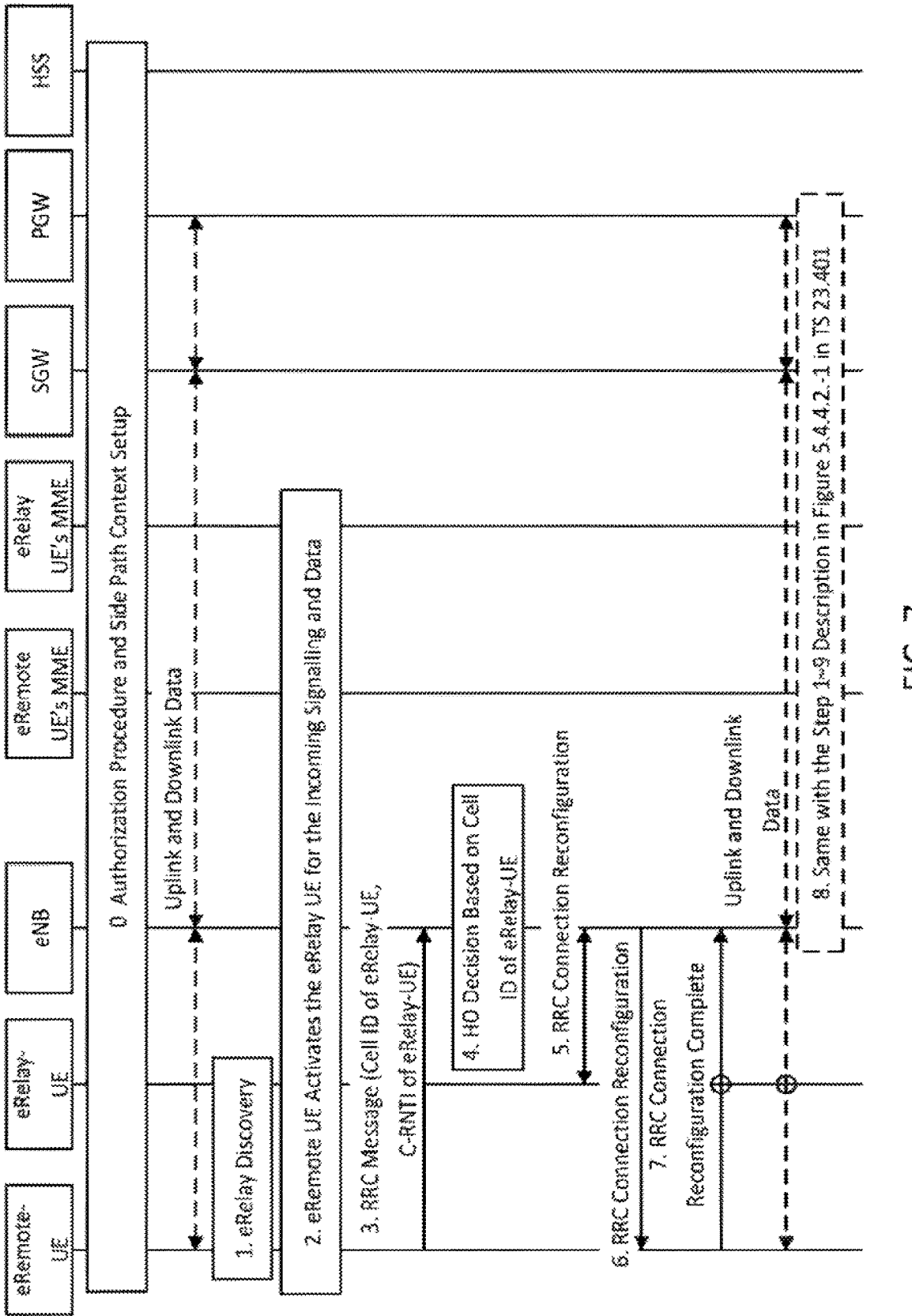
FIG. 7 illustrates an example procedure of path switch from direct to indirect under the same eNB.

To address the service continuity issue, FIG. 7 shows an exemplary Access Stratum (AS) based procedure of path switch from direct to indirect under the same eNB. At step 0, it is assumed that the eRemote-UE, before triggering the HO towards a specific eRelay-UE, have already authorized to access the network via any eRelay-UE. At step 1, the eRemote UE performs eRelay Discovery to search for available eRelay UEs around. At step 2, because of, e.g., eRemote-UE's battery efficiency, radio conditions, etc., the eRemote UE decides to switch the connection from direct 3GPP communication to indirect 3GPP communication. The eRemote UE selects an eRelay-UE and activates the eRelay UE for the incoming signaling and data (according to the selected solution in Key Issue 3). During the PC5 discovery procedure, the eRemote UE obtains the selected eRelay UE's C-RNTI and Cell ID. Note that the eRelay-UE's Cell ID is announced by eRelay-UE during PC5 discovery procedure, the C-RNTI needs to be added as a new parameter in the PC5 discovery message. At step 3, the eRemote-UE sends an RRC message (e.g., Measurement Report) to the eNB to request the path switch from direct to indirect, including eRelay-UE information, for example, the Cell ID of the eRelay-UE (obtained in step 1) and C-RNTI of the eRelay-UE (obtained in step 1). At step 4, based on the received eRelay-UE's Cell ID, the eNB decides to handover the eRemote-UE to an eRelay-UE within the eNB. At step 5, based on the received eRelay-UE's C-RNTI, RRCConnectionReconfiguration is performed between the eNB and the eRelay-UE for the indirect 3GPP communication. At step 6, the eNB sends RRCConnectionReconfiguration message to the eRemote-UE for indirect 3GPP communication. At step 7, the eRemote-UE sends RRCConnectionReconfigurationComplete message via the eRelay-UE to the eNB. At step 8, in case some bearers are not setup successfully during the path switch, the eNB indicates to the MME to release the bearers failed to be setup. It is the same with steps 1-9 for FIG. 5.4.4.2-1 in TS 23.401.

R17 Study on Enhancement of Proximity Based Service in 5GS: For 5GS, the proximity services are expected to be an important system wide enabler to support various applications and services. In Release 16 the PC5 based architecture and communications were developed to support advanced V2X services. However, there were more proximity related service requirements than service requirements covered by the existing Rel-16 SA2 work, e.g. eV2XARC. For example, the direct mode, D2D, communication mechanisms, including UE-to-Network Relay are lacking in 5GS, creating a significant gap to enable Mission Critical services over 5GS. There are other upcoming applications that rely on the proximity services. A new Release 17 study SP-190443, Study on System enhancement for Proximity based Services in 5GS, was formed in SA2 to identify and evaluate potential enhancements to the 5G System architecture to support proximity-based services.

As such, the 5G System should be enhanced to support the proximity-based services with one common architecture to take advantage of economy of scale, e.g. such an architecture can be used for both public safety and commercial related proximity services, where applicable. Another enhancement of the 5G System may be to support network-controlled path selection and path switching between Uu interface and PC5 interface were identified. The path switching of user traffic may minimize user experience interruption.

Figure 8:
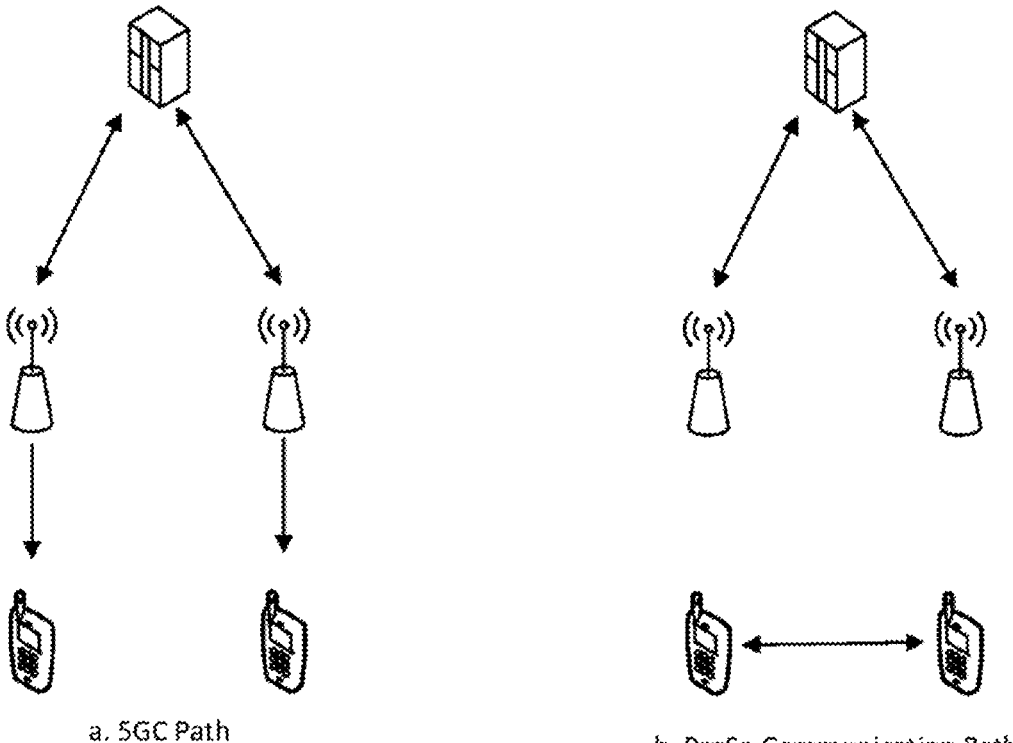
FIG. 8 illustrates existing path options for UE-to-UE connections for NCIS.

An enhancement of the 5G System may be to use a mechanism for the operator to charge for PC5 communication, including, e.g. per group basis, per individual UE basis. Path selection and switching in support of UE-to-Network Relay for ProSe network controlled interactive services (NCIS) may also need to support a path selection and switching mechanism. However, path selection and switching in NCIS are for direct communication between two UEs. As shown in FIG. 8, two UEs may want to exchange data with each other. The following options may be used: (a) a core network path (e.g., 5GC path), and (b) a ProSe communication path (e.g., over PC5 interface). This is different from what path selection and switching supports in UE-to-Network Relay for ProSe. Specifically, NCIS applications can employ path selection to meet stringent requirements for throughput, latency, reliability, or other service requirements. To improve support for proximity services, the appropriate communication path (e.g., 5GC path or PC5 path) between two UEs could be selected by the UE based on some policy which may also be configured by the operator or assisted by the network when available. Based on the path selection result, path switching may be performed to enable two UEs to exchange data via different paths.

Figure 9:
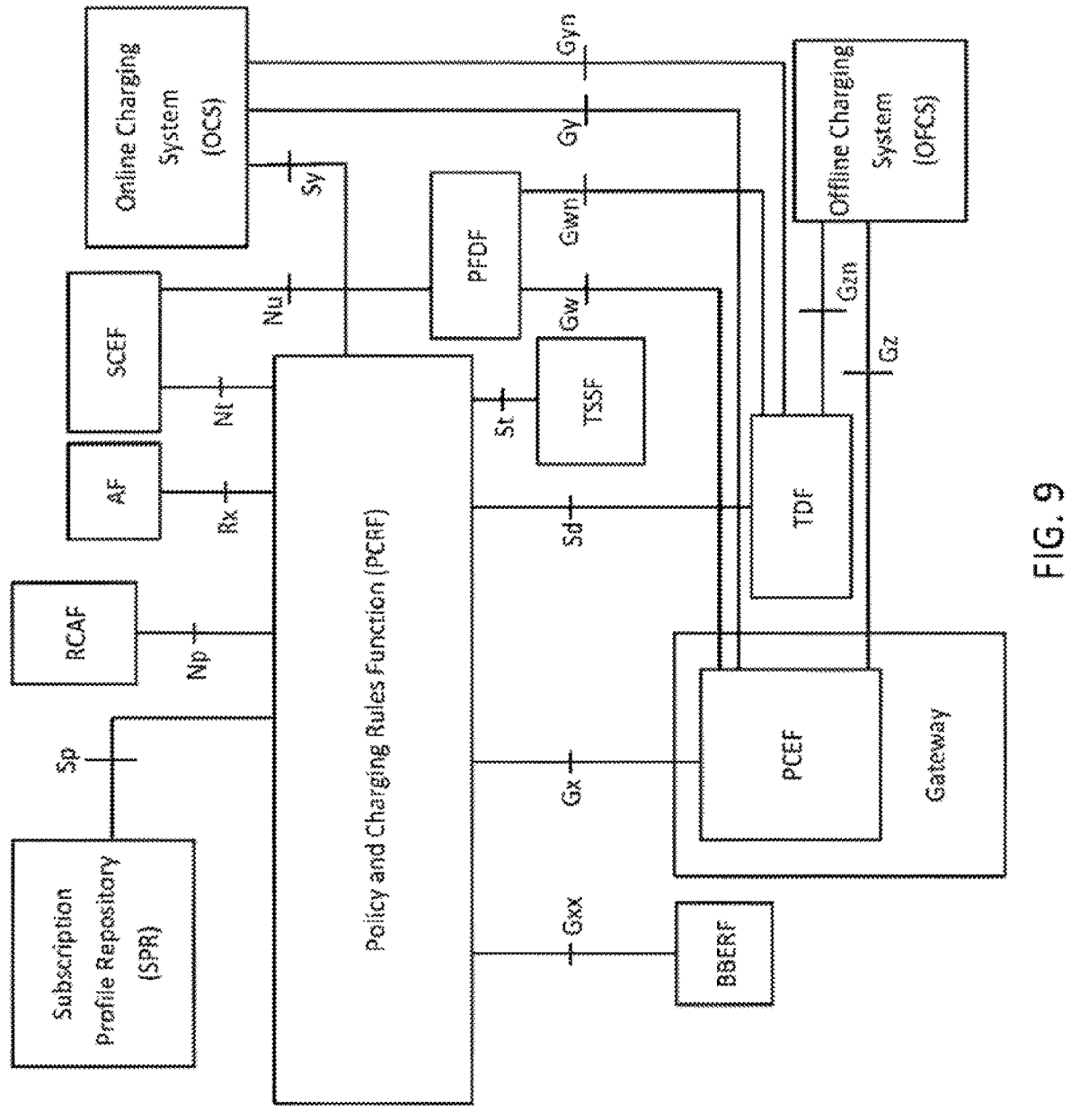
FIG. 9 illustrates an overall PCC logical architecture.

4G 3GPP Charging Principles: FIG. 9 depicts the PCC architecture clause 5.1 of TS 23.203. As shown, the PCC functionality is comprised by the functions of the Policy and Charging Enforcement Function (PCEF), the Bearer Binding and Event Reporting Function (1ERF), the Policy and Charging Rules Function (PCRF), the Application Function (AF), the Traffic Detection Function (TDF), the Online Charging System (OCS), the Offline Charging System (OFCS), and the Subscription Profile Repository (SPR).

The PCRF (clause 6.2.1 of TS 23.203) provides the PCC rules concerning service data flow detection, gating, QoS and flow-based charging to the PCEF. The PCEF (clause 6.2.2 of TS 23.203) is usually located in the P-GW and it is responsible for enforcing the policies that were indicated by the PCRF. Particularly, it uses either gate enforcement approach (allowing service flow to pass only if the corresponding gate is open) or QoS enforcement approach (enforcing a specific QoS class on a particular service flow). Furthermore, the PCEF is responsible for charging control. More specifically, the PCEF allows a service data flow to pass if it has an associated PCC rule and if it has been granted credit for the charging key by the OCS.

In FIG. 9, of note, the Gx reference point resides between the PCEF and the PCRF. It enables the signaling of PCC decision, which governs the PCC behavior. For example, the Gx reference point supports the request for PCC decision from the PCEF to the PCRF and the provision of PCC decision from the PCRF to the PCEF. The Gy (a.k.a. Ro) reference point resides between the OCS and the PCEF and it allows credit control for online charging. The Gz (a.k.a. Rf) reference point resides between the PCEF and the OFCS and it enables transport of offline charging information.

Figure 10:
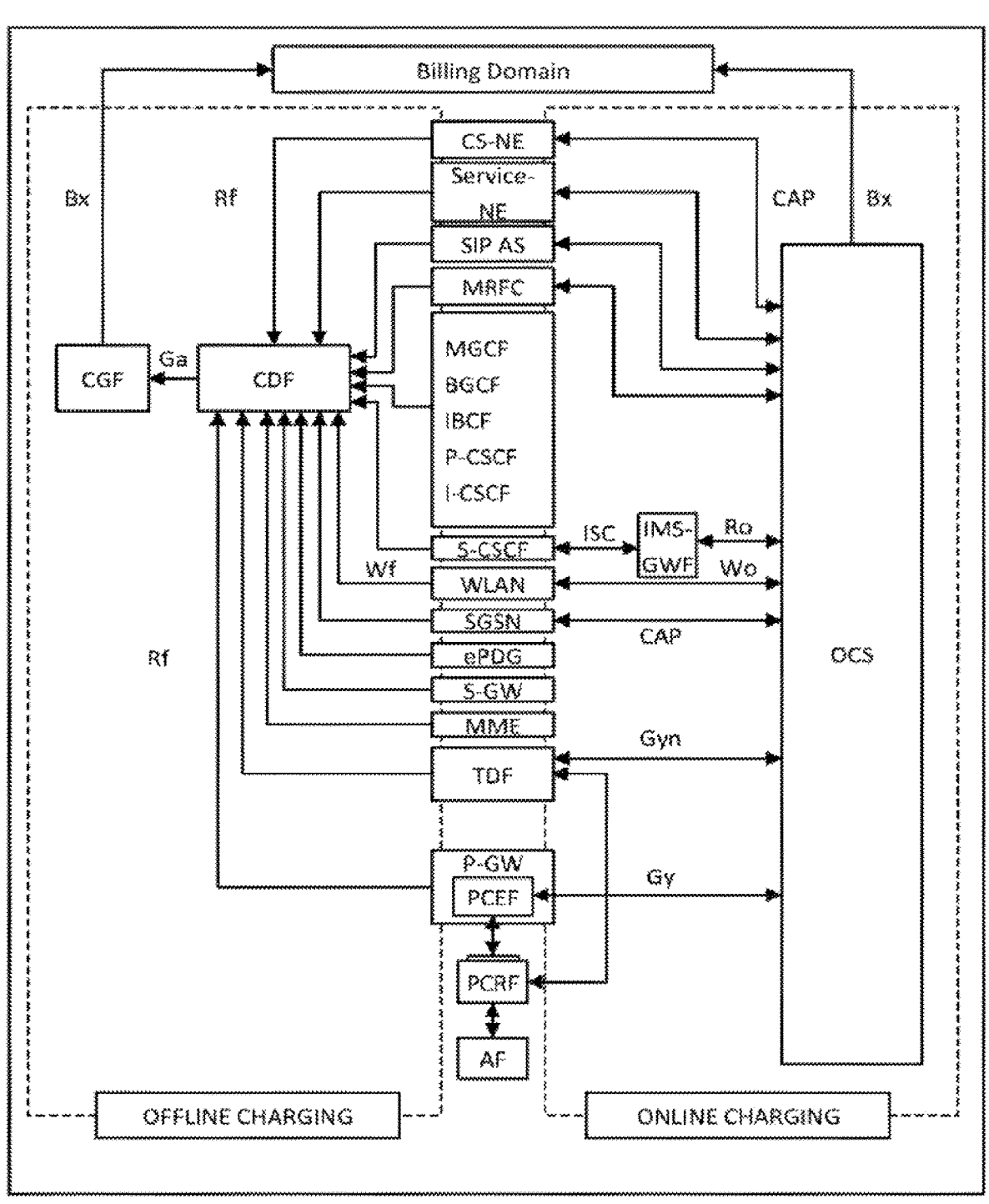
FIG. 10 illustrates a logical ubiquitous charging architecture and information flows.

A high-level common architecture for online and offline charging is shown in FIG. 10 (refer to Clause 4.2 of TS 32.240). Furthermore, FIG. 10 depicts the reference points (e.g., Rf and Ro) between the network entities of interest along with the information flows over these reference points. The charging architecture includes both online and offline charging processes. In order to support charging process, the network performs real-time monitoring of resource usage. In the offline charging process, the network provides the offline charging system (OFCS) with the resource usage after it has occurred. Such notification is used to create a charging data record (CDR), which is afterwards sent to the billing domain. As for the online charging process, the network contacts the online charging system (OCS) to grant permission for the resource usage prior to using it. Therefore, the collected charging information in the offline mechanism does not affect, in real time, the requested services. On the contrary, the charging information in the online mechanism affects, in real time, the requested services (refer to Clause 4.1 of TS 32.240).

Figure 11:
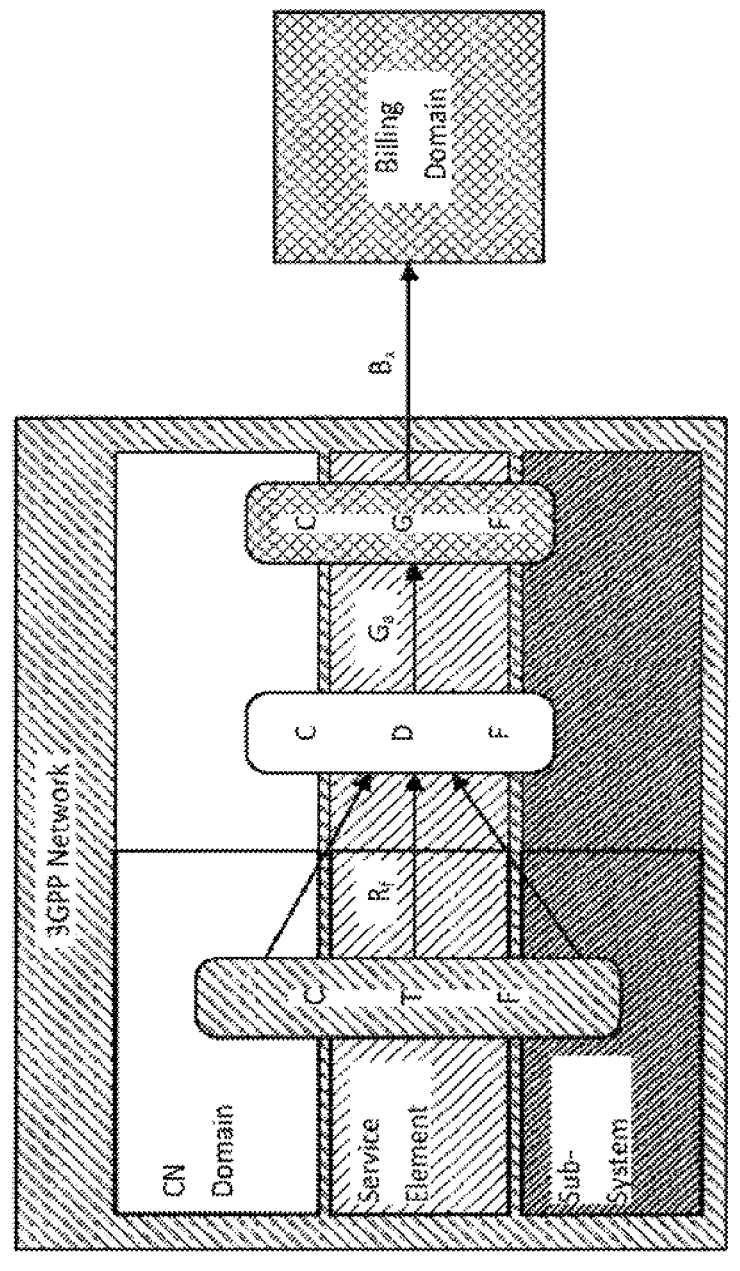
FIG. 11 illustrates a logical ubiquitous offline charging architecture.

Offline Charging System (OFCS): FIG. 11 depicts the offline charging architecture that includes multiple logical entities. The Charging Trigger Function (CTF) generates charging events based on the observation of network resource usage. It is responsible for "Accounting Metrics Collection" and "Accounting Data Forwarding" towards the Charging Data Function (CDF) via the Rf reference point. The CDF then uses the information contained in the charging events to construct CDRs. The CDRs produced by the CDF are transferred immediately to the Charging Gateway Function (CGF) via the Ga reference point. The CGF uses the Bx reference point for the transfer of CDR files to the BD.

Figure 12:
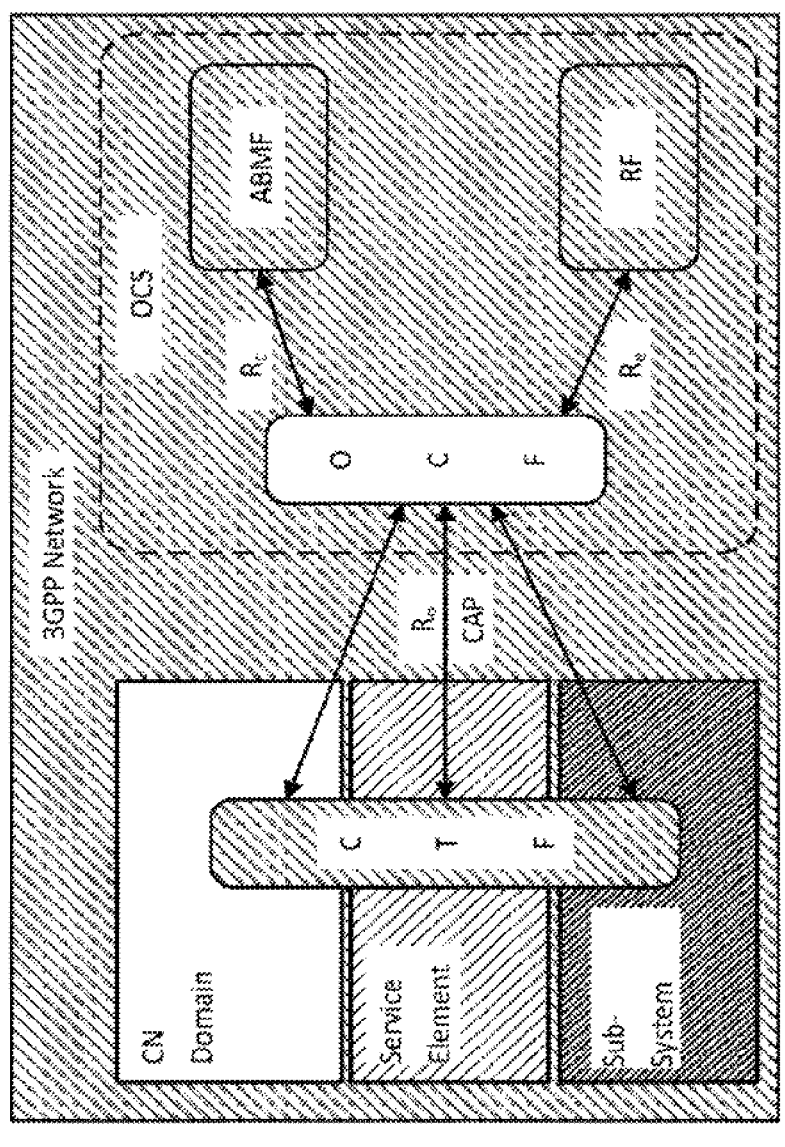
FIG. 12 illustrates a logical ubiquitous online charging architecture.

Online Charging System: FIG. 12 shows the architecture of the OCS. Similar to the OFCS, the CTF creates the charging events and collects the "Accounting Metrics." The charging events are forwarded to the Online Charging Function (OCF) over the Ro reference point, in order to obtain authorization for the network resource usage requested by the user. The Rating Function (RF) determines the value of the network resource usage and the Account Balance Management Function (ABMF) is the where the subscriber's account balance is stored within the OCS.

Online charging mechanisms can be event-based or session-based, as clarified in clause 5.2.2 of TS 32.240. In event-based charging, a network/user event corresponds to a single chargeable event. In session-based charging, at least two chargeable events are needed. The Session Charging with Unit Reservation (SCUR) mechanism is described in clause 6.3.5 of TS 32.299. In the SCUR, the CTF of a particular network entity will forward the charging event to the OCS. In response, the OCS determines the usage cost of the needed resources and reserves the needed charge from the user's account. The RF in the OCS is responsible for deciding the value of the utilized resources. Alternatively, we can have "Decentralized Unit Determination and Centralized Rating" SCUR, in which the CTF calculates the required number of resources units and the corresponding monetary rate (clause 5.2.2 of TS 32.299) and sends this information to the OCS. In response, the OCS sends back to the CTF authorizing the resources usage. As a result, the network entity executes the resource utilization. Once completed, the CTF informs the OCS about its completion.

Volume Based Online Charging: The PCEF performs volume based online charging in the 3GPP network. When a data session begins, the PCEF reserves some of the user's credit (e.g., money) from the OCS. As data volumes are delivered to or from the used, the PCEF decrements the reserved credit. When all credit is spent, the PCEF may attempt to reserve more credit from the user's account. If the OCS indicates to the PCEF that the user has no more credit in the account, then the data session will be terminated by the PCEF. The PCEF is typically deployed in the P-GW.

Figure 13:
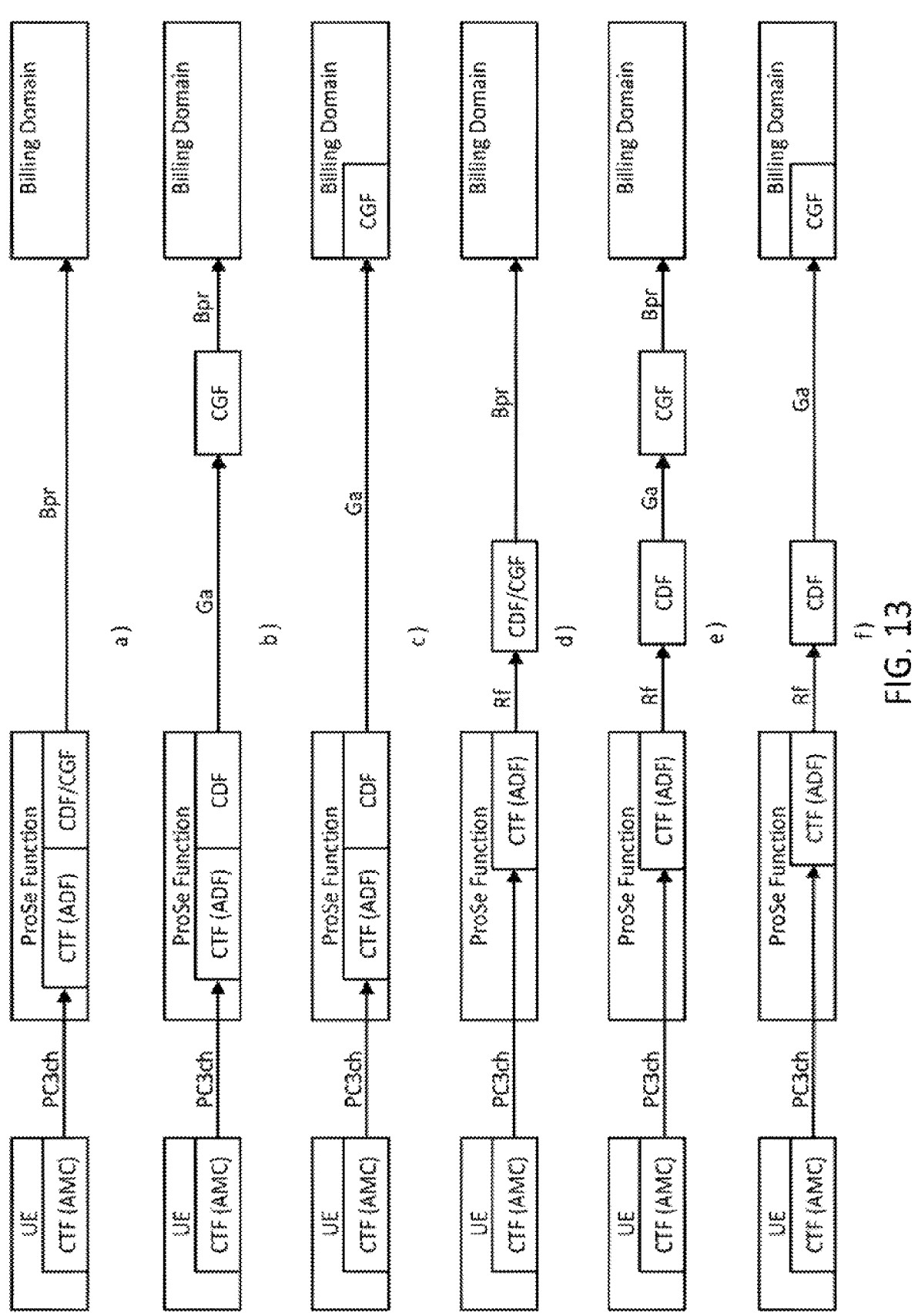
FIG. 13 illustrates a ProSe direct communication offline charging architecture.

ProSe Charging Principles: In ProSe PC5 communications, a network operator's spectrum is used to exchange data between UEs. No network entities are involved in PC5 commination and the UEs may not be in network coverage during the data exchange. When a UE is not in network coverage, it is not able to send data to and from the network. In 4G, the ProSe architecture for PC5 charging as designed as shown in the architecture options of FIG. 13, TS 32.277. The CTF is divided into 2 logical functions; the Accounting Metrics Collection (AMC) function and the Accounting Data Forwarding (ADF) function. The AMF sends usage information to the ADF. If the charging events occur when the UE is out of coverage, the AMF will forward information about the event to the ADF when the UE is back in coverage. The AMC and ADF communicate over the PC3ch reference point. Notice that the ADF is part of the ProSe Function. The ProSe Function configures the UE with reporting criteria that is used by the UE to determine when to send reports to the ADF and what information needs to be reported.

ProSe Service Authorization and Authorization Update Procedure: The Service authorization and authorization update for ProSe direct discovery and ProSe direct communication procedures determine whether the UE is authorized to use ProSe direct discovery (based on E-UTRA or WLAN technology) and ProSe direct communication. This procedure is detailed in TS 24.334. The service authorization information is either pre-configured in the UE or provided to the UE from the ProSe Function in a management object (MO). A messageInformationReportingConfiguration MO is provided to the UE as part of this procedure. This MO is defined in TS 24.333 and configures the UE with information about where the AMC should send charging reports, how often to send charging reports, and what information should be included in the charging reports.

Usage Reporting: TS 24.334, section 10.3 describes usage reporting. In usage reporting the AMC sends usage reports to the ADF using the HTTP based PC3ch reference point.

ProSe Online Charging: As described in TS 32.277, online charging for ProSe only occurs between the ProSe Function and the OCS (Online Charging System). Thus, online charging is performed for operations that involve the ProSe Function (e.g. after discovery authorization of receiving Direct Discovery Request with command (Announce, Monitor), after discovery authorization of receiving Match Report message, after discovery authorization of Model B Restricted Discovery Request, and after discovery authorization of Model B Restricted Discovery Reporting). Online charging is not performed for operations that only occur on the PC5 reference point (e.g. data transmission and reception).

Figure 14:
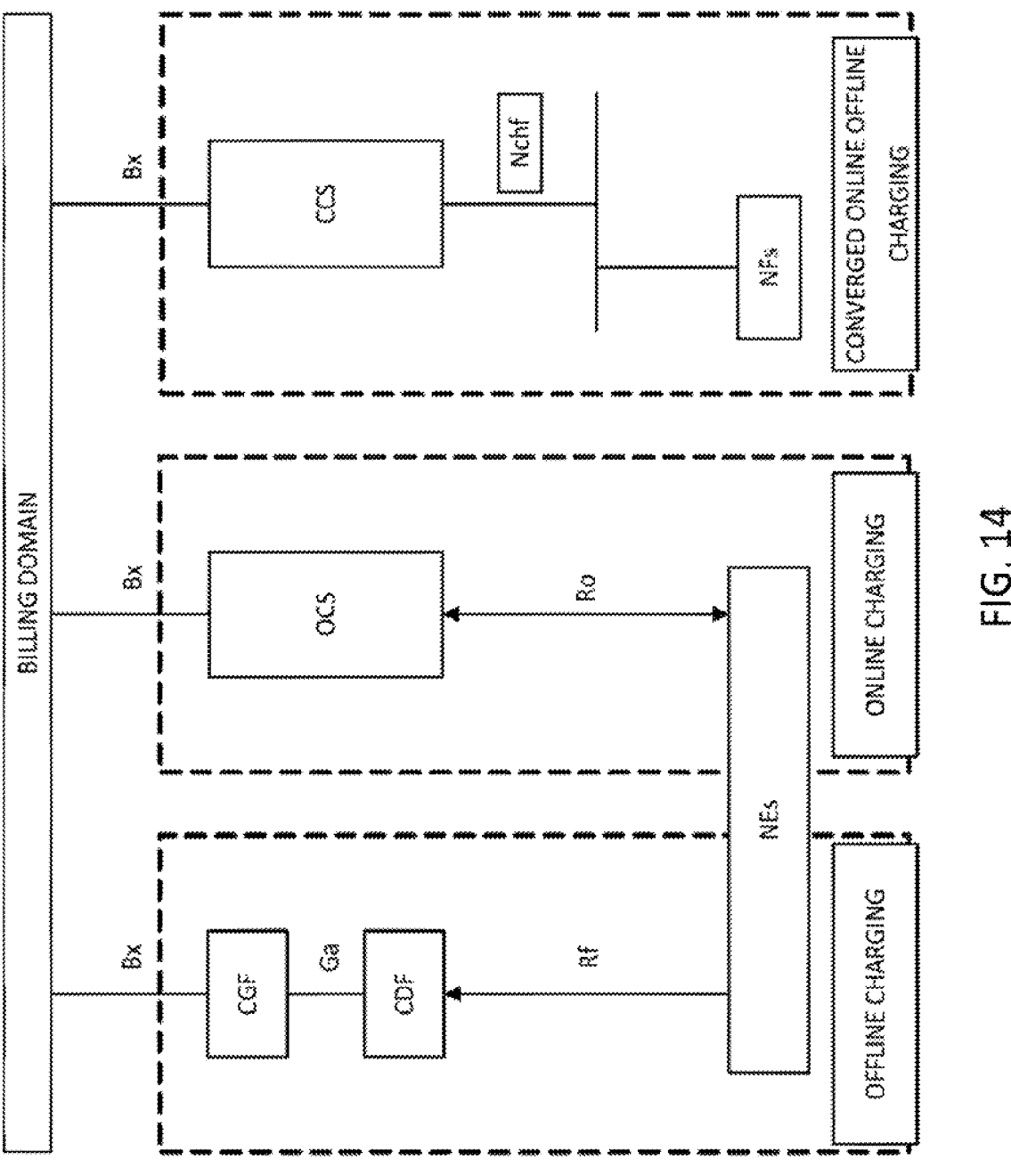
FIG. 14 illustrates a logical ubiquitous charging architecture and information flows.
Figure 15:
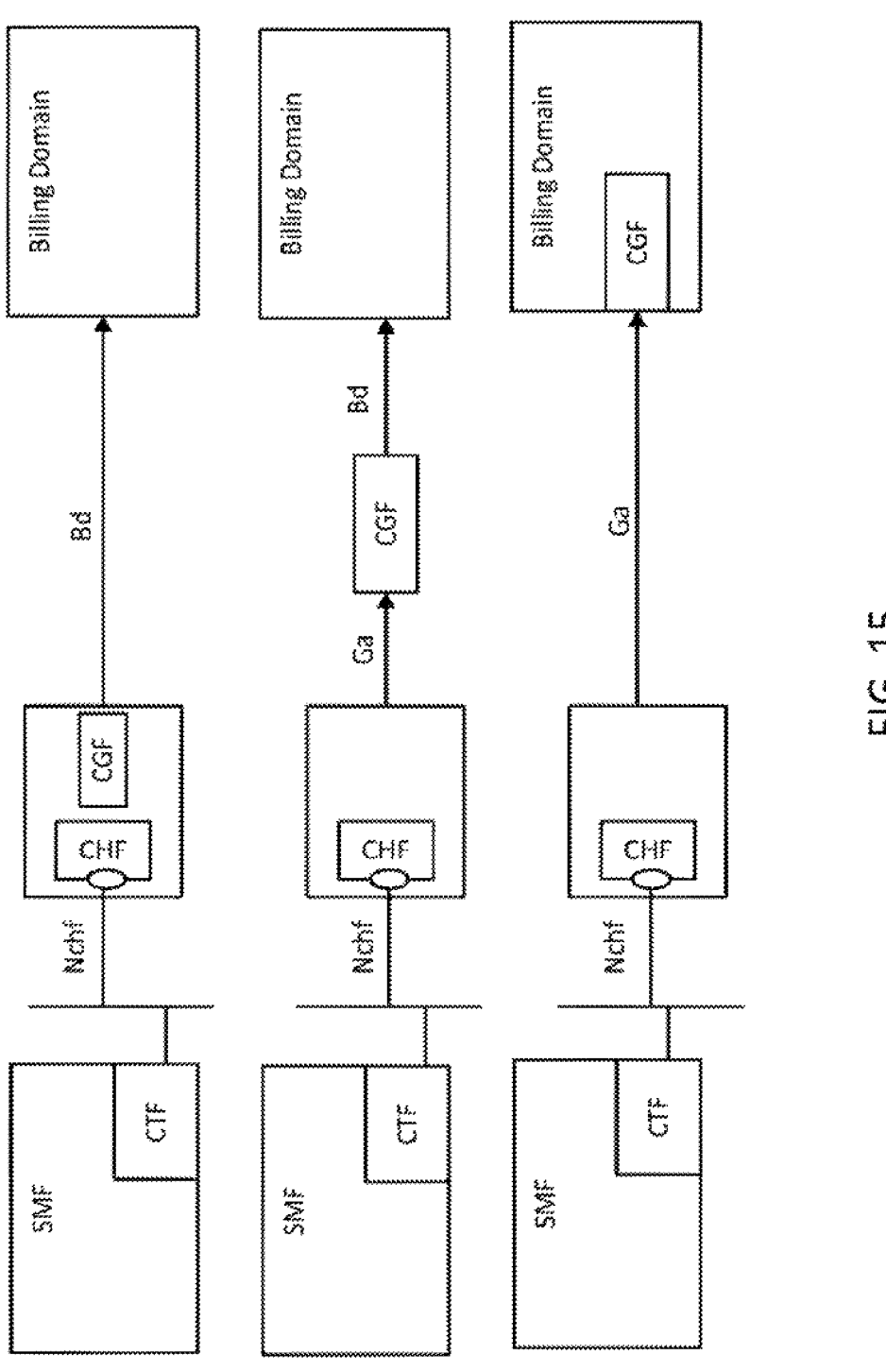
FIG. 15 illustrates a 5G data connectivity converged charging architecture.

5G Charging Principles: In 5G, the Converged Charging System (CCS) was introduced. Converged charging is a process where online and offline charging are combined. The charging information is utilized by CCS in one converged charging service which offers charging with and without quota management, as well as charging information record generation, TS 32.240. The CCS exposes a service-based interface, called Nchf to network functions as shown in FIG. 14, TS 32.240. As shown in FIG. 15, the a CTF in a Network Function may use the Nchf to access the CHF (Charging Function), TS 32.255. The CDRs generation is performed by the CHF acting as a CDF, which transfers them to the CGF. Finally, the CGF creates CDR files and forwards them to the BD. If the CGF is external, the CHF acting as a CDF, forwards the CDRs to the CGF across the Ga interface. If the CGF is integrated, there is only one internal interface between the CHF and the CGF. In this case, the relationship between CHF and CGF is 1:1. An integrated CGF may support the Ga interface from other CDFs. Refer to TS 32.255. When an external CGF is used, this CGF may also be used by other, i.e. non-5GCS, network elements, according to network design and operator decision. It should be noted that the CGF may also be an integrated component of the BD—in this case, the Bd interface does not exist and is replaced by a proprietary solution internal to the BD. Refer to TS 32.255.

Identifying a Network Slice: A network slice is identified with an S-NSSAI (Single Network Slice Selection Assistance Information). The S-NSSAI consists of a Slice/Service Type (SST) and a Slice Differentiator (SD). An NSSAI is a collection of S-NSSAI's. There are 3 types of NSSAI's. The Configured NSSAI is the NSSAI configured on the UE and contains the list of S-NSSAI's that the UE may use. The UE may have a different configured NSSAI for each PLMN. The configuration may include instructions for how to map the configured NSSAI to the HPLMN configured NSSAI. The Requested NSSAI is provided to the network by the UE at registration. The network will use it to determine what network nodes should serve the UE and what network slices the UE should be allowed to connect to. At the completion of registration, the network provides the UE with an Allowed NSSAI. The Allowed NSSAI is a list of S-NSSAI's (i.e. slices) that the UE is allowed to access.

PDU Sessions: A PDU Session is associated to an S-NSSAI and a DNN.

In a PDU Session establishment request sent to the network, the UE shall provide a PDU Session Identifier. The PDU Session ID is unique per UE and is the identifier used to uniquely identify one of a UE's PDU Sessions. PDU Session ID should be stored in the UDM to support handover between 3GPP and non-3GPP accesses when different PLMNs are used for the two accesses.

URSP Rules: URSP (UE Route Selection Policy) rules are policies that are used by the UE to determine how to route outgoing traffic. Traffic can be routed to an established PDU Session, can be offloaded to non-3GPP access outside a PDU Session, or can trigger the establishment of a new PDU Session. The rules are provided by the PCF in the 5GC to the UE. URSP Rules have the following main parts. A Traffic Descriptor Part is used by the UE to determine what traffic the rule applies to. A Route Selection Descriptors (RSD) part that includes descriptions of route(s) (i.e. S-NSSAI, DNN, Access Type, etc.) that may be used to route the data that matches the traffic descriptor. The UE may also have local preferences that can be used to determine how to treat traffic. Local preferences take precedence over URSPs. The content of URSP rules is described in TS 23.503.

Figure 16:
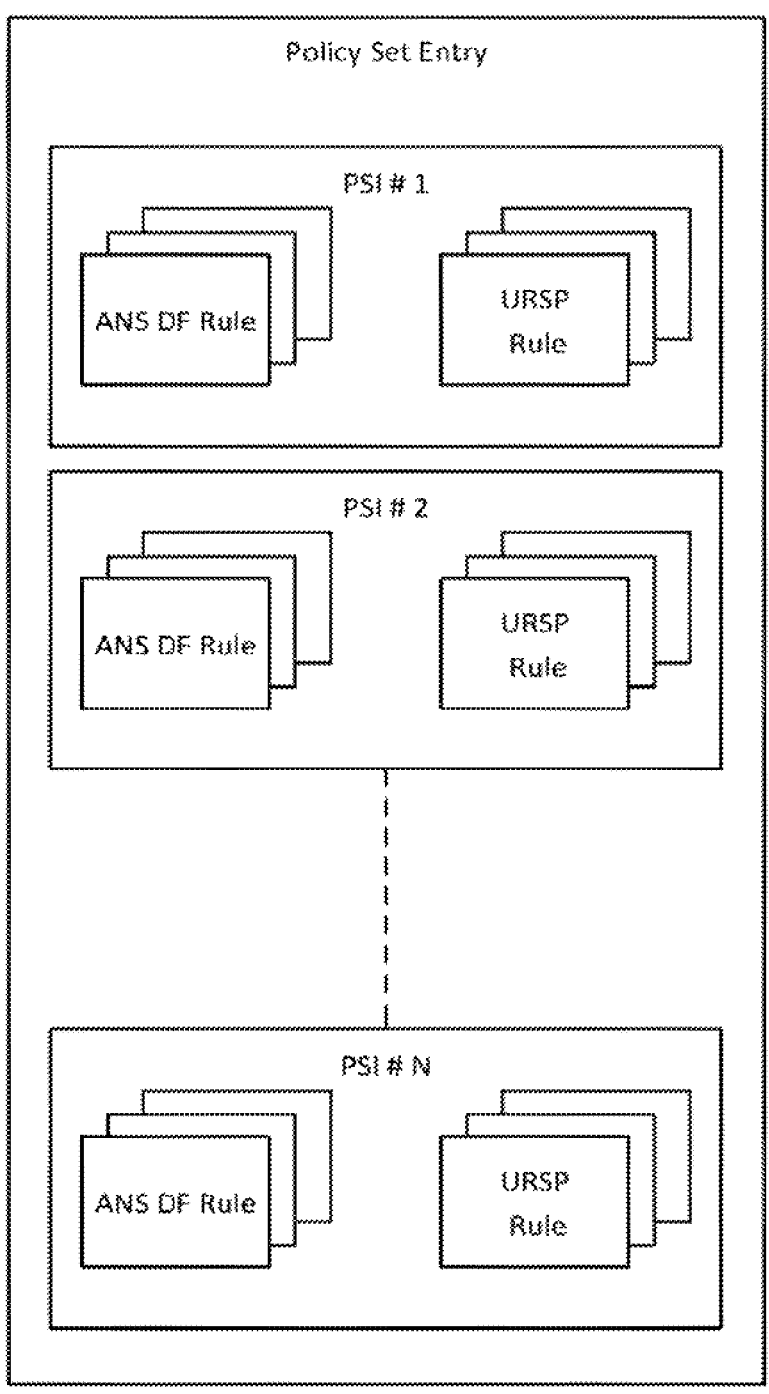
FIG. 16 illustrates a policy set entry.

Organization of UE Policy Information: The policy information part of the UE's subscription is organized in the UDR as a Policy Set Entry. A Policy Set Entry may include one or more PSI(s). Each PSI may include zero or more ANDSP or URSP policies. This is described in TS 23.503 and depicted in FIG. 16. FIG. 16 may also be considered a representation of how policy information is stored on the UE. The Network sends policy information to the UE with PSI granularity. In other words, a single PSI is the smallest amount of policy information that the network can send to the UE and is the smallest amount of policy information that the UE can reject. A PSI can contain as little as one ANDSP rule or one URSP rule.

Support for Access to PLMN Services Via Stand-Alone Non-Public Network

In order to obtain access to PLMN services when a UE is camping in NG-RAN of Stand-alone Non-Public Network, the UE obtains IP connectivity, discovers and establishes connectivity to an N3IWF in the PLMN.

Figure 17:
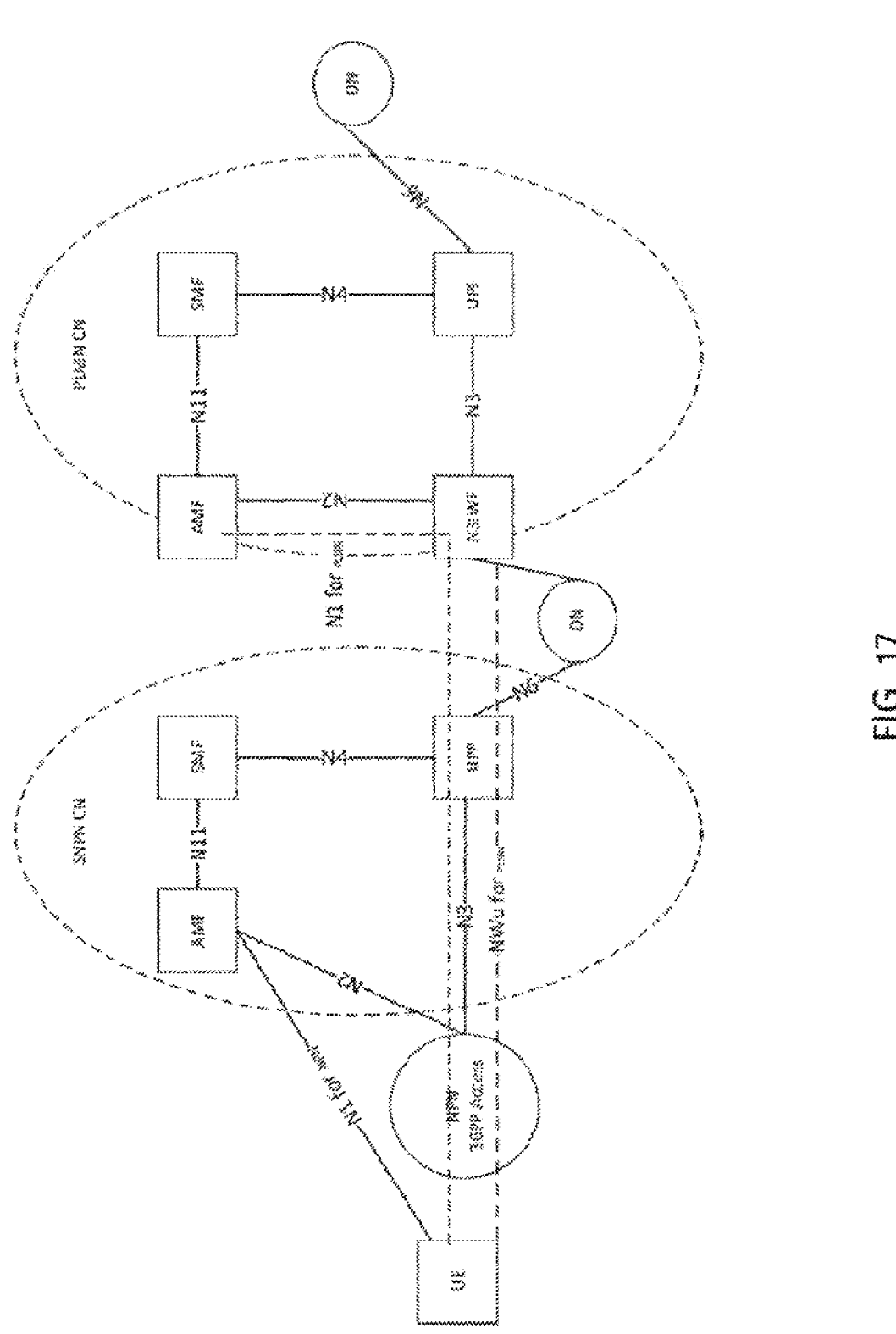
FIG. 17 shows an example diagram of Access to PLMN services via Stand-alone Non-Public Network.

In the FIG. 17, the N1 (for NPN) interface represents the reference point between UE and the AMF in Stand-alone Non-Public Network. The Nwu interface (for PLMN) represents the reference point between the UE and the N3IWF in the PLMN for establishing secure tunnel between UE and the N3IWF over the Stand-alone Non-Public Network. N1 (for PLMN) represents the reference point between UE and the AMF in PLMN.

N3IWF Selection

When the UE supports connectivity with an N3IWF but does not support connectivity with ePDG, as specified in TS 23.402, the UE shall perform the procedure in clause 6.3.6.2 of TS 23.501 for selecting an N3IWF.

When the UE supports connectivity with an N3IWF, as well as with ePDG, as specified in TS 23.402, the UE shall perform the procedure in clause 6.3.6.3 of TS 23.501 for selecting either an N3IWF or an ePDG, i.e. for selecting a non-3GPP access node.

In both cases above the UE can be configured by the HPLMN with the same information that includes: 1) ePDG identifier configuration: It contains the FQDN or IP address of the ePDG in the HPLMN, as specified in TS 23.402 [43], clause 4.5.4.3. This is used only when the UE supports connectivity with ePDG and attempts to select an ePDG. It is ignored in all other cases. 2) N3IWF identifier configuration: It contains the FQDN or IP address of the N3IWF in the HPLMN. 3) Non-3GPP access node selection information: It contains a prioritized list of PLMNs and for each PLMN it includes (i) a "Preference" parameter which indicates if ePDG or N3IWF is preferred in this PLMN and (ii) an FQDN parameter which indicates if the Tracking/Location Area Identity FQDN or the Operator Identifier FQDN (as specified in TS 23.402, clause 4.5.4.4) should be used when discovering the address of an ePDG or N3IWF in this PLMN. The list of PLMNs shall include the HPLMN and shall include an "any PLMN" entry, which matches any PLMN the UE is connected to except the HPLMN.

The ePDG identifier configuration and the N3IWF identifier configuration are optional parameters, while the Non-3GPP access node selection information is required and shall include at least the HPLMN and the "any PLMN" entry.

If the ePDG identifier configuration is configured in the UE, then, when the UE decides to select an ePDG in the HPLMN (according to the procedure in clause 6.3.6.3 of of TS 23.501), the UE shall use the ePDG identifier configuration to find the IP address of the ePDG in the HPLMN and shall ignore the FQDN parameter of the HPLMN in the Non-3GPP access node selection information.

If the N3IWF identifier configuration is configured in the UE, then, when the UE decides to select an N3IWF in the HPLMN (according to the procedure in clause 6.3.6.3 of TS 23.501 for combined N3IWF/ePDG selection and the procedure in clause 6.3.6.2 of TS 23.501 for Stand-alone N3IWF selection), the UE shall use the N3IWF identifier configuration to find the IP address of the N3IWF in the HPLMN and shall ignore the FQDN parameter of the HPLMN in the Non-3GPP access node selection information.

Figure 18:
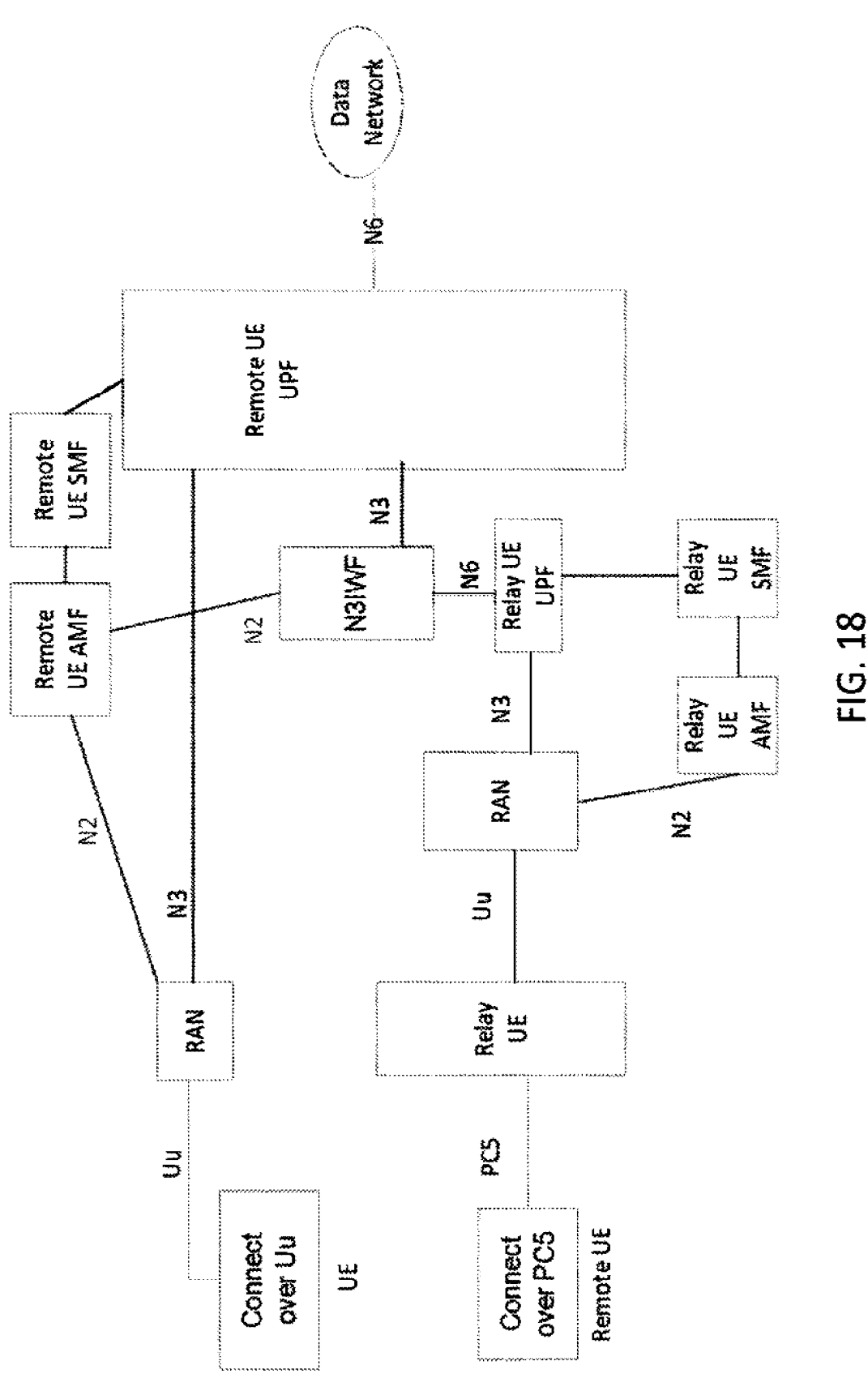
FIG. 18 shows Non-roaming Architecture using N3IWF with UE-to-Network Relay Access.

N3IWF Based Architecture for UE-to-Network Relay of Proximity Based Service in 5GS FIG. 18 shows an architecture that supports end-to-end security for Remote UE traffic transmitted using Layer-3 UE-to-Network Relay. The architecture leverages the design of "untrusted non-3GPP access to 5GC via N3IWF" that is also used for PLMN access from SNPN. The N3IWF can be enhanced to support ProSe UE-to-NW Relay as another access type in addition to WLAN access or 3GPP SNPN access and support the Remote UE to setup a PDU session with 5GC via N3IWF. The Remote UE follows the procedures to register to 5GC via N3IWF and establish corresponding PDU sessions. The N3IWF provides NAS connectivity to the 5GC and end-to-end security for Remote UEs via UE-to-NW Relay Access. The N3IWF treats the Remote UE as a N3GPP UE, e.g. there is no impact on N3IWF. The 5GC to which the UE-to-Network Relay registers and the 5GC to which the Remote UE registers may be the same or different. The solution does not require the Remote UE to be served by the same PLMN as the Relay UE.

Figure 19:
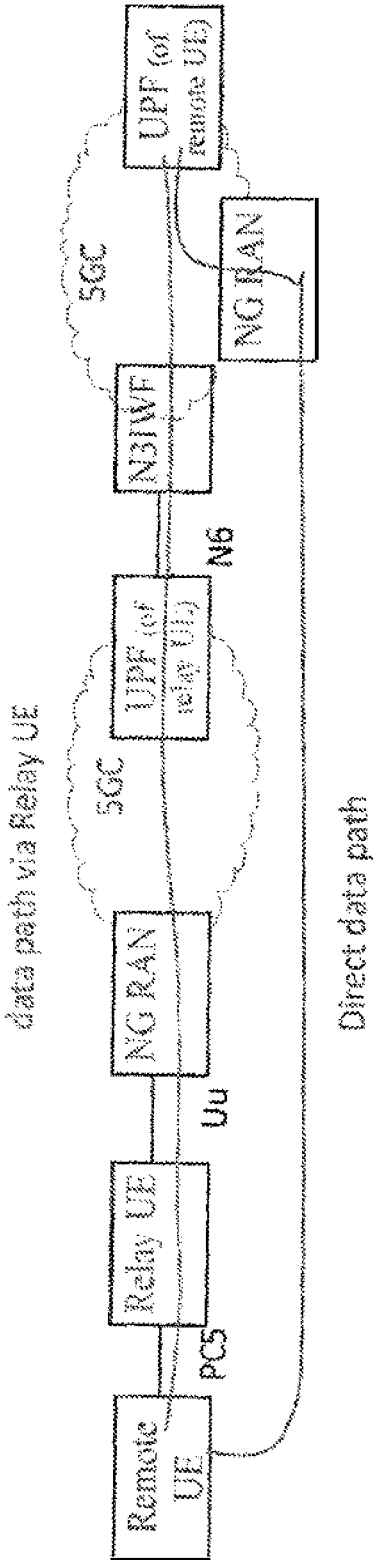
FIG. 19 shows an example diagram of User Plane paths for Remote UE.
Figure 20:
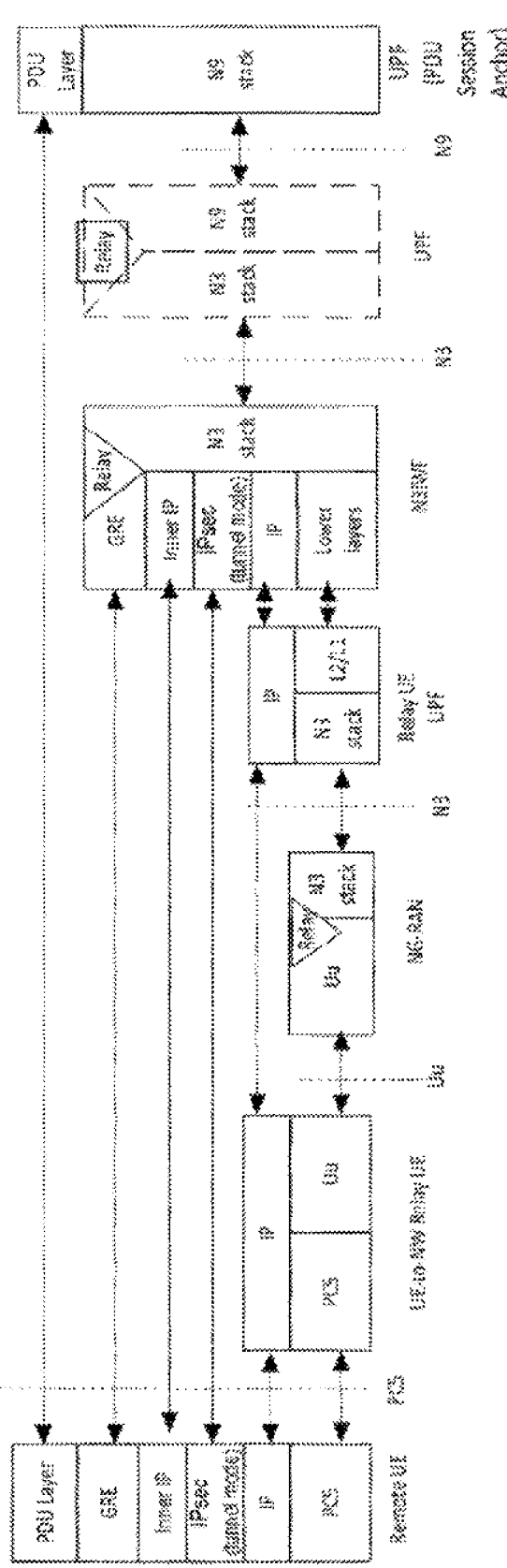
FIG. 20 shows User Plane Protocol Stack between Remote UE and N3IWF for L3 UE-to-Network Relay Access.

FIG. 19 and FIG. 20 show the direct and indirect data paths for remote UE and the user plane protocol stack respectively. When access to N3IWF is used, the ProSe 5G UE-to-Network Relay shall be able to relay both control plane (NAS) and user plane unicast traffic (UL and DL) between the Remote UE and the network towards N3IWF. Remote UE and 5GC reuses the procedures defined in clause 4.12 of TS 23.502 [5] for supporting registration and connection management from Remote UE to the 5GC over 5G ProSe UE-to-Network Relay access. Remote UE transmits/receives the UP traffic over the Relay's PDU session(s) established for the Remote UE traffic over PC5 UE-to-Network Relay path via child IPSec SA tunnel to the N3IWF. The PCF may provide corresponding URSP rules to assist the Remote UE to identify the services that require the access to N3IWF. The user plane protocol stack for layer-3 UE-to-Network Relay access via N3IWF is same as the user plane protocol stack for untrusted non-3GPP access.

Disclosed below are multiple issues that may be significant with path switching and the like. As disclosed herein, path switch may be a significant operation to support when implementing a relay mechanism in a mobile core network. In general, the path switch may be categorized into the following 3 scenarios. In a single hop relay scenario, path switch may take place between direct and indirect connection to core network (e.g., from Uu to PC5, or from PC5 to Uu). In the context of a multi-hop relay scenario, a remote UE may switch from a UE-to-UE relay to another UE-to-UE relay, to a UE-to-Network relay (which may directly connect with a RAN node), or to a RAN node (the latter two cases may be considered as the same as PC5 to Uu switch). In another scenario, the UE maintains at least two connections to the mobile core network. In other words, a remote UE maintains at least two paths to connect to the core network at the same time. One is Uu based, and the other is PC5 based (e.g., single hop or multi-hop). UE may dynamically decide to choose the path for transferring an application data flow between the at least two paths.

Although the path switch was disclosed before as introduced herein, there are several issues that may be addressed.

With regard to a first issue, discussion in reference TR 23.733 was under the assumption of layer 2 relay. This implies that any remote UE is required to register with the network, which makes the switch process easier. In case of the layer 3 relay, the remote UE may not need to register with the network, and therefore the network is not aware of the presence of the remote UE. This may make the switch procedure different. Conventionally, there is no solution for the path switch for the layer 3 relay. In other words, the existing ProSe does not have any specified solution for path switch in the context of UE-to-Network relay. Therefore, it is desirable to develop new methods for the path switch to enhance ProSe.

With regard to a second issue, conventional solutions mainly address the path switch process from the registration and connection management aspects. In other words, the disclosed solutions focus on how to transfer registration information (e.g., UE context) and how to connect to the new RAN node for the switching UE. However, in order to provide service continuity, there should be a discussion on how to move a PDU session and the corresponding session context information for the switching UE during the path switch. This is not only because the anchor UPF may be changed, but also because some message exchanges are required between the UEs at the other side of the PDU session. Specifically, without any relay, PDU session modification procedure mainly focuses on the operations at network side, e.g., at SMF and UPF. While the path switch may result in the addition or removal of a relay UE in the PDU session, the PDU session is changed not only at UPF, but also at the UE side. There may be some session management context exchanged between UEs.

With regard to a third issue, multi-hop relay may not be considered by conventional solutions. With multi-hop relay, the path switch procedure may be different and more complicated compared to the single hop case. For example, a UE-to-UE relay may be involved in the switch process which requires some additional information exchange not only between RAN node and core network, but also between UEs.

With regard to a fourth issue, conventional solutions may be purely based on the LTE EPC architecture. With the fundamentally different architecture of 5GC, the existing solutions overlook some important aspects. For example, 5GC is built based on the concept of the network slice. Every UE connects to at least 1 network slice in order to register with the network. The path switch may result in the change of network slice that serves the switching UE or the relaying UE. Therefore, any path switch procedures that are deployed within 5GC should consider the network slice configuration.

Issues with the network controlled interactive services (NCIS) use case is disclosed herein. As described in TR 22.842, in Network Controlled Interactive Service (NCIS) scenarios (e.g., the gaming scenario of TR 22.842 section 5.1 and the group communication scenarios if TR 22.842 section 5.6), the UEs that are in the same NCIS session are grouped together as one NCIS group. It is assumed that an application server manages each NCIS group and UE's interact with the Application Server in order to join, leave, or re-join the group.

Once a UE joins the NCIS group, it may exchange data with other UE's who are part of the same NCIS group. The data exchange may be via the PC5 or Uu reference points (e.g., the UE's may not be in proximity of each other). When UE's are in proximity of each other, they may discover each other using ProSe Direct Discovery procedures. The UE's can then use one-to-many direct communication and one-to-one direct communication to communicate with each other.

Issues with the network controlled interactive services (NCIS) use case is disclosed herein. The disclosed issues may be related to 1) support for NCIS grouping in the 5G system; 2) charging problems to address in the 5G system; 3) lawful intercept for PC5 traffic; 4) path selection and switching in network controlled interactive services (NCIS) for 5G ProSe; or 5) network slicing consideration for NCIS/PC5 communication.

Support for NCIS Grouping in the 5G System: The conventional 5G System requires enhancements to allow UE's to request to join NCIS groups, receive notifications when they are added or removed from an NCIS group, and receive policies, or information that enables the UE to determine what traffic is considered part of the NCIS group, and to determine how to route data that is associated with the NCIS group.

Charging Problems to Address in the 5G System: One issue that relates to NCIS communication and general proximity services is how to charge for traffic that is sent directly between UEs (e.g., traffic that does not traverse network nodes such as a UPF). As described earlier, charging conventionally relies on the fact that traffic traverses core network nodes such as the UPF or P-GW. A ProSe charging system has been defined by 3GPP and was also described earlier. However, the ProSe charging system does not support online charging for data that is exchanged via PC5. Assuming the conventional ProSe charging system does support offline generation of charging reports that can capture information about how much data was exchanged over PC5, the charging reports as they are conventionally defined do not provide information to allow the billing system to correlate charging reports across an NCIS group and between UEs that exchange data.

Lawful Intercept for PC5 Traffic: Similar to the charging related challenges that were described above, the fact that PC5 traffic does not traverse the core network presents some challenges. Besides the topic of charging, another challenge that relates to PC5 communication is how to perform lawful intercept of traffic.

Path Selection and Switching in NCIS for 5G ProSe: Although the path selection and switching mechanism is required by both UE-to-Network Relay and NCIS in 5G ProSe, there are some differences between the two according to 3GPP TR 23.752 and TR 22.842.

Path selection and switch in NCIS focuses on communication between two UEs. In other words, two UEs exchange data through either a 5GC path or a PC5 path. The path selection and switching procedure in NCIS needs to consider requirements from both UEs. Two UEs in NCIS may make the decision independently. On the other hand, path selection and switching procedures in a ProSe UE-to-Network Relay focus on data transfer between a remote UE and the core network. The relay UE is only doing forwarding. The path selection and switching procedures mainly consider requirements of the remote UE.

Path selection and switching in NCIS may involve any communication mode, e.g., unicast, multicast, or broadcast. The communication mode may affect how to select the path between 5GC path and PC5 path, and how to perform path switching. In addition, NCIS applications may involve a group of UEs that communicate with other UEs as a group. In such a scenario, the path selection decision and switching procedure may depend on the communication mode. However, the communication mode does not have much impact on the path selection and switching in ProSe UE-to-Network Relay. This is because the remote UE focuses on how to transfer data to or from the core network regardless of whether it is multicast, broadcast, or unicast. It is a point-to-point communication between the remote UE and the core network.

Applications in NCIS usually require high data rate and low latency, thus making NCIS path selection and switching more focused on service continuity and QoS aspects. Use cases for ProSe UE-to-Network Relay may involve a variety applications, e.g., V2X or IoT.

For the foregoing reasons, new methods are needed for supporting path selection and switching for Network Controlled Interactive Service (NCIS) that are different from those methods in ProSe UE-to-Network Relay. Such new methods may consider the requirements of NCIS (e.g., latency, data rate, etc.) and the measurements and preferences of the UEs that are involved in the NCIS session.

Network Slicing Considerations for NCIS/PC5 Communication: 5G communication is based on the concept of network slicing, where a UE does not use the resources of a network slice unless it is registered to the network slice. Conventionally, there is no way to prevent a UE from using PC5 resources if it is not registered to a network slice that is associated with the PC5/side link resources.

N3IWF Based Architecture Supporting UE-to-Network Relay

As discussed in previous paragraphs, an N3IWF based architecture can be used for supporting UE-to-Network relay in 5G proximity service. The remote UE will have an end-to-end NAS connection and end-to-end PDU session with its own AMF and anchor UPF respectively. However, applying such an architecture for relay may introduce some problems and issues that need to be addressed:

A UE-to-Network relay will be selected to serve the remote UE. At the same time, a N3IWF will be selected by the remote UE so that the N3IWF can forward NAS messages and user plane data from the remote UE via the relay UE's user plane path. The N3IWF will forward NAS to remote UE's AMF and data plane traffic to the remote UE's anchor UPF. However, not every UE supports the connectivity with every N3IWF, and therefore a UE cannot be selected as a UE-to-Network relay if it does not support connectivity with an N3IWF that the remote UE can connect to. Thus, there is a need to coordinate the process of UE-to-Network selection and the process of N3IWF selection to make sure the selected N3IWF can be reached by the UE-to-Network Relay. Because the UE-to-Network Relay will send any packet from the remote UE (regardless of CP or UP message) to the N3IWF via its PDU session, and the N3IWF is treated as the destination of the relay UE's PDU session.

The remote UE will have its own PDU session, which is separate from the relay UE's PDU session. The transfer of the remote UE's control plane messages (e.g. NAS messages) and user plane data relies on the relay UE's PDU session. In other words, after the remote UE sets up its PDU session via the N3IWF, relay UE needs some information to decide which one of its PDU sessions will be used to forward remote UE's message. There is no mechanism to address this aspect yet.

Currently, there is no mechanism specifying how to perform the path switch for the remote UE under the N3IWF based relay architecture, a new mechanism is required to switch the remote UE from a direct path to an indirect path, and vice versa. For the former scenario, the relay UE may need to update or establish its PDU session for relaying traffic by adding the N3IWF as a DN and adjust its URSP and QoS handling accordingly. However, this is not addressed yet.

It is expected that the 5G network supports path switch mechanisms from a direct path to an indirect path to the network, and vice versa, which may achieve better battery efficiency and handle dynamic system changes (e.g., due to mobility, loss network coverage, or loss of connection to a Relay UE). Below is a summary of exemplary disclosed subject matter that may address one or more issues are disclosed herein.

In a first example, there may be a mechanism of path switch from a direct path to an indirect path. Some new information elements are disclosed that may enhance the direct discovery for PC5 link establishment. Disclosed are registration management procedures that may be used for the following cases: (i) both RAN node and AMF remain the same and (ii) network selects different RAN node and AMF to serve the switching UE. Disclosed are PDU session management procedures that may provide service continuity for the switching UE due to the path switch.

In a second example, there may be a mechanism of path switch from an indirect path to a direct path. Disclosed are registration management procedures with different RAN nodes and AMFs selected for the switching UE. Disclosed are PDU session management procedures that may provide service continuity for the switching UE with a new anchor UPF. An enhancement for the path switch process in the context of multi-hop relay. Information is disclosed to be included for the scenario that the path switch takes place across different multi-hop relay chains.

In a third example, there are network triggered path switch procedures. Disclosed are definitions of some events that trigger the network to initiate the path switch procedure. Disclosed is information that is sent to UE from network when initiating the path switch procedure. Disclosed is a mechanism for the network to configure the UE to know, or determine, when to perform a path switch.

In a fourth example, there are procedures for a UE to join an NCIS Group. The UE sends a request to be provisioned with policies for an NCIS group. The networks (PCF) sends an NCIS group policy to the UE along with all the necessary information for the UE to communicate within the group.

In a fifth example, there are architecture and procedures for collecting offline charging information for PC5 activity. Also disclosed is information to be included in the charging report so that the network can correlate CDR's across UEs.

In a sixth example, there are architecture and procedures for collecting online charging information for PC5 activity. Also, disclosed is how debits and credits can be performed for PC5 activity.

In a seventh example, there are architecture and procedures for performing lawful intercept for PC5 activity. Also described is how UEs can perform lawful intercept on behalf of the network and report intercepted data to the network.

In an eighth example, further described are protocols that can be used to report charging, analytic information, and intercepted information to the network.

In a ninth example, a path selection policy is disclosed to enable UEs in a NCIS group or network to select between a 5GC path and a PC5 path to deliver the NCIS application data traffic to other UE(s). The policy is provisioned by the PCF, and the policy may include configuration that was provided to the PCF by an AF.

In a tenth example, there procedures for performing the path switching from a 5GC path to a PC5 path for unicast traffic between UEs, including possible triggers, or events that trigger the path switch. In addition, path switching methods are presented for scenarios where multicast or broadcast communication is used among UEs.

In an eleventh example, procedures on how to perform the path switching from a PC5 path to a 5GC path for unicast traffic between 2 UEs, including possible triggers, or events that trigger the path switch. In addition, path switching methods are presented for scenarios where multicast or broadcast communication is used among UEs.

New mechanism of N3IWF selection combined with UE-to-Network relay selection for the remote UE to establish a proper indirect path.

Enhancement to URSP to enable the relay UE to decide which PDU session to use for forwarding the message received from the remote UE towards an N3IWF.

Mechanism of path switching for the remote UE from an indirect path with the N3IWF to a direct path, and vice versa.

New parameters in path selection policy for NCIS and charging report mechanism update by adding N3IWF into the report path.

The following assumptions may influence the example methods, devices, systems, or the like disclosed herein. Firstly, in the context of layer-3 relay, a remote UE does not have to register with the network in order to connect to the core network via a relay. In other words, a remote UE is NOT required to register with the network in order to join a relay chain. Secondly UEs, regardless of whether they are registered or not, in a relay chain (including both single hop and multi-hop) may be served by the same network slice and AMF in 5GC. Lastly, in the context of multi-hop relay, if a path switch takes place for a remote UE within the same relay chain, there may be NO network slice change.

Switching from Direct Path (Uu) to Indirect Path (PC5)

In this scenario, the switching UE originally has a direct connection to the core network via a RAN node and decides to switch to a UE-to-Network Relay or UE-to-UE relay in order to connect to the core network. Therefore, the switching UE has already registered with the network before the switch. In other words, the network maintains the registration information of the UE such as UE ID and allowed NSSAIs.

Discovery Enhancement: The switching UE can use the ProSe direct discovery mechanism to discover and select a relay UE. In LTE ProSe, direct discovery over PC5 was performed based on some application related information such as ProSe Application Code and ProSe Application ID. This can be enhanced by including more information in the 5G network. Specifically, new additional information can be included in the discovery over PC5 for 5G, such as network slice information, PLMN information, radio access network (RAN) node information, access and mobility management function (AMF) information, or UE capability information.

Network slice information, such as NSSAI, may be used by a UE to discover other UEs in proximity that are served by the network slice supporting certain types of services (e.g., V2X and Massive IoT). In addition, the switching UE may prefer to connect to a relay UE without changing the network slice. The network slice information could be the configured NSSAI, allowed NSSAI, or requested NSSAI. Moreover, the network slice instance information may be included. Even if UEs are connected to the network slice with the same NSSAI, they still may be served by different network slice instances, which can be identified by network slice instance (NSI) ID.

PLMN information, such as PLMN ID, may be used by a UE to discover other UEs in proximity that are registered with the target PLMN. RAN node information, such as RAN network ID or RAN node ID, may be used by the switching UE to discover other UEs in proximity to connect to the same RAN node during the path switch. AMF information, such as AMF ID and AMF capability, may be used by a UE to discover other UEs in proximity that are served by the same AMF during the path switch. UE capability information may include UE radio capability, such as whether UE supports LTE PC5 or NR PC5. The UE capability information may also include the UE capability such as whether UE supports control plane optimization, reliable data service, or other types of PDU session, which may be other than IP type PDU session.

The information (e.g., network slice information, PLMN information, radio access network (RAN) node information, access and mobility management function (AMF) information, or UE capability information) may be included in the discovery request that is sent from a UE to core network entity for authorization. The information may be announced (e.g., broadcast) so that UEs in proximity can discover the announcing UE (e.g., model A direct discovery) or the announcing UE may be discovered by other UEs in proximity (e.g., model B direct discovery).

During the path switch process, network may select a different RAN node or AMF to serve the switching UE. Disclosed herein are methods (e.g., FIG. 21 or FIG. 22) on how to manage the registration procedure by transferring the registration or connection management information of the switching UE among RAN nodes or network functions within the core network.

As the results of the switch process, the UE may connect to a different network slice or RAN node. Specifically, if the relay UE and switching UE were served by different RAN nodes before the path switch, the RAN node serving the relay UE may start serving the switching UE once the path switch is completed. The AMF may give the serving RAN node switching UE context information, such as N2 information, UE ID, or session management context, so that RAN node is aware of the association between the switching UE and relay UE. Since the switching UE has direct connection, implying that it registers with the network, the RAN node may keep the switching UE context information and be aware that the switching UE can be reached via the relay UE. In addition, since the switching UE registers with network to create a direct connection before the switching, RAN node needs to be aware of this to manage the corresponding RRC connection and N3 user plane tunnel respectively, since both RRC and N3 tunnel may be affected by the path switch.

One more of the following scenarios are disclosed: 1) path switch with neither AMF nor RAN node changes (this may imply that the two UEs are connecting to the same RAN node and the same AMF before the switch); 2) path switch with RAN node change but no AMF change; 3) path switch with AMF change but no RAN node change; or 4) path switch with both AMF and RAN node changes. In the following, the procedures for scenarios 1 and 4 may be presented, because these scenarios are general enough to cover the scenarios 2 and 3.

Figure 21:
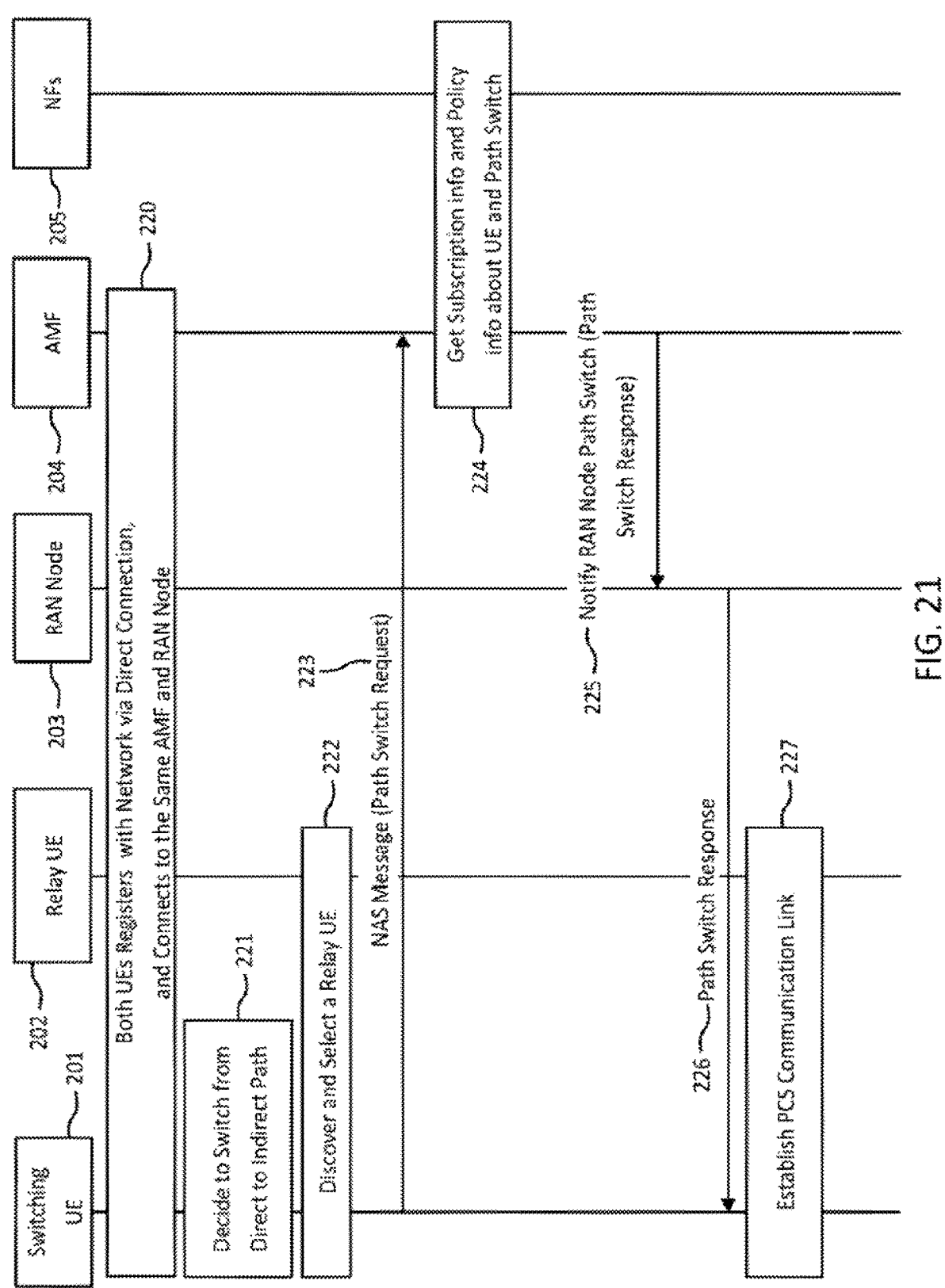
FIG. 21 illustrates an example registration management procedure triggered by the path switch from a direct to an indirect path under the same RAN node and the same AMF.

FIG. 21 illustrates an exemplary registration management procedure triggered by the path switch from a direct to an indirect path under the same RAN node and the same AMF. At step 220, both UEs (e.g., switching UE 201 and relay UE 202) are registered with the network and served by the same AMF (e.g., AMF 204) and RAN node (e.g., RAN node 204) via a direct connection.

At step 221, based on certain triggering events, a UE (e.g., switching UE 201) may look for a relay UE (e.g., relay UE 202) to establish an indirect connection to the network and thus initiates the path switch process. The triggering event may be, for example, an indication of out of network coverage, reaching a threshold that triggers one or more uses to reduce power consumption to save power, or an application required operation (e.g., V2X platooning), among other things. At step 222, in response to step 221 to switch path, switching UE 201 performs the discovery procedure in order to discover and select the appropriate relay UE 202. The ProSe direct discovery may be used with the new additional information as disclosed herein, such as information about the desired PLMN, RAN node, AMF, or network slice.

At step 223, switching UE 201 sends a network access-stratum (NAS) message to AMF to indicate its intention to switch to an indirect connection to the network. The NAS message may be a registration message, registration update message, or service request. In a case in which switching UE 201 is out of network coverage, the NAS message may be forwarded by relay UE 202. The path switch request may include the following information: switching UE 201 information (e.g., 5G Global Unique. Temporary Identifier—GUTI or Subscription Permanent Identifier—SUPI); network slice information (e.g., allowed NSSAI or configured NSSAI); relay UE information (e.g. UE ID, cell ID and RAN node ID), which may be used by core network (e.g., core network as referred to in FIG. 35A-FIG. 35D) to authenticate or authorize the indirect connection, and to create association between relay UE 202 and switching UE 201; or PDU session information (e.g., session ID, session type, quality of service (QoS) Flow Identifiers (QFIs), QoS profile and associated Single Network Slice Selection Assistance Information (S-NSSAI(s))). PDU session information may be used by the network to identify the PDU sessions that need to be modified due to the path switch. For example, the network may decide to move the anchor UPF by modifying the session or to establishing a new PDU session. UE policy that are sent to the switching UE previously: this information is used by network to decide what UE policy to be sent to the relay UE which may apply those UE policies on behalf of the switching UE after switching is completed.

At step 224, upon receiving the path switch request, AMF 204 may take several actions. AMF 204 may communicate with User Data Management Function (UDM) or User Data Repository (UDR) and PCF (e.g., NFs 205) to authorize and authenticate the requested path switch operation for switching UE 201. Relay UE 202 may also be authenticated and authorized to make sure that relay UE 202 supports the UE-to-Network relay function. Moreover, AMF 204 may check whether the current network slice supports the UE-to-Network relay. If not, AMF 204 may contact NS SF to select a new network slice. Otherwise, AMF 204 may use the current network slice to serve both UEs (e.g., switching UE 201 and relay UE 202).

If PCF determines to push certain UE policy to switching UE 201 or to relay UE 202, such as URSP, policy to manage the QoS mapping over PC5 or UE-to-Network relay policy, PCF may send the UE policy information to AMF 204, which may forward such policy information to either UE via NAS message.

At step 225, once AMF 204 completes the actions in step 224, it notifies the RAN node 203 about the upcoming path switch. The notification may include the following information: 1) registration management information; 2) connection management information; or 3) N2 path switch information, among other information. A path switch response message may be forwarded to switching UE 201. The path switch response may include some registration management or connection management information, such as the periodic registration update timer, DRX cycle. Moreover, the response includes the allowed NSSAI information. It is also possible that some UE policy information is sent from PCF (e.g., NF 205) via NAS.

N2 path switch information: an indicator may be added showing that path switch is initiated by switching UE 201 to create an indirect path, N2 connection information. N2 connection information may include N2 connection ID for each UE, QFI, or PDU session information that may be affected by the path switch, N3 tunnel information related to those affected PDU sessions that may be used to transfer data for the switching UE, or area restriction information which may indicate the area where switching UE 201 may be served by relay UE 202, among other information.

At step 226, RAN node 203 may forward the path switch response message to switching UE 201, which it receives in step 225. In addition, RAN node 203 may terminate the RRC connection and radio data connection that are directly connected to switching UE 201. However, RAN node 203 may not release switching UE 201 context information, since it may continue serving switching UE 201 via relay UE 202.

At step 227, with the response from core network, switching UE 201 establishes PC5 connection with the selected relay UE 202. At the same time, switching UE 201 may terminate the direct connection with RAN node. In some cases, such as switching UE 201 moves out of network coverage, this step needs to be performed after step 222, so that switching UE 201 is able to communicate with core network via the relay UE 202. When the PC5 Connection is established, switching UE 201 may provide PDU Session Context to the Relay UE 202. The Relay UE 202 may provide switching UE 201 with an PC5 PDU Session ID. The PC5 PDU Session ID may be provided by switching UE 201 each time it sends a PDU for the PDU Session via PC5.

Note that it is possible that switching UE 201 sends the path switch request to core network first (step 222), and then performs the direct discovery and relay UE 202 selection (step 223) plus PC5 connection establishment (step 227) after receiving the response from the network (step 226). In other words, switching UE 201 is first authorized by network for path switch, and then performs discovery and selects relay UE 202 for the path switch. If the path switch procedure is performed in such a sequence, relay UE 202 is responsible for communicating with AMF 204 and RAN node 203 to configure the registration or connection management parameters for switching UE 201. This is because switching UE 201 may be reachable only over PC5 communication at that time, for example, switching UE 201 moves out of the network coverage.

Figure 22:
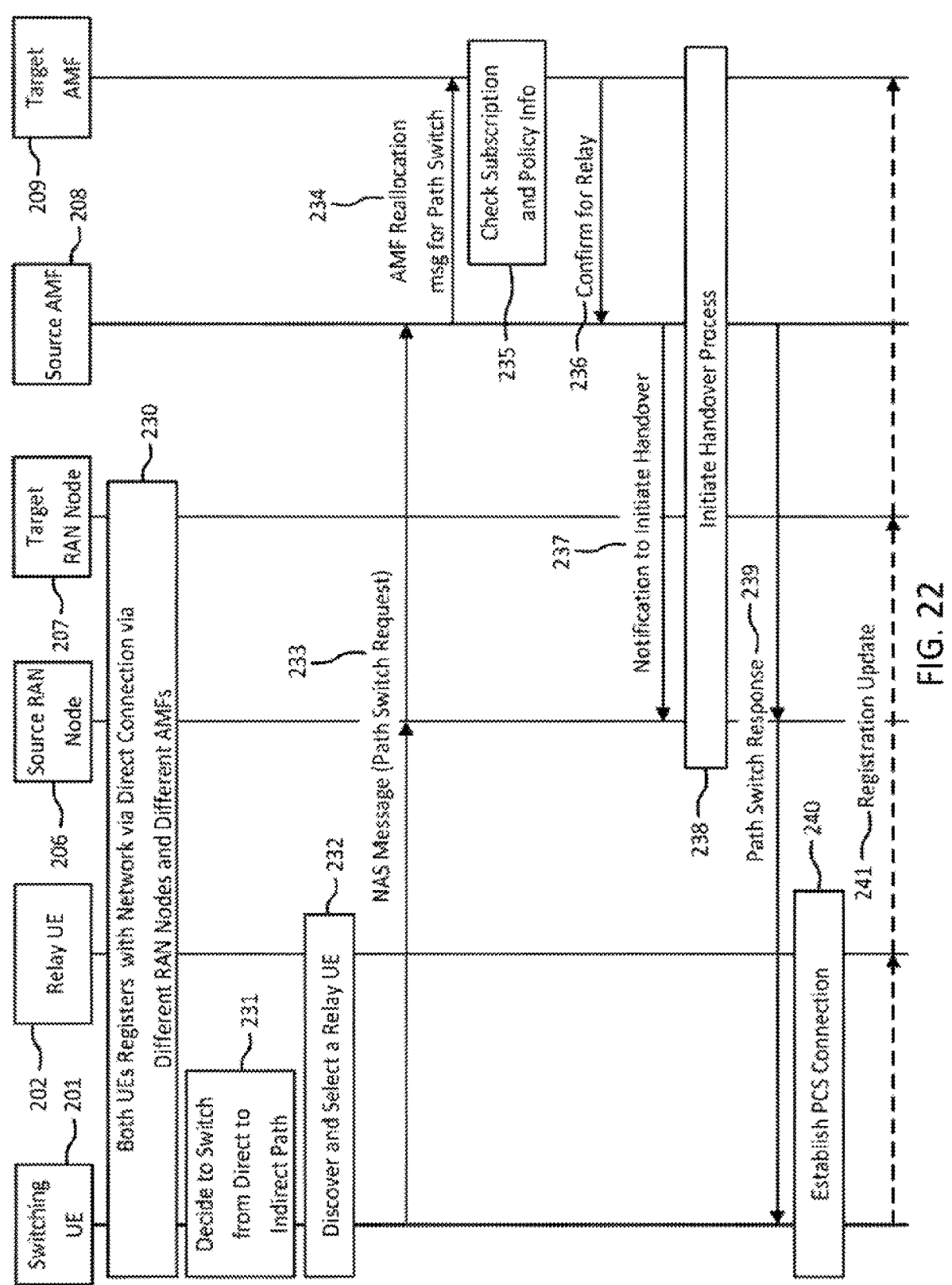
FIG. 22 illustrates an example registration management procedure for the UE switching from a direct to an indirect path under different RAN nodes and different AMFs.

FIG. 22 illustrates an exemplary registration management procedure for a UE switching from a direct to an indirect path under different RAN nodes and different AMFs. At step 230, both UEs (e.g., switching UE 201 and relay UE 202) may be registered with the network and served by their respective AMFs and RAN nodes.

In steps 231 and 232 of FIG. 22 are similar to step 221 and 222 shown in FIG. 21, in which one or more events trigger the UE to initiate the path switch. In response to the trigger, switching UE 201 performs the direct discovery in proximity and selects relay UE 202. At step 233, switching UE 201 may send a NAS message to its AMF 208, which may include the path switch request. The information included may be similar to the information listed in step 223 of FIG. 21 and elsewhere herein.

At step 234, source AMF 208 (switching UE 201's AMF) sends an AMF relocation request to target AMF 209 that is serving relay UE 202. The relocation decision may be made based on multiple factors (e.g., thresholds or triggers), such as the following: location of switching UE 201 is changed, so the source AMF 208 cannot continue to serve it; source AMF 208 is not able to support relay mechanism or certain required functionality related to relay; or source AMF 208 is not able to serve target relay UE 202, among other things. The address of target AMF 209 may be determined based on information received in step 233, such as relay UE 202's GUTI. The relocation request may include the following information: 1) Source AMF information; 2) Source RAN node information; 3) Switching UE 201 information or the associated network slice information; 4) Information of PDU sessions that may be affected by the path switch or the associated network slice information; or 5) Relay UE 202 information.

At step 235, target AMF 209 may perform the authentication and authorization with other NFs (e.g., PCF and UDM/UDR) regarding switching UE 201. After that, target AMF 209 may determine whether it accepts the relocation request (e.g., accepts the registration of switching UE 201). At step 236, target AMF 209 returns a response to source AMF 208 to confirm the path switch. Target AMF 209 may include target RAN node 207 information in the message. At step 237, upon receiving the confirmation for the path switch, source AMF 208 may notify source RAN node 206 to initiate the handover process for switching UE 201. Target RAN node 207 information may be included as well as target AMF 209 information.

At step 238, source RAN node 206 may initiate the handover process to handover switching UE 201 to target RAN node 207. An exemplary handover process that may be used is specified in Section 4.9.1.3 of 3GPP TS 23.502, Procedures for the 5G System; Stage 2, v15.4.1, 2019/01. At step 239. Once the handover is complete, source AMF 208 may send the path switch response to switching UE 201, indicating that the path switch is complete, the registration is updated, and switching UE 201 is connected with target AMF 209 and target RAN node 207 via relay UE 202. Source AMF 208 or source RAN node 206 may subsequently remove switching UE 201 context information and terminate the CP connection to switching UE 201.

At step 240, a PC5 connection may be established between switching UE 201 and relay UE 202. When the PC5 Connection is established, switching UE 201 may provide PDU Session Context to relay UE 202. Relay UE 202 may provide switching UE 201 with an PC5 PDU Session ID. The PC5 PDU Session ID may be provided by switching UE 201 each time it sends a PDU for the PDU Session via PC5. Switching UE 201 may provide PDU Session Context to relay UE 202. Relay UE 202 may provide switching UE 201 with a PC5 PDU Session ID. The PC5 PDU Session ID may be provided by switching UE 201 each time it sends a PDU for the PDU Session via PC5. At step 241, switching UE 201 may perform the registration update with the target RAN node and target AMF via relay UE 202.

Procedures of Session Management with Path Switch: If switching UE 201 has established a PDU session before the switch, depending on the SSC mode, core network may consider transferring the session context in order to provide the required session and service continuity for switching UE 201. It is possible that the anchor UPF may be changed, and that the relay UE 202 needs to get some session management context information from AMF in order to relay the traffic to or from switching UE 201. Disclosed herein are exemplary steps on how to perform the session management procedure due to the path switch from a direct path to an indirect path.

PDU session context may be transferred, not only because of a different anchor UPF or RAN node, but also because of a different UE (e.g., relay UE 202 terminates the session instead of switching UE 201) terminates the PDU session due to the path switch. In addition to the session management procedures defined in specifications 3GPP TS 23.501 and 3GPP TS 23.502, there may be some new interactions between switching UE 201 and relay UE 202, or between relay UE 202 and the core network functions, such as SMF and AMF, (see 3GPP TS 23.501, System Architecture for the 5G System; Stage 2, v15.4.0, 2018/12 and 3GPP TS 23.502, Procedures for the 5G System; Stage 2, v15.4.1, 2019/01.

Figure 23:
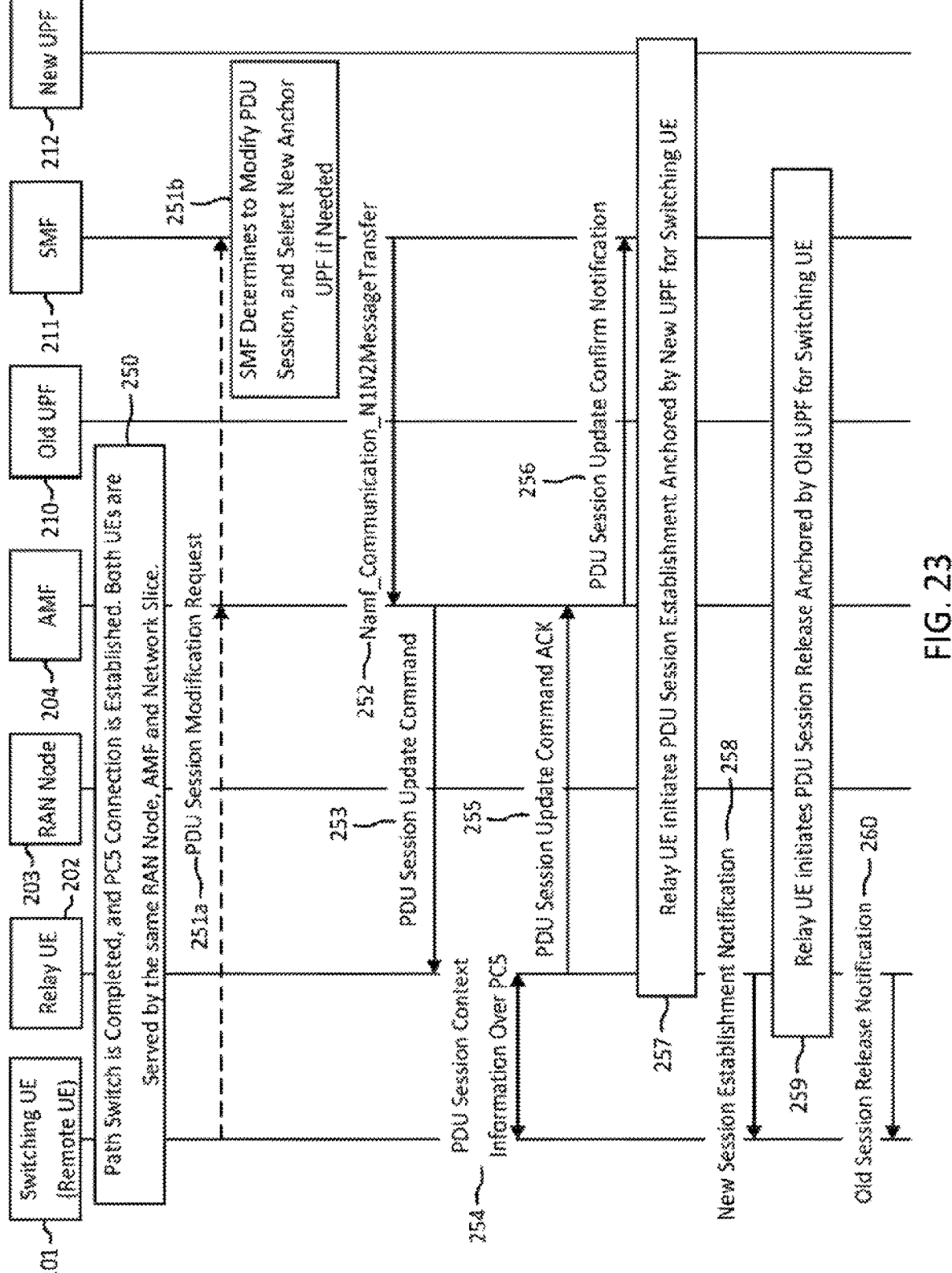
FIG. 23 illustrates an example procedure of PDU session modification procedure with a new anchor UPF when a UE switches from a direct path to an indirect path.

FIG. 23 illustrates an exemplary procedure of PDU session modification procedure with a new anchor UPF when a UE switches from a direct path to an indirect path. The session management procedure shown in FIG. 23 may be standalone or be performed along with the registration management procedures shown in FIG. 21 or FIG. 22, or integrated into the handover procedures. At step 250, it may be assumed that the registration management is completed for the path switch, which may include an indication of completion.

At step 251, SMF 211 may determine (e.g., identify) one or more PDU sessions that should be modified due to the path switch. SMF 211 may determine which one or more PDU sessions need update based on the collected session management information (e.g., PDU session ID and associated NSSAI for the switching UE 201, SSC mode, session type, QoS rules, and QoS profiles). The session management information may be collected from AMF 204 (or another AMF) or the old SMF (not shown in the figure) in case that the switching procedure leads to the SMF change which may be involved in the registration process trigged by the path switch.

Alternatively, as shown in step 251*a*, SMF 211 may receive a session modification request from switching UE 201 or relay UE 202 through SM NAS message on top of the NAS connection between switching UE 201 and AMF 204, since switching UE 201 may be aware of its PDU sessions that are affected by the path switch. SMF 211 may further determine whether a new anchor UPF is needed and select new UPF 212, if necessary.

At step 252, SMF 211 may send a SM NAS message to AMF 204 to request a PDU session modification. The message may include the following: N1 SM NAS information that is sent to relay UE 202; or N2 information that is sent to RAN node 203. N1 SM NAS information that is sent to relay UE 202 may include switching UE 201 ID, PDU session ID, session type, associated NSSAI, QoS rules, or DNN (Data Network Name). N2 information that is sent to RAN node 203 may include new anchor UPF address, PDU session ID, session type, associated NSSAI, QoS profiles and corresponding QFIs, tunnel information of the new UPF 212, or QoS parameters.

At step 253, AMF 204 may send PDU session modification message to the relay UE 202 via RAN node 203. In fact, it may incorporate the N2 information which is destined to RAN node 203 and N1 SM NAS information which may be delivered to relay UE 202. At step 254, upon receiving the SM NAS message, relay UE 202 updates the PDU session context information and the QoS rules for the switching UE 201. If the session is dedicated for relaying traffic, relay UE 202 may insert an indication to the PDU session context along with switching UE 201 ID (e.g., 5G-GUTI, layer 2 ID). In addition, relay UE 202 may communicate with switching UE 201 about the session modification over the PC5 link, including session ID, session type and QoS rules. Switching UE 201 may provide PDU Session Context to relay UE 202. Relay UE 202 may provide switching UE 201 with a PC5 PDU Session ID. The PC5 PDU Session ID may be provided by switching UE 201 each time it sends a PDU for the PDU Session via PC5.

At step 255, relay UE 202 may send an ACK to AMF 204 to confirm that the session modification process is completed at relay UE 202 or switching UE 201. At step 256, consequently, AMF 204 notifies SMF 211 about the completion of the PDU session modification at both UEs. At step 257, relay UE 202 initiates a PDU session establishment process with the new anchor UPF on behalf of switching UE 201. This step may be triggered by the command relay UE 202 receives in step 253, and relay UE 202 may include the information that is received in step 253.

At step 258, relay UE 202 notifies switching UE 201 over PC5 about the completion of the PDU session establishment anchored by the new UPF 212. It is possible that this step is combined with step 260, so that one notification is sent to switching UE 201 about the completion of step 257 and step 259. At step 259, relay UE 202 then may initiate the session release procedure for the session anchored at Old UPF 210. At step 260, relay UE 202 may also notify switching UE 201 that the session anchored by the Old UPF 210 is released.

FIG. 23 shows the procedure of PDU session modification for the switching UE 201, which may be based on an assumption that the session is solely used for the switching UE 201 traffic. Since switching UE 201 relies on relay UE 202 to get any data traffic, it is also possible that a PDU session that is already established for relay UE 202 may be used to transfer data between relay UE 202 and anchor UPF (e.g., the new UPF) for the switching UE 201. In this case, SMF 211 may do the following: Determine that the existing PDU session established for the relay UE 202 traffic can be used to transfer traffic for the switching UE 201; Notify the RAN node 203 and relay UE 202 via AMF 204 about the necessary PDU session modification; and Release the PDU session, as disclosed in more detail below.

SMF 211 may determine that the existing PDU session established for the relay UE 202 traffic can be used to transfer traffic for the switching UE 201. So, there may be no need to select a new anchor UPF nor to move the existing PDU session. However, it may need to update the session context information. For example, update QFI and QoS profiles, and QoS rules associated with the PDU session for supporting the traffic for the switching UE 201. Moreover, the IP address of the switching UE 201 may be changed, since the IP address is allocated for the old session to be released. SMF 211 may notify the RAN node 203 and relay UE 202 via AMF 204 about the necessary PDU session modification. Relay UE 202 may further notify the switching UE 201 over PC5 with the necessary session context information. Further SMF 211 may release the PDU session anchored at the old UPF that is established for the switching UE prior to the path switch.

Switching from Indirect Path (PC5) to Direct Path (Uu): In this case, switching UE 201 may not register with network when it connects to core network through an indirect path. If switching UE 201 has not registered with network and aims to establish a direct connection to network, switching UE 201 should start the initial registration process, followed by service request or PDU session establishment procedure. Otherwise, switching UE 201 may initiate registration update process, which may further trigger the AMF relocation procedure as the core network may determine to move some UE context to a different AMF so that switching UE 201 is able to connect to core network through a direct path.

Note that with an indirect connection, switching UE 201 does not have to register with network, e.g., it is possible that the UE registers with network, and it is also possible that the UE does not register with network.

Figure 24:
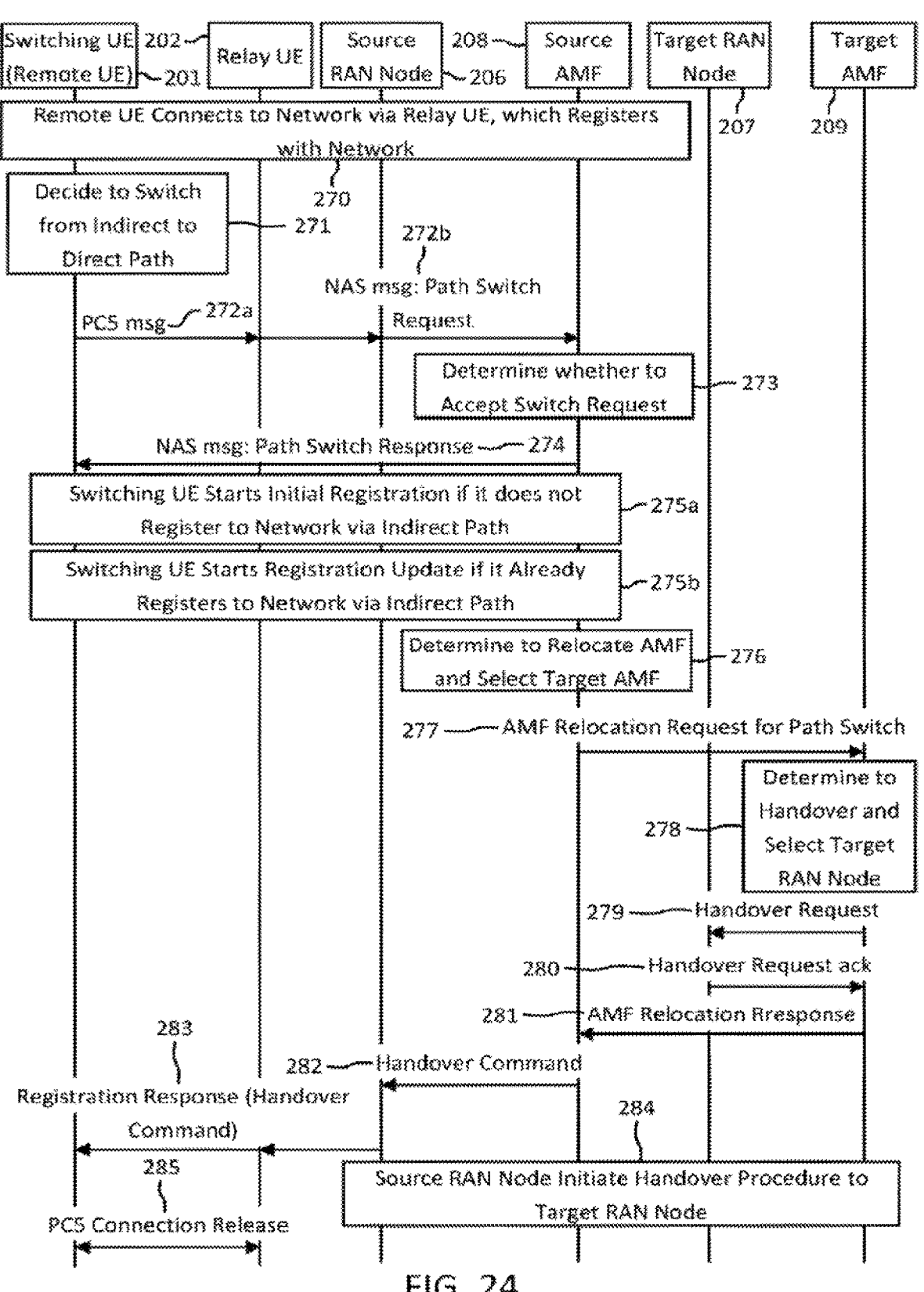
FIG. 24 illustrates an example registration management procedure for a UE that intends to switch from an indirect to a direct path.

FIG. 24 illustrates an exemplary registration management procedure for a UE that intends to switch from an indirect to a direct path, where it may be assumed that a different RAN node and AMF are selected for switching UE 201 in the direct path. FIG. 24 may also cover the cases where the RAN node or the AMF remains the same.

At step 270, PC5 connection may be established between switching UE 201 and relay UE 202. Switching UE 201 may have an indirect path to network as a remote UE. Switching UE 201 as a remote UE may not register with network while having the indirect connection. At step 271, the remote UE (e.g., switching UE 201) determines to establish a direct path to the network based on one or more triggering events, such as unavailable relay UE 202, enhanced network coverage, reaching a threshold to access to certain types of network service, or out of service area of relay UE 202.

At step 272a, switching UE 201 sends a request to relay UE 202 over PC5 indicating that it wants to establish a direct connection to network. Specifically, an indicator is inserted showing the switch from indirect to direct path. This may be delivered over PC5 link. If switching UE 201 registers with the network, it encapsulates a NAS message in the PC5 message with the following information: its UE ID, allowed NSSAIs, PDU session context information, UE policies that it has, and information of AMF that it connects to. Switching UE 201 may provide PDU Session Context to relay UE 202. Relay UE 202 may provide switching UE 201 with an PC5 PDU Session ID, The PC5 PDU Session ID may be provided by switching UE 201 each time it sends a PDU for the PDU Session via PC5.

At step 272b, upon receiving the request from switching UE 201, relay UE 202 may send the NAS message to source AMF 208. If switching UE 201 registers with network before the switch, this source AMF 208 may be the AMF serving switching UE 201. In other words, switching UE 201 may have the NAS connection with source AMF 208, and relay UE 202 does only the forwarding. Otherwise, source AMF 208 may be the AMF serving relay UE 202. Relay UE 202 may insert some additional information in the NAS message, such as relay UE 202 ID or network slice information.

At step 273, source AMF 208 may determine whether to accept the switch request based on the information received from step 272. At step 274, source AMF 208 may send a path switch response to relay UE 202 indicating whether the switch request is accepted or not. The following steps usually occur when the path switch request is accepted.

At step 275a, if switching UE 201 has not registered with network, it may start an initial registration process via the indirect path. At step 275b, if switching UE 201 has registered with network, it may start a registration update process via the indirect path. At step 276, source AMF 208 may receive the request from switching UE 201 and determine that it is necessary to relocate the AMF due to some reasons, e.g., requested NSSAI is not supported by source AMF 208. Source AMF 208 may select a new AMF. This may be done with the assistance of NSSF.

At step 277, source AMF 208 may send AMF relocation request to the selected AMF (e.g., target AMF 207), indicating the relocation is triggered by path switch. Moreover, source AMF 208 may forward information it receives in step 275 for registering switching UE 201. At step 278, upon receiving the AMF relocation request, target AMF 207 may check the information received in step 277 and determine that handover is required. Target AMF 207 may select a new RAN node. The selection may be based on several factors (e.g., triggers), such as switching UE 201 location or switching UE 201's determination to connect to a certain RAN node based on the measured signal strength. At the same time, target AMF 207 may perform the registration or registration update process for switching UE 201. This may require some interactions with PCF or UDR/UDM to check the policy information or subscription information of switching UE 201.

At step 279, target AMF 207 may send a handover request to selected target RAN node 207, indicating some N2 information such as N2 connection information, and some switching UE 201 information, such as UE ID and UE radio capability information.

At step 280, target RAN node 207 may return a handover request ACK to target AMF 207, indicating that it has updated the UE information and it is ready for the handover process. At step 281, target AMF 207 returns an AMF relocation response to source AMF 208 confirming that it accepts the request. Target RAN node 207 information is included as well. In addition, target AMF 207 may return the registration information of switching UE 201 in the registration accept message, such as allowed NSSAI, UE ID, or registration/connection management parameters, such as DRX cycle or registration update timer.

At step 282, source AMF 208 may send a handover command to source RAN node 206, which may request the RAN node to initiate the handover process. Target RAN node 207 information received in step 281 may be included. The registration accept message may be encapsulated in the N2 handover command. The registration accept message as N1 NAS message may be transferred from AMF to base station inside the N2 message. At step 283, source RAN node 206 may forward the registration accept message to switching UE 201 via relay UE 202. At the same time, source RAN node 2016 may notify both UEs that handover may be performed with new target RAN node 207.

At step 284, source RAN node 206 may initiate the handover process with target RAN node 207. An example of the handover process is provided in Section 4.9.1.3 of 3GPP TS 23.502, Procedures for the 5G System; Stage 2, v15.4.1, 2019/01. At step 285, after both UEs are notified that handover is finished, PC5 connection may be released. Switching UE 201 may have a direct connection to target AMF 207 via target RAN node 207.

Procedures of Session Continuity and Service Continuity: If the switching UE 201 has established one or more PDU sessions via the relay UE 202 before path switching, depending on the session continuity and service continuity mode, switching UE 201 may determine that the PDU session should move these PDU sessions after the switch without service interruption.

There are different scenarios that may require different methods to manage the existing PDU session for the switching UE 201. In a first scenario, a PDU session may be established by relay UE 202 for transferring both switching UE 201's (e.g., remote UE) traffic and the relay UE 202's traffic. This means that the data traffic for both relay UE 202 and switching UE 201 may be transferred over the same PDU session before the switch, although the switching UE 201 may not be aware of this because relay UE 202 forwards its traffic to or from the UPF in the core network. Disclosed herein is a method to establish a new PDU session for switching UE 201, and to update the PDU session context information at relay UE 202 for the old PDU session established, which may be continuously used for relay UE 202's traffic.

A PDU session may be established and dedicated to the switching UE 201's traffic before the switching. In this case, SMF 211 may work with AMF to transfer the UE session management (SM) context to the new UPF if a new UPF is necessary, or to the new RAN node if a new RAN node is selected in the direct path.

Figure 25:
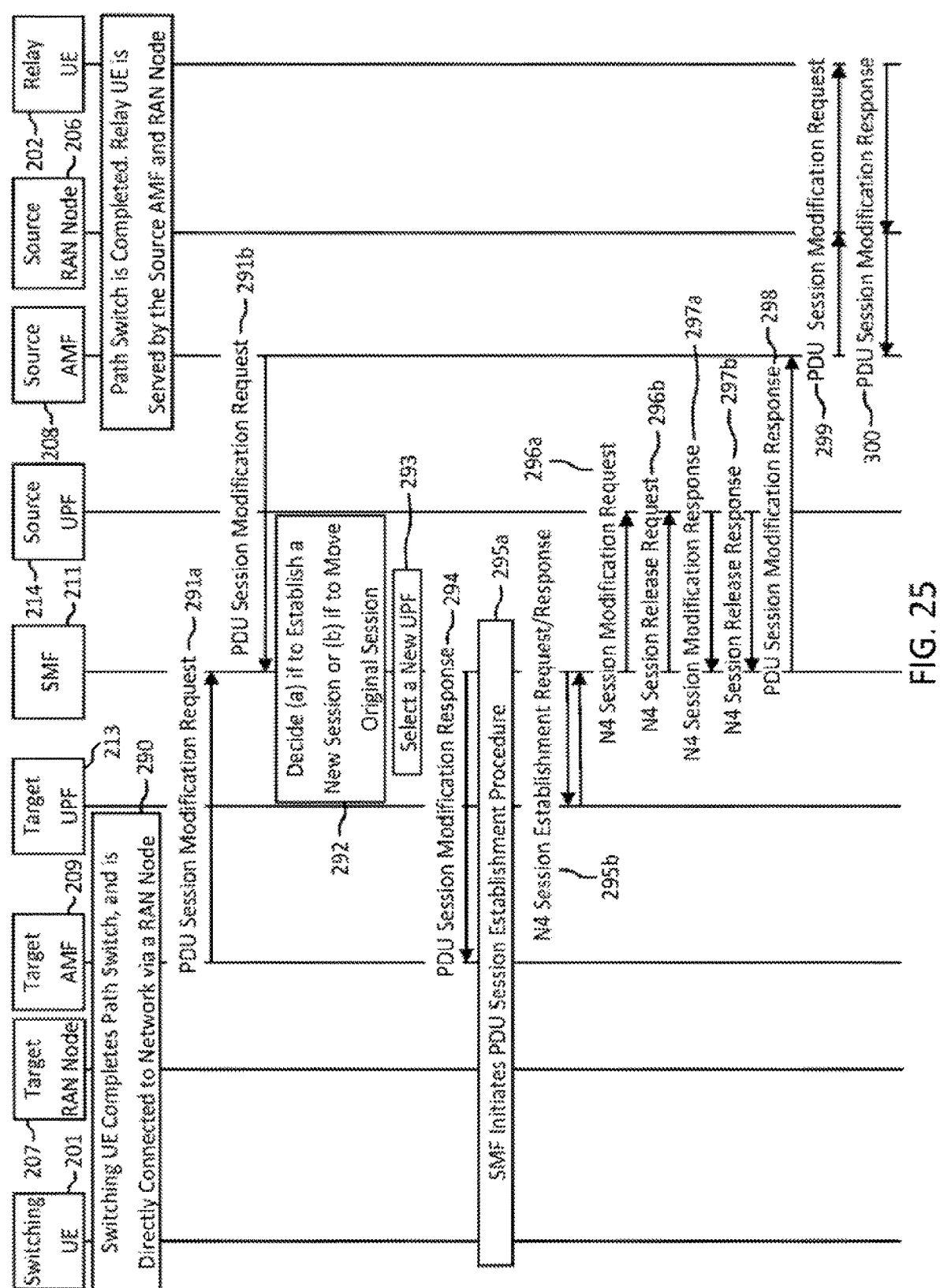
FIG. 25 illustrates an example procedure of PDU session management due to the path switch from indirect to direct path.

FIG. 25 illustrates an exemplary procedure of PDU session management due to the path switch from indirect to direct path, where it may be assumed that a new AMF and RAN node is selected to serve switching UE 201 in the direct path, and that a different anchor UPF is selected. It is noted that the session management procedure under other scenarios can be covered by FIG. 25 (e.g., anchor UPF may not be changed, under the same RAN node, under the same AMF, or any combination). The session management steps shown in FIG. 25 may also be performed along with the registration related procedures such as FIG. 24 or integrated into the handover process.

At step 290, path switch may be completed. Switching UE 201 and relay UE 202 may have direct connection to the network (e.g., core network) via different RAN nodes and AMFs. At step 291*a*, switching UE 201's AMF (e.g., target AMF 209) may send a PDU session modification request to SMF 211 identifying the sessions that are affected by the path switch and should be modified (e.g., modified based on a factor). PDU session modification request may include PDU session ID and associated NSSAI, QoS profiles and the corresponding QFIs, or N3 tunnel information. At step 291*b*, relay UE 202's AMF (e.g., source AMF 208) may also send a PDU session modification request to SMF 211 indicating that one or more sessions established for switching UE 201 should be modified, as disclosed herein.

At step 292, if the old PDU is used to transfer data for both switching UE 201 (as remote UE) and relay UE 202 (e.g., scenario A), then SMF 211 may determine to establish a new PDU session. This determination may be triggered by the PDU session modification request sent in step 291. For example, SMF 211 may determine to establish a new session or update an existing session. If the old PDU session is dedicated for switching UE 201' traffic (e.g., scenario b), the SMF 211 may determine to update the PDU session to continue serving the switching UE 201. At step 293, in either case of step 292, SMF 211 may select an anchor UPF (e.g., target UPF 213) for switching UE 201. It may be assumed that a different anchor UPF is selected.

At step 294, in the case that the old session is shared by relay UE 202 and switching UE 201, SMF 211 may determine to establish a new PDU session. Because the old session is expected to continue serving the relay UE 202, SMF 211 may send a PDU session modification response message to AMF indicating that a new PDU session may be established, including the session ID with associated NSSAI, session type, QoS profiles with QFIs, SSC mode, or N3 tunnel information. In case that the old session is dedicated for switching UE 201, SMF 211 may notify the AMF that the old PDU session may be moved to continue serving switching UE 201, with the new UPF address and session context information of the old PDU session.

In the step 295-step 297, different step numbers associated with a or b are shown for scenarios a and b respectively, as examples.

At step 295*a*, SMF 211 may initiate a PDU session establishment process with a new UPF (e.g., target UPF 213), which is specified in Section 4.3.2 of TS 23.502.

At step 295*b*, in case b which the old session may be moved and anchored by a new UPF, SMF 211 sends an N4 session establishment request to the new UPF, including the session ID with associated NSSAI, session type, DNN, QoS parameters, and packet detection rules.

In view of step 295, the new UPF returns the response with N3 tunnel information.

At step 296*a*, SMF 211 may send an N4 session modification request to the old UPF (e.g., source UPF 214), asking to modify the session context of the old PDU session. The modification is expected to remove any session context information (such as QoS profile and QFIs for the data flow from switching UE 201) related to the switching UE 201, while keeping the session context for the relay UE 202.

At step 296*b*, SMF 211 sends N4 session release request to the old UPF since PDU session may be anchored at the new UPF. The old UPF may not be involved any more.

At step 297*a*, old UPF may return the response indicating whether the PDU session modification is successful or not.

At step 297*b*, old UPF may return the response indicating whether the N4 session release is successful or not.

At step 298, optionally, SMF 211 may return the PDU session modification response to the source AMF 208, if step 291*b* is executed.

At step 299, source AMF 208 may send a PDU session modification request to the relay UE 202 via RAN node. For scenario A, there may be an indication that the old PDU session may not serve switching UE 201, so the related session context information may be removed by relay UE 202, such as QoS rules for switching UE 201's traffic, while relay UE 202 maintains the remaining session context information since its own traffic may be still carried over the PDU session. For scenario B, there may be an indication that the PDU session is moved to a new anchor UPF and relay UE 202 may remove the session context information related to the PDU session. This message may be delivered as SM NAS message with the session management context received in step 298. In addition, an N2 message is sent to RAN node so that the RAN node can also modify the PDU session context as well. At step 300, relay UE 202 returns the response to source AMF 208 indicating that the modification is completed.

Path Switch in Multi-hop Relay Scenario: As disclosed herein, path switch in the context of multi-hop relay includes more scenarios, such as 1) switch between two PC5 interfaces: or 2) switch between Uu and PC5. For the first scenario, there may be a switch between two PC5 interfaces, which may be within the same multi-hop relay chain or across two multi-hop relay chains. For the second scenario, there may be a switch between Uu and PC5, while the PC5 link is between a remote UE and UE-to-UE relay, or between two UE-to-UE relays instead of UE-to-Network relay. This scenario between Uu and PC5 may be covered by the methods disclosed herein. Other extra steps may be regarding the information forwarding by the UE-to-Network Relay. Therefore, this section may focus on the first scenario, e.g., path switch between multiple PC5 interfaces.

Path Switch between PC5 within a Multi-hop Relay Chain: Depending on the configuration about how to manage a multi-hop relay chain, the path switch between multiple PC5 may be managed by the UE-to-Network relay, while the network may not even be aware of the path switch. This is the distributed multi-hop relay chain management. In other words, the UE-to-Network relay is likely to manage the path switch. There may be no impact on the RAN node or network side.

If the network wants more control of the multi-hop relay operation, the UE-to-Network relay may report the path switch occurrence to the network. Network function may authorize the switch and store the relay chain adjustment. However, network and RAN node may not need to change anything. This is because the path switch may be done behind the UE-to-Network relay, from network and RAN node perspective, the contact point (e.g., the UE-to-Network relay) to reach UEs in the relay chain remains the same. That implies that both CP and UP configuration remain the same.

Path Switch between PC5 across Different Multi-hop Relay Chains: If the path switch is between two PC5 connections, for example, across two different multi-hop relay chains, then network and RAN node may update the CP and UP configuration. This may be because some UE may have switches from one relay chain to another, network and RAN node needs to be aware of the change, so that the message can be forwarded to the appropriate the UE-to-Network relay from network and RAN node. In addition to the procedures and information elements presented herein (e.g., Switching from Indirect Path (PC5) to Direct Path (Uu) or Switching from Direct Path (Uu) to Indirect Path (PC5), among others), some additional information may be included as follows: multi-hop relay chain ID associated with the UE-to-Network relay information; or multi-hop relay policy.

Multi-hop relay chain ID associated with the UE-to-Network relay information: this may be used to identify which relay chain a UE joins. So that network knows how to reach the UE. Note that the network may not be aware of exact connection to a UE. It is good enough for network and RAN node to know only the UE-to-Network relay to reach the UEs in the relay chain.

Multi-hop relay policy: this may be used by a network to manage the path switch process, e.g., whether to accept the UE's path switch request considering the maximum number of UEs allowed in the relay chain or the maximum number of hops away from the base station, among other things.

Network Controlled Path Switch: Procedures are disclosed herein where the UE has the main role in selecting the path and triggering a path switch. In some implementations, the network may control the way the relay chain is constructed and trigger the path switch in certain conditions, as provided in some of the exemplary scenarios herein.

In a first scenario, the network monitors UE measurements e.g. the energy level of a UE and finds that the UE runs out of energy. In order to save energy consumption, the network may select an appropriate relay UE 202 and ask the UE to switch from direct to indirect connection.

In a second scenario, the network has the mobility pattern and traffic pattern of a UE. By analyzing and predicting the upcoming mobility or traffic event at the NWDAF, the network may initiate the path switch for a UE.

In a third scenario, an application server requests network to initiate a path switch procedure for a specific application data flow requirement. For example, the V2X application finds out that a remote UE joining a multi-hop relay chain may encounter a performance degradation for the V2X service, thus it requests network to initiate a path switch, so that the remote UE may switch to another relay UE 202 to get required QoS performance.

In a fourth scenario, a network monitors the location of the UE and finds out that the UE enters a certain area where the coverage is weak, so determines to trigger the path switch to the UE.

In a fifth scenario, a network maintains the traffic pattern indicating the UE has different data rate requirements at different time window, so the network may trigger the path switch to adjust to the high or low data rates for the UE.

In addition to the cases above where the network may control both relay chain construction and path switch triggering, this method may include the following cases. In a first case, the network determines only the relay chain construction and relies upon a request from UE or AS to trigger the path switch. In a second case, the network determines mainly the timing of the network path. In this case the network may also provide information about the target path, but the UE has the main role in selecting the path, as described herein.

When controlling the relay chain construction or the path switch triggering, the network (e.g., AMF or SMF 211) may provide the UE the following information: cause of the path switch, path switch direction, target relay, optimization information, application related information, or registration information, among other things. For example, the cause of the path switch may be associated with a factor such as a trigger based on UE out of coverage, by a trigger based on an AS, or by a trigger based on power consumption, among other things. The path switch direction may be associated with a factor such as an indication of a change from direct to indirect, an indication from a change from indirect to direct, or in an indication of a change from a first PC5 to another PC5.

With continued reference to information the relay may be provided, the information may include the target relay UE 202(*s*) selected by the network in case of from direct to indirect and from a PC5 to another PC5. This may include related information such as: specifying the entire target relay chain, providing a set of relays to be used by the UE to start its chain formation, etc. In an example, a multi-hop relay chain ID may be provided to all of the UEs in the chain to optimize chain formation. This may also include security information such as a token provided to all the UEs in the chain to optimize authorization of the chain formation.

Further, the information may include information to optimize discovery of the new relay chain/path, e.g. layer 2 ID, radio resource information, etc. The radio resource information may determine that the communication uses different radio resources after the path switch. Further, the information may include application related information, such as application ID or QoS parameters of the application data flow. In addition, the information may include one or more indications regarding whether switching UE 201 may keep registration after switching in case that the switching UE 201 has registered with network before the switching.

The information may be provided to the UE in a NAS notification, a PDU Session Modification Command, or a UE Configuration Update. At the same time, the network (e.g., AMF or SMF 211) may send the path switch request to network functions following the procedures and figures introduced herein.

As described herein, the PCF may push UE-to-Network relay policies to the UE in a NAS message. These policies may be used by the UE to determine when to use a relay and when to use a direct Uu connection.

Each UE-to-Network relay policy may include a policy identifier. The policy identifier may be provided by the UE, to the network, whenever the UE initiates a path switch. The network may use this information as analytics information and to check what policy caused the UE to initiate or request, the path switch.

As described above, the determination to switch a path may be based on UE measurements, UE location, or the UE's anticipated mobility pattern. Thus, the policies that are provided to the UE describe how the UE may use UE measurements, UE location, or the UE's anticipated mobility pattern in order to determine whether a path switch should be performed and when a path switch should be performed.

Network Controlled Interactive Services (NCIS): Described in more detail below is the process by which a UE may join, or be added to, an NCIS group, how a UE may be provisioned with policies that relate how it should handle NCIS traffic, or how charging information related to the group's PC5 activity is reported, among other things.

Figure 26:
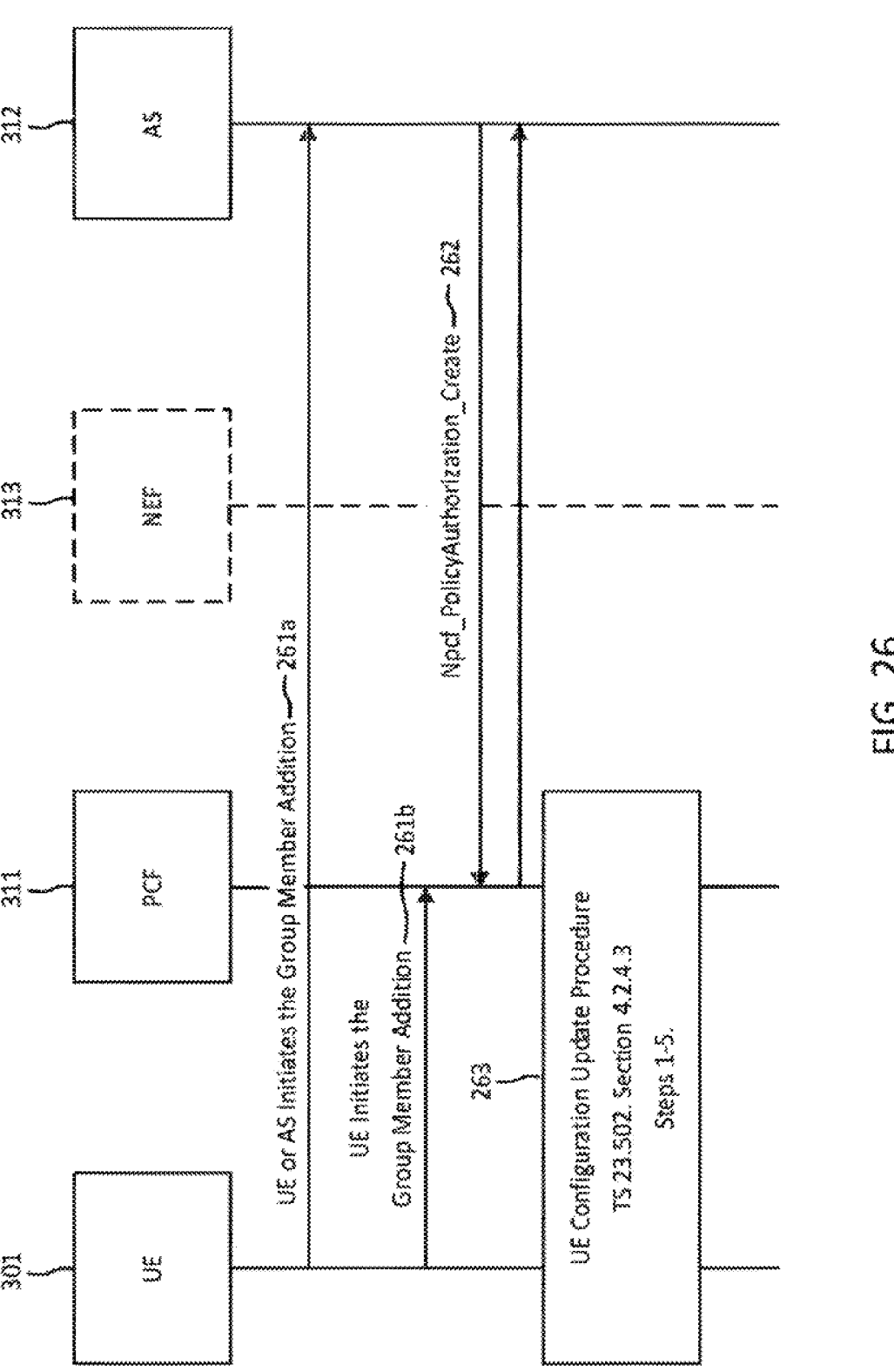
FIG. 26 illustrates an example method for joining an NCIS group.

Joining an NCIS Group: FIG. 26 illustrates an example method for joining an NCIS group. UE 301 may join a group based on application layer interaction where an application on UE 301 may send a request to application server 312 (AS 312) to join an NCIS group and application server 312 may respond with an indication that UE 301 is now part of the NCIS group. Or application server 312 may send a notification or request to UE 301 letting it know that UE 301 is now part of an NCIS group and UE 301 may respond with an indication acknowledging that it is part of the NCIS group.

Once a UE 301 joins a group, application server 312 may send a request to the PCF 311 to request that UE 301 be added to the NCIS group. This may cause PCF 311 to send policies for the NCIS group to UE 301. The request from application server 312 to PCF 311 may be sent via NEF 313.

With continued reference to FIG. 26, in step 261, as shown in step 261*a*, application layer interaction between UE 301 and application server 312 may cause application server 312 and UE 301 to determine that UE 301 is now part of the NCIS group. UE 301 may send a UE Policy Provisioning Request (as described in TS 23.287, section 6.2.2, steps 1 and 2). The UE Policy Provisioning Request may include an indication of what NCIS group UE 301 attempts to join or determines it should join. When UE 301 invokes step 261*b*, step 262 becomes optional. The NCIS group identifier may be formatted such that it may be resolved, by PCF 311, to determine that PCF 311 (or other NF) is responsible for authorizing the request and providing the policy. For example, the NCIS group identifier may consist of a field that identifies the MNO or third party who sets policies for the NCIS group. This field may be used by the PCF 311 to determine what network function (e.g., other PCF 311) or server (e.g., AS) the policy can be obtained from.

In step 262, AS 312 invokes the NPCF PolicyAuthorization Create service operation to update or create a policy that is associated with the NCIS group. The request, or policy, may be NCIS Group specific in that it may detail a single policy that applies to all UEs in the NCIS Group and the policy itself may list what UEs are part of the NCIS group. The request may be UE 301 specific and it may simply indicate that UE 301 is, or is no longer, part of the NCIS group. The detailed information that may be provided by AS 312 for the NCIS URSP Policy is detailed below. Invocation of this service by AS 312, with PCF 311, may occur via NEF 313. Note that AS 312 may need to update the policies of multiple UE 301*s*, or groups of UEs, some of which may be associated with different MNOs. Thus, AS 312 may need to perform this operation with multiple networks (e.g., via different NEFs).

In step 263, UE Configuration Update procedure may be initiated by PCF 311 to send the NCIS policy to the UE as described in section 4.2.4.3 of TS 23.502. The UE Policies that are delivered to UE 301 may indicate to UE 301 that UE 301 is now part of the NCIS group. The policy may further indicate what other UEs are part of the group and provide the UE information so that charging reports for activity within the group can be properly reported. The content of the NCIS URSP Policy is detailed below. This procedure may also be used to remove UE 301 from an NCIS group. For example, UE 301 may be removed from an NCIS group by performing the UE Configuration Update procedure to remove the policy that tells UE 301 that it is part of the group. Note that the method disclosed herein, unlike conventional methods, may use this procedure to send the NCIS group policy to the UE.

As mentioned herein, many of the steps may be skipped to execute different technical effects. For example, step 261 may be optional. Application server 312 may independently determine that UE 301 should be added to an NCIS group and trigger step 262. The UE configuration update, with updated NCIS policies, may then serve as UE's notification that UE 301 is now part of the NCIS group.

The NCIS group identifier may have a field that identifies a sub-group, alternatively, there may be an NCIS sub-group identifier. When UE 301 is configured with NCIS group information, it may be configured with information about what NCIS sub-groups it is also associated with. This information may be used by UE 301 to filter out certain information that is associated with the NCIS group, but not interesting to UE 301. This feature may be useful in a gaming scenario where players are part of the same NCIS group, but members of different teams may be part of different sub-groups. In sub-grouping, information may be used by UE 301 to filter out information that is associated with other teams and not useful to UE 301.

Contents of an NCIS URSP Policy: An NCIS policy may be a type of UE Route Selection Policy Rule. However, NCIS policies may be evaluated by UE 301 before other URSP rules. Thus, a URSP rule may include an indication of whether or not it is an NCIS rule. NCIS rules may generally be evaluated first because NCIS traffic generally requires special treatment from the network (e.g. low latency) and may need to be sent via specific routes (e.g., slices). Inclusion of an NCIS rule in the URSP rule may be avoided by assigning NCIS rules a higher Rule Precedence. However, if NCIS rules are to be evaluated first, this would require that the network update the Rule Presence of all, or many, URSP rules. Thus some or all URSP rules may need to be sent to UE 301 each time an NCIS rule is updated or deleted. This indication may be part of the Connection Capabilities field of the URSP rule.

An NCIS URSP rule may further include an indication of whether traffic for the service may be sent via PC5, Uu, or both Uu and PC5. Furthermore, there may be an indication that the traffic is restricted from being sent to PC5 or Uu.

The NCIS URSP rule may further list the identities of the other UEs that are in NCIS group. The format of the identifiers of the other UEs may be a Layer-2-ID. Alternatively, the other UEs may be identified with a combination of a Layer-2-ID and another ID such as an Application ID or ProSe Device ID. Alternatively, the other UEs may be identified with an External Identifier as defined in TS 23.682.

The traffic descriptor of the NCIS URSP rule may include the identities of the other UEs in the group or an indication that it should be applied when communicating with any other UEs in the NCIS group. In other words, it may indicate to UE 301 that the traffic should be considered as matching the NCIS URSP rule when the destination for the traffic is one of the other UEs in the group.

The NCIS URSP rule may include an indication that any traffic that matches the traffic descriptor may need to be transmitted on multiple (e.g., two) interfaces, such as PC5 and Uu. For example, when such a PC5/Uu indication is present, UE 301 may check if other NCIS group members are available for PC5 communication. Checking if other group members are available for PC5 communication may entail checking if other NCIS group member UE 301s are sending a broadcast, groupcast, discovery, unicast, or direct communication request thus indicating that they are available for PC5 communication. The presence of traffic to be sent and the availability of other group members for PC5 communication may cause UE 301 to establish a PC5 link with the other group members. Checking if other group members are available for PC5 communication may also entail checking if a PC5 link has been established with other group members. UE 301 may also send the same data over its Uu interface to an NCIS server which may route the data towards other UEs in the group. In this type of scenario, the associated USRP rule may indicate that the data should be sent over multiple routes, such as a PC5 route and a Uu route. UE 301 may also determine to not send the same data over its Uu interface to an NCIS server. For example, UE 301 may decide to not send the data to an NCIS server if the UE 301 has determined that all UE 301's in the group are available for PC5 communication or if the NCIS URSP rule indicates that traffic for the NCIS group should only be sent over PC5.

The NCIS Rule may include discovery, or announcement, or broadcast rules so that UE 301 knows what information and identities it is allowed to advertise so that other NCIS group members can discover UE 301 or the NCIS group.

The NCIS rule may include contact information for an ADF that charging reports that are associated with the traffic should be sent. As described herein, policies, such as V2X policies, may provide UE 301 with an IP Address of an ADF for where charging reports should be sent. However, such policies tell UE 301 that all charging reports should be sent to a single ADF. In some cases, it is desirable to send the charging reports for traffic that is associated with each service to a different ADF. For example, in a scenario where the service is associated with a private network, the reports may need to be sent to an ADF in the private network. Thus, it is disclosed that ADF contact info be included in the NCIS rule, which may include a traffic descriptor that describes what kind of traffic matches the NCIS, so that UE 301 will be informed to send charging reports that are associated with the NCIS to an ADF that is associated with the service. The NCIS rule may further include a Charging Reporting Identifier that should be included in all reports so that the ADF can know what NCIS the traffic is associated with. If the charging identifier is unique to the UE 301, or NCIS group, the charging identifier can be used by the ADF to determine what UE 301 or NCIS group generated the report. The NCIS rule may further indicate if the traffic will be considered sponsored on PC5 or Uu. Disclosed herein, unlike in conventional systems, ADF contact information may be included in a policy that is sent to a UE.

UE 301 may be provided with multiple ADFs to send charging reports to. This may be desirable in cases where reports need to be sent to the HPLMN (home public land mobile network) or the PLMN (public land mobile network) that is associated with the spectrum that was used for PC5 communication. Alternatively, the UE 301 may send the report to one ADF, but the message that carries the report may indicate to the ADF that a CDR should be sent to multiple entities. The policy that was provided to UE 301 may indicate what entities (e.g., MNO's or third parties) should receive the CDR's so that UE 301 may provide the identities to the ADF and the ADF can then send a CDR to determined destinations.

It is also disclosed that a Transmission ID for Charging Identifier be included in each NCIS URSP rule. The Transmission ID for Charging Identifier may be included in unicast, broadcast, or groupcast messages that are sent over the PC5 reference point, UEs that receive the unicast, broadcast, or groupcast may include the Transmission ID for Charging Identifier in a report that they send that captures information about reception of the unicast, broadcast, or groupcast message. For example, the report to the ADF may indicate the number of bytes that were received in the message, the location of UE 301 when the message was received, and the Transmission ID for Charging Identifier. The ADF may use the Transmission ID for Charging Identifier to determine what UE 301 sent the message or verify the identity of UE 301 that sent the message.

The NCIS URSP Policy may also indicate maximum data rates, message sizes, or number of messages that UE 301 may send within a unit of time.

The NCIS URSP Policy may include a group existence time. When the group existence time has passed UE 301 may delete the policy, ignore it, or prevent it from being applied.

The NCIS URSP policy may include an indication of whether online charging, offline charging, both online and offline charging, or neither are enabled for the NCIS Group.

The NCIS URSP Policy may include an indication of whether lawful intercept is enabled for the NCIS Group, for certain Layer-2 ID's, for certain Application ID's, or certain ProSe Device IDs. Additionally, a lawful intercept data sink address may be provided within the policy. Note that the term "lawful" intercept is used herein, but the same concept may be applied in cases that do not involve a legal entity. For example, a case where an enterprise owns a number of UEs and prefers to monitor traffic on PC5.

Alternatively, the NCIS URSP rule may not be considered a URSP rule, but instead have substantially the same content as a URSP rule (e.g., traffic descriptor or route selection descriptor, among others which may be in a USRP rule in TS 23.503) along with the additional content that is disclosed herein. Additionally, it may be considered higher priority, or precedence, than a URSP rule in the sense that it should be applied to NCIS traffic and NCIS traffic should not be evaluated against URSP rules unless no matching NCIS policy is available.

Alternatively, the NCIS URSP rule may include the same content as policies that relate to V2X communications over PC5 reference point and V2X communications over Uu reference point as described in TS 23.287, along with the additional content that is disclosed herein.

An NCIS URSP rule may include PC5 route descriptions (RSD's) that include S-NSSAT's. The presence of an S-NSSAI in a PC5 route description may be an indication to the UE 301 that it should not attempt to establish the PC5 route unless it is registered to the S-NSSAI (or an equivalent/mapped S-NSSAI of the indicated S-NSSAI).

Offline Charging for PC5 Activity within the NCIS Group—Offline charging for PC5 activity within an NCIS group may be based on the UEs within the group reporting the activities (transmissions and receptions) to the ADF.

When data is exchanged in the NCIS group, over the PC5 interface, it may be done via unicast, groupcast, or broadcast. When UE 301 transmits data, it may be configured to send information about the transmission to the ADF in a charging report. When a UE 301 receives data, it may be configured to send information about the transmission to the ADF in a charging report. UE 301 may provide information in the charging reports so that the charging system can correlate charging records and determine which records relate to the same transmission.

As described herein, when a message is unicast, broadcast, or groupcast over PC5, it may include a Transmission ID for Charging Identifier that is included in the charging report that is sent by receiving UEs. The ADF may use the Transmission ID for Charging Identifier to determine what UE 301 sent the message or verify the identity of the UE 301 that sent the message.

Furthermore, when a message is unicast, broadcast, or groupcast over PC5, it may include a sequence number. The sequence number may rollover after a modulo count. For example, the sequence number may increment after each message is sent (e.g. count 0 to 15 and then wrap to 0). The ADF may use the sequence number to correlate charging reports among the sending UE 301 and all of the UEs that receive the message.

Charging reporting may be made more efficient by UE 301 being configured by the NCIS URSP rule. The NCIS URSP rule may be configured to instruct UE 301 to report at set intervals where multiple reports may be combined together. The set interval may be at a fixed time (e.g. hourly, daily, etc.), after a set amount of records are generated, at the termination of a group's existence (e.g. all users exit a gaming session), when Uu becomes available for reporting, etc. Alternatively, a URSP rules can indicate that traffic that matches the rule should not be reported.

Online Charging for PC5 Activity within the NCIS Group: An NCIS group may be configured such that UE 301 can only perform activity within the group if it is in network coverage. For example, TR 22.842 explains that proximity-based services are required to be fully controlled by the network for the commercial cases. When this is the case, UEs within the group may be configured to perform online charging.

UE 301 may implement separate AMC's for online and offline charging. The AMCs may be configured (based on NCIS URSP Policies) to communicate with separate ADFs. However, it should be appreciated that the AMCs or ADFs that are described as separate herein may be implemented in the same functions.

The online charging AMC may send debit request to the online charging ADF after each PC5 message transmission or reception. The debit request may include the same information that is listed above for offline charging. In addition, the online charging AMC may also request additional credits to minimize the number of times a request needs to be sent. Having the future credits available may also make online charging operations quicker as the AMC does not need to make a request for each message or reception of a message. As an alternative, the ADF may return an available balance that the AMC may use for future charging. This credit may have an expiration associate with it. If at the end of the session there are remaining credits, the online charging AMC may refund the leftover credits back to the subscriber by sending a refund request to the ADF.

The online charging ADF may send the online AMC credit/debit/balance notifications. The notifications may be based on charging reports from other UEs. For example, the ADF may receive a charging report from UE-B that UE-A transmitted a message. The ADF may debit UE-A's account, or transmission allowance accordingly and periodically send UE-A notifications of its current balance.

A GUI may be available on UE-A that displays UE-A's current balance. A balance may be expressed in units of money, bits, messages, or time. Time may represent how long the UE may use the NCIS.

The online charging ADF may send a notification to the online charging AMC that the UEs balance is now 0. This notification may cause UE 301 to remove itself from the group, prevent itself from transmitting with the group, or prevent itself from receiving data that is associated with the group. The notification may prompt UE 301 to display a message indicating to the user that the credit balance is 0 for the service and prompting the user to purchase more credit.

Figure 27:
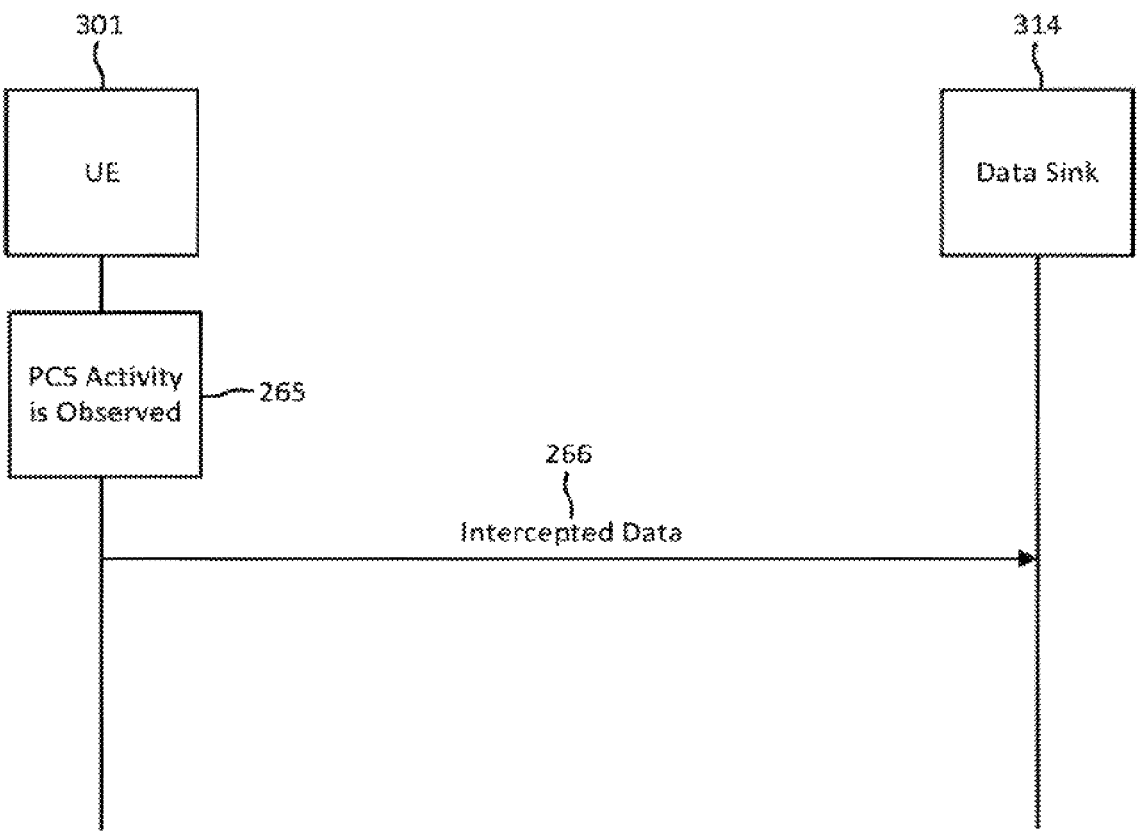
FIG. 27 illustrates an example method for PC5 lawful intercept.

Lawful Intercept for PC5 Activity within the NCIS Group: FIG. 27 illustrates an example method for PC5 lawful intercept. When UE 301 observes PC5 activity and it has received an indication that PC5 lawful intercept is enabled, it may execute the procedure of FIG. 27.

In step 265, UE 301 observes PC5 activity that matches the criteria as provided in the NCIS URSP rule. As described earlier, an NCIS URSP rule may indicate that traffic that involves certain NCIS group, Layer-2 ID, Application ID, or ProSe Device ID may require lawful intercept.

In step 266, the UE 301 may send the observed (e.g. received) data to the data sink 314 address that was provided in the URSP rule. Data sink 314 that was provided may have been a URI or IP Address and another URSP rule may have configured UE 301 to send all traffic that is associated with data sink 314 to an appropriate application server with a certain slice. For example, the application server may be identified by data network name in URSP rule. The protocol between UE 301 and data sink may be a service-based protocol. For example, it may be an HTTP message and the intercepted, or observed, message may be part of the HTTP message body. Note that "observed data" may include data the UE 301 transmitted.

Reporting Protocol: The previous sections describe how information may be reported to data sink 314 (e.g., charging reports to an ADF and intercepted PC5 messages to a data sink 314).

The protocol that may be used to report information may be an HTTP based protocol, such as an enhanced version of PC3ch. Alternatively, the protocol that may be used to report information may be an HTTP based protocol such as an enhanced version of Nchf. The Nchf protocol, or service-based interface, may be used for communications between network functions, or services. However, it may be enhanced to allow for commination between UE 301 (e.g. the ACM function in the UE 301) and network functions, or services, in the core network (e.g. the ADF, NWDAF, or CHF).

Alternatively, the protocol can be a new HTTP based protocol that collects reports from UE 301 (charging or lawful intercept report) and forwards the information in the report to other network functions (e.g. ADF, CCS, an AS, a Lawful Intercept function, etc.). The protocol may allow UE 301 to indicate the destination of the information from the report (e.g., an ADF ID, lawful intercept function, an AS, etc.).

Alternatively, a new protocol may be developed between UE 301 and functions in the core network and the protocol may be based on, or similar to the PMF protocol that is described in TS 24.193. The PMF protocol may be used to report RTT measurements, but may be enhanced to allow UE 301 to report charging information and intercepted information. If the protocol is enhanced to allow for reporting this additional information, then it may need to be further enhanced to allow the UE 301 to indicate where the reported data should be forwarded to (e.g., forward RTT measurements to the PMF and charging information to the CCS). The enhancement may be in the form of a data type parameter specifying which data type is forwarded to which destination. Alternatively, each type of information may be sent to a different port number. The techniques that are described herein for reporting charging information and intercepted information may also be used by UE 301 to report measurements or information that may be sent to the network and to the NWDAF function, which may improve network analytics and automation. In an example, UE 301 may report observed data rates or error rate. UE 301 may further indicate that the report should be sent to an NWDAF function. UE 301 may be configured during PDU Session Establishment, or via URSP, in order to be appropriately informed with regard to when analytics reporting is required, what type of analytics information is required, or where to report the analytics information.

When the N3IWF based architecture is used for relaying, the remote UE has to report the PC5 charging information via the relay UE's PDU session regardless of whether remote UE uses its CP or UP path to send the report to the network. In the report, the remote UE will indicate its role (e.g., remote UE or relay UE) in the PC5 communication so that the charging function can correlate the reporting information. Specifically, when the PC5 charging report is received by the N3IWF, the N3IWF may send the report to remote UE's UPF via the UP. Alternatively, the N3IWF may send the report via CP, e.g., from N3IWF to AMF to the charging function (CHF). Another option is that N3IWF directly sends the report to the CHF.

In addition, the relay UE uses its own PDU session to relay the PC5 charging report, which should be noted as usage of "relaying PC5 charging report". This new usage value may be identified as sponsored by the network operator.

Path Selection Policy for NCIS in 5G ProSe: Described herein are methods for path selection for UE-to-UE communications between a 5GC path and a PC5 path for NCIS applications. Network functions (e.g., PCF) may create a path selection policy and send it to UEs. For example, the UEs that join the same NCIS group/application may be sent the path selection policy. The UE configuration update procedure may be used for the network-initiated policy configuration. The UE may also request the path selection policy from network during certain NAS procedures, such as PDU session establishment/modification, registration, or service request procedures. In addition, an AF or application server of an NCIS application may help to configure the policy by sending configuration information to the PCF. After configuration, the UE may make path selection decisions based on the provided policy.

The following information may be sent to a UE from the PCF as a part of path selection policy:

First information that may be sent to UE from PCF as a part of path selection policy may be a policy ID or a policy reference number that is used to identify this path selection policy.

Second information that may be sent to UE from PCF as a part of path selection policy may be an indication that the policy is s path selection policy for NCIS application. The indication may be a bit in an information element, or a special information element may be created to carry NCIS policies.

Third information that may be sent to UE from PCF as a part of path selection policy may be an entity that is responsible for performing the path selection process: this could be either the UE or the network. In case that there are multiple UEs in a NCIS group running the same application, the policy may further indicate which UE is permitted to select the path. For example, the UE that first forms the NCIS application group, or the UE that is selected as the group head for a NCIS application (e.g., a NCIS group gaming application may need a UE to first set up the application and host the game as the group head). This parameter may also indicate that, if in case multicast/broadcast is required or if UEs in an NCIS group are served by different MNOs, the network will select the path and notify those UEs.

Fourth information that may be sent to UE from PCF as a part of path selection policy may be an application descriptor information that the UE may be used to determine what applications the path selection policy can be applied to. For example, the application descriptor information may indicate that one or more types of NCIS applications may use the path selection policy. The application descriptor information may be in different forms, for example, the application descriptor information may be an OSId, OSAppId(s), application ID, S-NSSAI, or a group ID to identify the NCIS application group, among other things.

Fifth information that may be sent to UE from PCF as a part of path selection policy may be a triggering event that may be applicable to the path selection policy. Different triggering events may trigger the UE or network to apply a different path selection policy for a NCIS application. Triggering events may also cause the UE to reapply, or reevaluate, path selection policies.

Sixth information that may be sent to UE from PCF as a part of path selection policy my be a rule for determining which UE in the group is able to make path selection decisions and initiate a path switch procedure. For example, this rule may indicate that the UEs be assigned temporary random tokens that are used to determine which UE is permitted to initiate a path switch procedure (e.g. the UE with the lowest token value at the time of group formation is permitted to initiate a path switch procedure). Instead of a token, the decision may be based on a UE identifier such as a SUPI, or selected bits of a SUPI.

Seventh information that may be sent to UE from PCF as a part of path selection policy may be one or more path selection criteria. The criteria may provide UEs with some information to help UEs determine how to select the path between 5GC path and PC5 path. The following information may be provisioned: 1) location condition, 2) UE PC5 capability condition, 3) criterion for group based NCIS communication, 4) QoS criteria, 5) communication mode, 6) application dependency criteria, or 7) UE radio quality criteria, among other things.

Here, further information about the aforementioned information are disclose. First, a location condition. The location condition is, for example, a distance range between two UEs, if the UE determines that the distance is longer than a certain range, then 5GC path may be used, otherwise a PC5 path may be used. Another example is if the UE determines that the peer UE(s) are served by different cells but within proximity of each other, then a PC5 path may be used. Path selection may also be triggered if a listed UE advertises availability of PC5 path for a particular NCIS application. Moreover, the location information could indicate the tracking/registration or the geographic area information where the UE can apply the policy. Second, a UE PC5 capability condition. A UE PC5 capability condition may indicate that only if all the UEs in the NCIS group support a certain PC5 capability (e.g., NR PC5, LTE PC5 or both), then the PC5 path is preferred. Third, a criterion for group based NCIS communication: A criteria for group based NCIS communication may be, for example, a threshold of number of UEs in the group. If the number of UEs in a NCIS application group exceeds the threshold, then PC5 broadcast may be preferred, or multicast/broadcast traffic is preferred to be delivered over PC5 path, or unicast traffic is over 5GC path. Fourth, a QoS criteria. A QoS Criteria may indicate the path selection criteria regarding QoS parameters. For example, if the latency or data rate requirement for the communication is very short or very high, then PC5 may be preferred. For example, it may be that the high data rate NCIS applications consume too much network resources or radio resources, so network decides to steer the data transfer to PC5 path. Fifth, a Communication Mode. The Communication mode (unicast, multicast and broadcast) may be a preference over 5GC path or PC5 path. The communication mode may indicate which path is preferred for a communication mode. For example, it may be preferred to deliver multicast/broadcast traffic via PC5 path and unicast via 5GC path. Sixth, an application dependency criterion. This criterion helps the UE to select a path based on correlation among NCIS applications. For example, if application 1 runs on top of application 2, or application 1 has dependencies on application 2, then the same path is selected for both applications. A dependency in the path selection policy is not necessarily based on a logical dependency between the two applications. Moreover, this criterion may include a policy priority that allows for multiple policies to include criteria for the same application; Seventh, UE radio quality criteria. This condition may allow a UE to choose between PC5 path and 5GC path based on some radio measurements (e.g., RSSI, RSRP, RSRQ) on Uu interface, since 5GC path requires UE connecting to network over Uu.

Eighth, a validity timer or a time window which indicates the time period in which the policy is valid and can be applied.

Ninth, one or a list of DNNs, a network slice IDs (e.g., S-NSSAI), or the combination of DNN and network slice ID, which indicates the policy could be applied to one or a list of DNNs, network slices or combination of both.

Another option is to let a network function (e.g., an AMF, SMF, or PCF) make the decision for path selection and send the path selection to the UEs that have joined the NCIS group. This may be particularly efficient if UEs plan to do group-based communication (e.g., multicast and broadcast) to avoid the scenario that multiple UEs in the group select different paths. Another possible scenario is that some UEs in the group are not located in the same area (e.g., cell proximity) or not served by the same MNO. The network may effectively provide coordination for the UEs to select the path. For such scenarios, one or more UE(s) in the group may use various procedures (e.g. registration, service request, PDU session management or UE policy configuration) to request that the network performs the path selection.

A path selection policy may be different per different types of triggers (by individual UE, network function, or application server), per NCIS application, per S-NSSAI, or per QoS class (e.g., 5QI).

Once a UE obtains a path selection policy from PCF, it may choose to broadcast such policy over the PC5 interface, so that other UEs that are interested in joining the NCIS group in proximity will follow the same path selection policy. Particularly, the policy may indicate that for a specific NCIS group-based application, only UEs with a specific role will select the path on behalf of all UEs. This coordination among UEs can avoid the potential inefficiency introduced by each UE selecting different paths. Moreover, depending on different scenarios, a UE may unicast or multicast the policy over the PC5 interface. For example, if a UE has already established a PC5 unicast link with another UE, or PC5 groupcast link with a group of UEs, it will unicast or multicast the policy within the NCIS group if the path selection policy is updated.

The path selection policy may be integrated into URSP. In other words, the path selection policy may be included as a part of URSP, which is sent to UE from PCF. For example, a path selection policy may be associated with a traffic descriptor, which further comes with a list of route selection descriptor. When the UE NAS layer gets application data from a higher layer, it may check the path selection policy to determine how to route the data to the destination UE, e.g., via PC5 path or 5GC path.

For the UEs in an NCIS group, the network (e.g., network functions)/AF may associate a group ID with a path selection policy and indicate in the policy which NCIS application group can apply the path selection policy. The network may assign specific roles to the UEs that are within the same group (e.g. group X). For example, the network may assign a specific UE (e.g., group member X.UE-A) to broadcast the policy, to perform path selection, etc. This allows for the network to control how the path selection decision is made but also to provide flexibility for UEs in the group. For example, in some cases, the network gives UE group X1 (besides the group ID and policy) the exact paths. For example, in some cases, the network gives UE group X2

(besides the group ID and policy) the designation of which UEs should chose the paths (UEs X2.A1, X2.A2, etc.) and how (in the policy).

Methods of Path Switching for NCIS in 5G ProSe: Described herein is a method for performing path switching from a 5GC path to a PC5 path for communications between UEs. Such switching may be triggered by the following scenarios. In a first scenario, one or more UEs may move out of network coverage, so that the UEs have to switch to PC5 to communicate with other UEs in proximity.

In a second scenario, a 5GC path may introduce longer latency than what is acceptable to the application. This is especially possible when a UE is roaming or UEs in communication connect to different PLMNs or are served by different MNOs. Other measurements may be used to make path switching decisions, such as data rate or packet loss rate. For example, if the data rate performance or packet loss rate degrades for the 5GC path due to the network congestion, then UEs or the network may decide to switch to PC5 path for higher data rate or better packet loss rate. The QoS monitoring may come from application servers, RAN nodes, network functions (e.g., UPF), or from NCIS applications on the UE. Correspondingly, different procedures or messages may be used to trigger the path selection or switching. For example, a RAN node may use QoS notification mechanism to notify the network to trigger the path selection or switching. The AF may send a request to the network to trigger the path selection or switching. UPF may send N4 message to SMF to trigger the path selection or switching. The NCIS Application may trigger a new path selection operation, if the NCIS application detects that its buffer rate due to packet loss goes above a certain threshold or triggers path selection or switching.

In a third scenario, more UEs may join the NCIS group. It may be determined that it has become more efficient to switch to a PC5 path for UE-to-UE communication or to use multicast/broadcast. Different entities may trigger the path selection or switching by observing or detecting this event. For example, an application server may send a request to the PCF/SMF to trigger the switch to a PC5 path if more UEs join and it is determined that group-based communication is more efficient. The UE hosting the NCIS group application may also request the switch after finding out more UEs joined the group. A Network Function (e.g., UPF) may request to switch if it observes that more member UEs or RAN nodes join the existing multicast/broadcast session for an NCIS group communication. The network may set up the policy in a way such that, for example, a UE or a group of UEs may stay in the 5GC for a predefined amount of time. The UE-to-UE communication may switch to PC5 path after the predefined time.

Figure 28A:
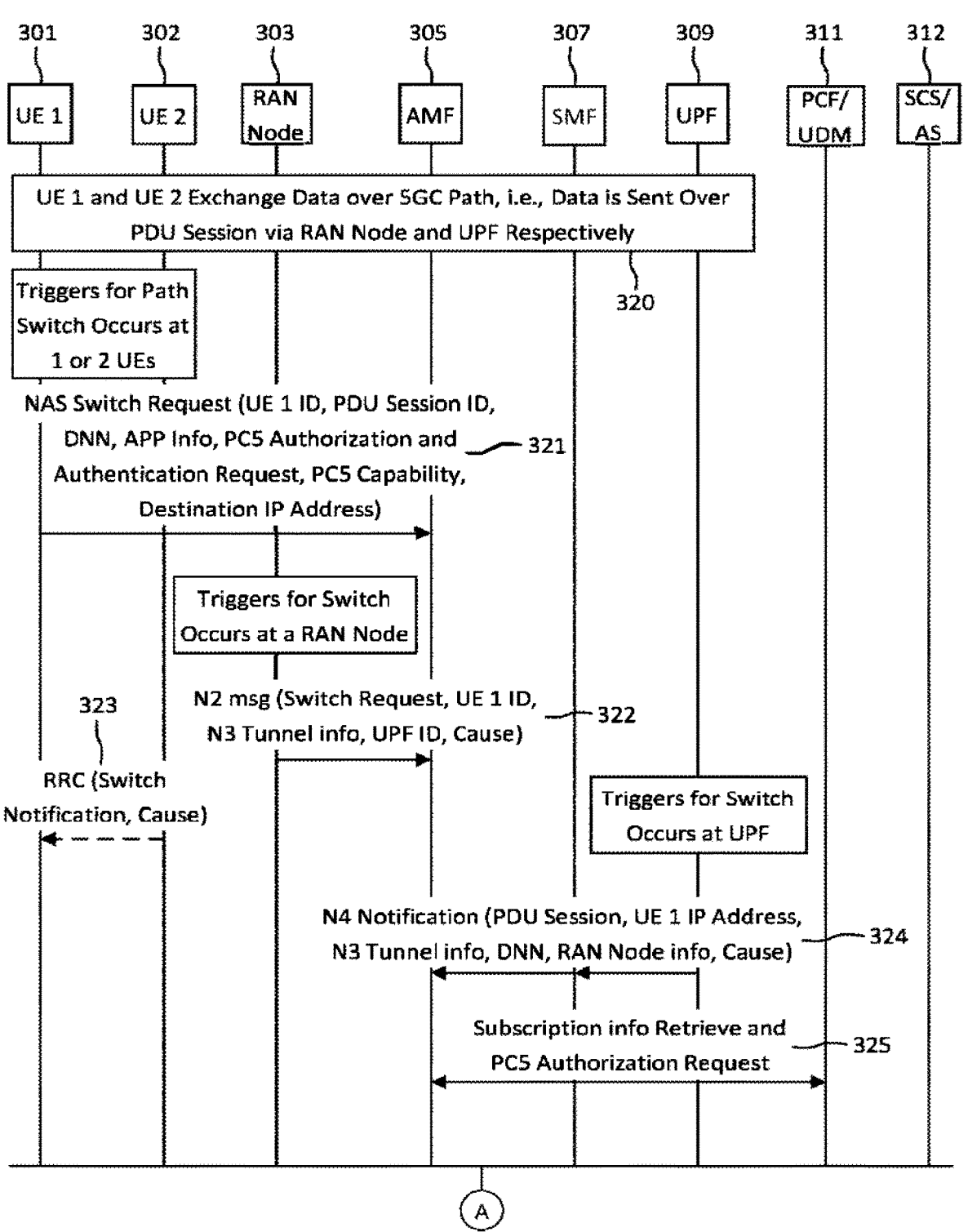
FIG. 28A illustrates an example method for switching a 5GC path to a PC5 path for unicast UE-to-UE communication.
Figure 28B:
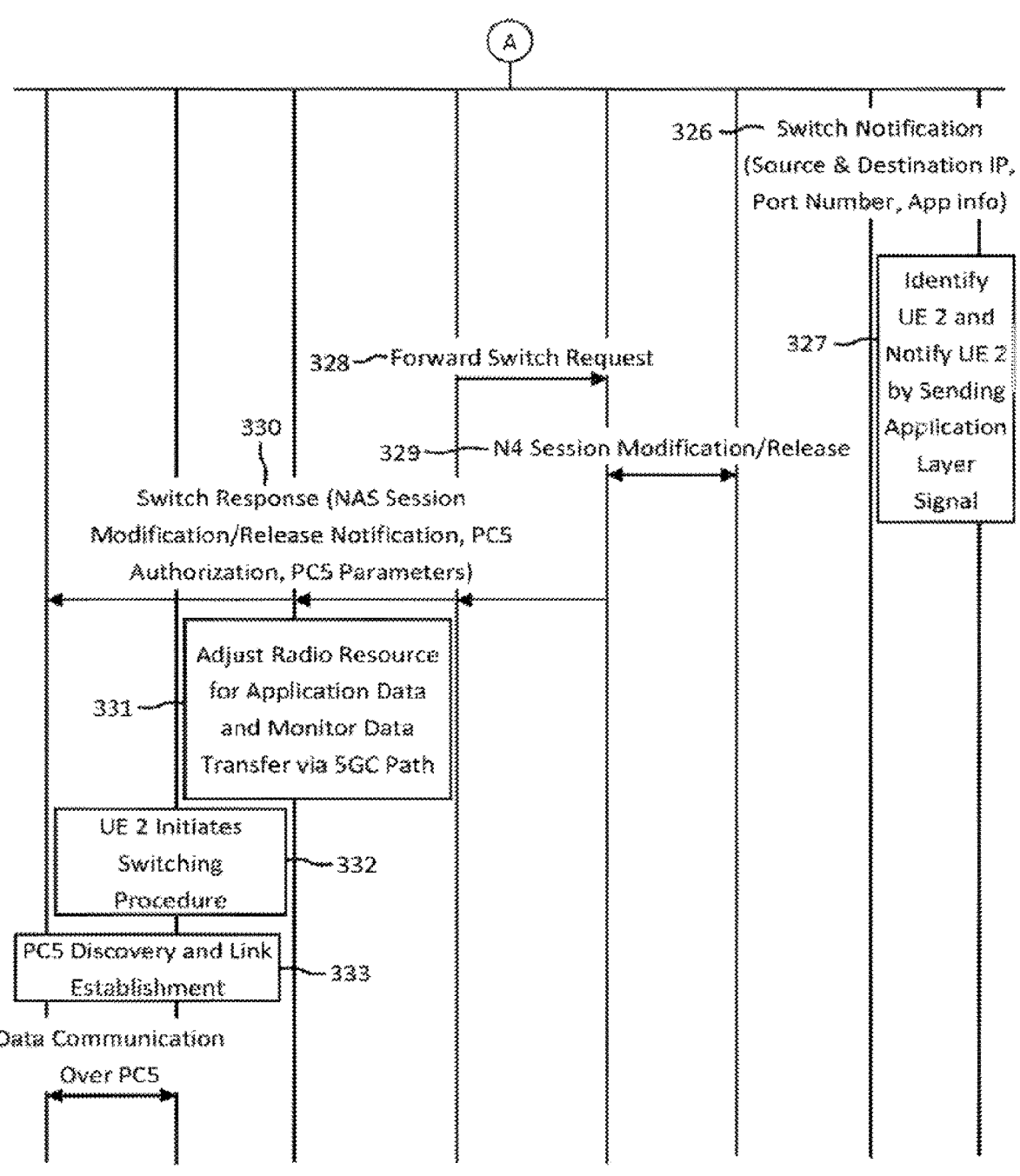
FIG. 28B illustrates an example method for switching a 5GC path to a PC5 path for unicast UE-to-UE communication (FIG. 28A continued)

FIG. 28A-FIG. 28B illustrate an exemplary method for path switching from a 5GC path to a PC5 path for unicast communication between UEs. In step 320, UE 301 and UE 302 may have already exchanged data with each other through 5GC path, e.g., each establishes respective PDU session, and the application server may send the data to the other UE as a destination. In step 321, one of the possible triggering events, as disclosed herein, may occur at UE 301. Based on the triggering event, UE 301 may determine to switch to a PC5 path for communication with UE 302. UE 301 may make the path selection based on the path selection policy from PCF 311 as disclosed herein. UE 301 may send a NAS message to AMF 305 requesting the path switch. The NAS message may be a registration update, service request, or PC5 authentication/authorization message, which may include the following information. First information may include the UE 301 ID or S-NSSAI that UE 301 connects with for the communication with UE 302 for a particular NCIS application. Second information may include the DNN indicating the data network that routes the data to/from UE 302. Third information may include the source or destination IP address (e.g., UE 301 and UE 302 IP address, respectively) or port number used in the NCIS application data transmission. Fourth information may include the PDU session information, such as session ID, QoS parameters (QFI, max QoS flow data rate) in the QoS rule that has been sent to UE 301, or session and service continuity (SSC) mode. Fifth information may include the PC5 capability that UE 301 supports, such as NR PC5, LTE PC5 or both. Sixth information may include the PC5 authentication and authorization request to allow UE 301 to use PC5 interface for a NCIS communication if UE 301 has not done so yet. Seventh information may include the application information, such as OSId, OSAppId(s), or application ID. Eighth information may include the time instant about when UE 301 determine or otherwise instructed start PC5 communication. Note that UE 301 may not be able to directly notify UE 302 about the path switching since they communicate with each other via 5GC path. So, UE 301 may do that at application layer, possibly with the help of application server forwarding the notification to UE 302.

In step 322, RAN node 303 serving UE 301 sends the N2 notification (e.g., QoS notification) to the network, including UPF 309 address/ID, N3 tunnel information, QoS parameters, triggering event ID (e.g., the cause of the potential path switching) and a switching request to PC5. In step 323, RAN node 303 may send a notification to UE 301 as well notifying the occurrence of triggering event and potential path switching. In step 324, it is also possible that one of the triggering events occurs at UPF 309 anchoring the PDU session for UE 301. UPF 309 sends a N4 notification/request to SMF 307 including the event ID (e.g., the cause of potential switch), DNN, UE 301 IP address and port number, QoS parameters, and N3 tunnel information. Correspondingly, SMF 307 may send the information to AMF 305.

In step 325, upon receiving request/notification from UE 301 or RAN node 303, AMF 305 may initiate communication with PCF 311 or UDM 311 (hereinafter referred to PCF 311). The communication may serve multiple purposes: 1) perform authentication and authorization of PC5 usage for UE 301; or 2) approve the path switch on the network side if UE 301 already selects the PC5 path. If the network is responsible for path selection, PCF 311 may determine to send a switching notification to UE 301 later. A significant task for PCF 311 may be to map the existing QoS parameters used in PDU session to the future PC5 communication. Alternatively, PCF 311 may work together with SMF 307 to determine the PC5 QoS parameters, especially for NR PC5. A new PC5 QFI (PFI) may be created, and the corresponding QoS parameters can be copied from those identified by QFI used in PDU session.

In step 326, after PC5 authentication and authorization, PCF 311 contacts SCS 312/AS 312 about upcoming path switching, which may include the information disclosed in step 321 or step 322. In step 327, based on the information provided by PCF 311, application server identifies UE 302, or sends UE 302 a switching notification. This may be done through an application layer signal. In step 328, after PC5 authentication and authorization is done, AMF 305 may forward the switching request to SMF 307 in case UE 301 or RAN node 303 trigger the switching. The switching request may originate from UE 301 or RAN node 303 as disclosed in step 321 or step 322. In step 329, SMF 307 may initiate the N4 session release or modification process with UPF 309 to support the upcoming path switching.

In step 330, SMF 307 may send AMF 305 switching response. AMF 305 may then send a response to RAN node 303 or UE 301, which may include the following information. First information may include an N1 NAS message, which may include PC5 parameters that UE 301 may use (e.g., PC5 discovery parameters, PC5 QoS information, PC5 link establishment information), PDU session information that is affected by the path switching, the time instant for starting PC5 communication, NCIS application information, or path selection policy for potential path switching in the future. Second information may include an N2 message, including N3 tunnel information that may be affected by the path switching, or the time instant for starting PC5 communication. The PC5 QoS parameters may be generated by SMF 307 based on the QoS parameters of the PDU session UE 301 used for 5GC path. SMF 307 may generate a new PC5 QoS flow ID, and map the corresponding QoS parameters (e.g., max flow bit rate and packet loss rate) to PC5 link.

In step 331, RAN node 303 may adjust the radio resource for the release or modification of the PDU session or may continue to monitor the data traffic from or to UE 301 for the NCIS application. In step 332, UE 302 initiates the similar steps as UE 301 does once it receives switching notification from application server at application layer. In step 333, UE 301 or UE 302 may perform PC5 procedures, such as discovery or link establishment to prepare for the PC5 communication. Once PC5 link is ready, the data transfer may switch to PC5 path between UE 301 and UE 302.

As an alternative to step 327, the application server may identify UPF 309 and SMF 307 that manages the PDU session for UE 302 about communications with UE 301, and trigger network functions to initiate the steps as shown in FIG. 28A-FIG. 28B to manage PDU session for UE 302 and notify RAN node 303 that serves UE 302.

Note that FIG. 28A-FIG. 28B may be based on unicast communication between UEs. While the group-based communication may be employed by many NCIS applications, the path switching may be considered with multicast or broadcast communication between UEs. A basic scenario is that a UE sends NCIS data through 5GC path, and a group of UEs receive the data by using multicast/broadcast service provided by 5GC or application server. In other words, a multicast/broadcast session is established in 5GC to transfer the data to the group of UEs regardless of which entity controls the multicast/broadcast service (e.g., application service provider or network operator). In order to switch to PC5 communication, the sender UE may follow the similar steps in FIG. 28A-FIG. 28B to communicate with the network. One difference is that the sender UE (e.g., UE 301 in FIG. 28A-FIG. 28B) may further indicate to the network that it wants to use PC5 broadcast or multicast communication, and provides the corresponding information (e.g., radio capability of PC5 interface, type of PC5 interface, range of broadcast/multicast, max number of receiver UEs over PC5 broadcast/multicast, or QoS parameters required for PC5 broadcast/multicast, among other things). Correspondingly, the network may perform authentication or authorization of PC5 broadcast/multicast, set up the path selection policy for the group of UEs, or send the policy to UE 301. At the same time, the network may release or modify the PDU session serving UE 301, which may be similar to step 329 in FIG. 28A-FIG. 28B. Once the sender UE (e.g., UE 301) gets the path selection policy, it may broadcast the policy over PC5 so that UEs in the group may follow the policy for path selection. The policy may allow the sender UE to select the path for other UEs in the group or allow each UE in the group to select the path individually, or network may make the selection for each UE in the groups and inform the UEs. In the end, it is possible that all UEs in the group join the PC5 broadcast/multicast communication, or some UEs join the PC5 broadcast/multicast communication while the rest of UEs are still on the 5GC path.

At the receiver side, application server or network may notify the UEs that need to switch to PC5 path. Note that it is possible that some UEs in the group may stay on the 5GC path. For those UEs that need to switch, they may follow the steps as shown in FIG. 28A-FIG. 28B to request PC5 authentication/authorization, leave the multicast/broadcast group (e.g., MBS session managed by the core network), perform the PC5 discovery, or join the PC5 group. It is also possible that those UEs may switch to PC5 for unicast communication, which generally means each of those UEs establishes a PC5 unicast link with the sender UE. For those UEs remaining on the 5GC path, they may not do anything in case the MBS session is maintained, or switch to a new PDU session (e.g., unicast session) if the MBS session is released or deactivated.

It is possible that a subset of UEs in the group request to switch to PC5 due to UE mobility or QoS degradation (this may be due to network resource limitation or RAN resource limitation), so the MBS session may be maintained or adjusted for the reduced number of UEs in multicast/broadcast session. In this case, these UEs or RAN node 303 may initiate the switching process with network by indicating the cause of the switching (e.g., triggering event), specific QoS parameter (e.g., data rate or latency) that cannot be met to the requirement under current 5GC path (this is usually notified by RAN node 303 or anchor UPF 309), and PC5 communication link requirement, such as communication mode and QoS information.

Another option is that PC5 path and 5GC path are both active after a partial switch for an NCIS application. For example, broadcast/multicast traffic may be switched to PC5 path, while unicast traffic is still sent via the 5GC path to UEs. This generally means PC5 and 5GC path may exist at the same time for an NCIS application. Whether the traffic is delivered by unicast or multicast/broadcast may be determined by application server or network operator policy which may depend on priority of the data traffic and type of the data traffic. In addition, if both 5GC path and PC5 path are available at the same time, the network may determine whether application data is transferred over 5GC or PC5 path regardless of communication mode. This determination may be made based on traffic characteristic such as data rate requirement, priority, latency requirement, or UE location. Alternatively, network may provide the path selection policy as a part of USRP to UE, and each individual UE may select the path based on the path selection policy for the outgoing NCIS application data.

Figure 29:
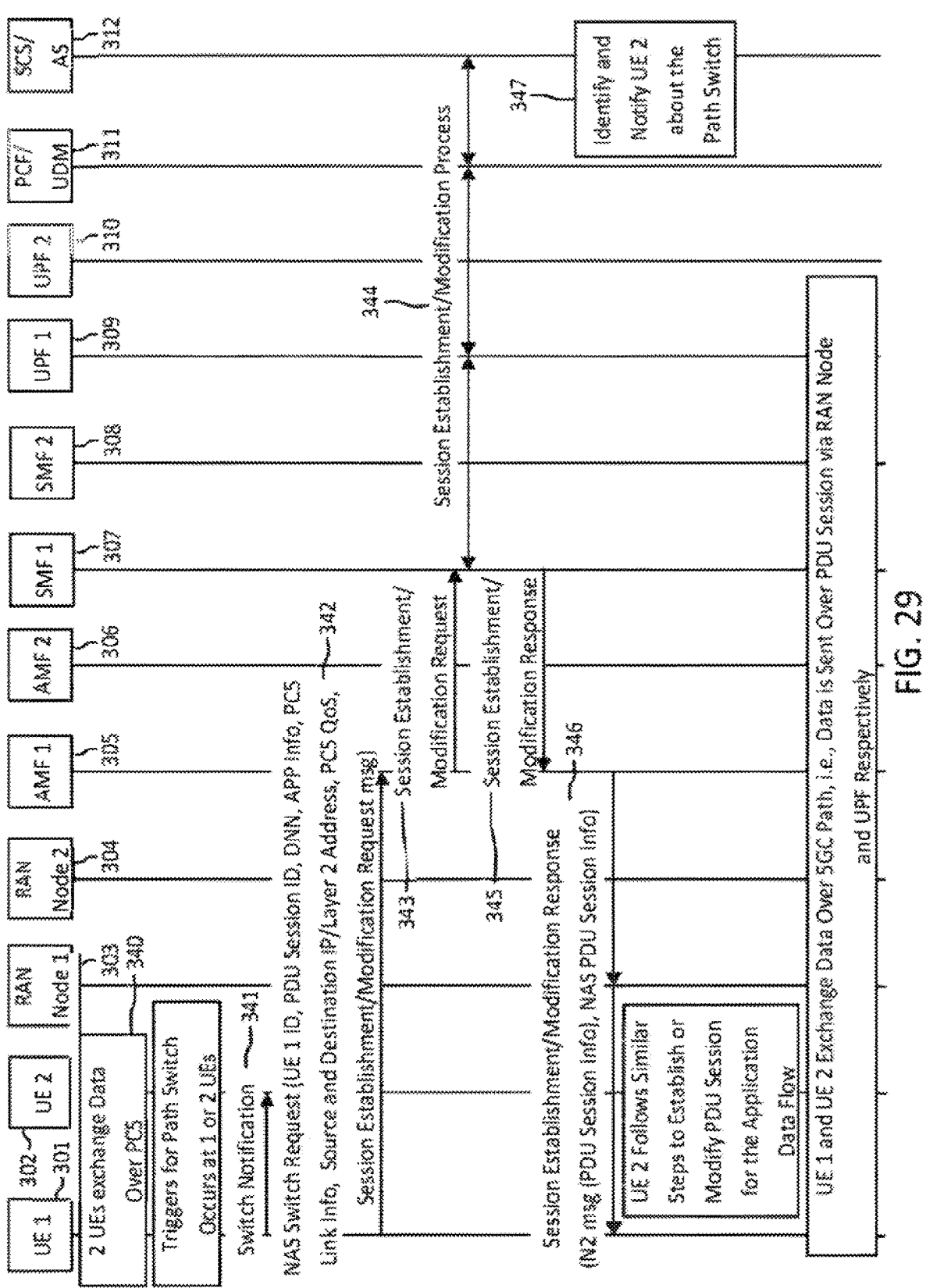
FIG. 29 illustrates an example method for switching a PC5 path to a 5GC path for unicast UE-to-UE communication.

FIG. 29 shows a method for path switching from PC5 path to 5GC path between UEs for unicast traffic. Described herein is a method for path switching from a PC5 path to a 5GC path for the NCIS communication between UEs. The switching may be triggered by application server or UE with the following exemplary events. First event may include two UEs are moving far away from each other, so PC5 communication becomes impossible. Second event may include a UE or the network determines that the PC5 interface cannot meet the QoS requirement, so that UEs decide to switch to 5GC path for guaranteed QoS. This may be done at application server by monitoring the application data transfer at application layer. The application server may trigger the switch by sending application layer signal.

FIG. 29 illustrates an exemplary a method for path switching from PC5 path to 5GC path between UEs for unicast traffic. One issue is how to map the PC5 QoS to regular QoS of a PDU session. Another issue is to minimize the service disruption of the NCIS application. In step 340, UE 301 and UE 302 may already exchange data with each other over PC5 interface. In step 341, a triggering event may at UE 301 or UE 302, so UE 301 may send switching notification to UE 302 over PC5 that indicates a preference to switch the NCIS communication to 5GC path. UE 301 may include the PC5 link ID, application information, source and destination IP address, or source and destination layer 2 ID in the notification.

In step 342, UE 301 may send a NAS message to AMF 305 to request the switch, which includes a request to establish/modify a PDU session for the upcoming 5GC path communication. UE 301 may provide the following information. First information may include a UE 301 ID or S-NSSAI that UE 301 connects with. Second information may include a PDU session ID or session context that UE 301 determines or otherwise indicates that it prefers to use for 5GC communication. Third information may include application information such as OSId, OSAppId(s), application ID to identify the NCIS application data flow. Fourth information may include a PC5 link information, including the source and destination layer 1 ID, IP address, or port number. PC5 QoS information may also be included, so that network is able to map the PC5 QoS parameter to PDU session QoS profile. Fifth information may include a DNN. Sixth information may include a time instant about when the switch takes effect. Seventh information may include an existing URSP policy UE has that includes the path selection policy for NCIS application.

In step 343, once AMF 305 receives the NAS message from UE 301, it may send the PDU session establishment/ modification message to SMF 307. In step 344, SMF 307 may initiate the session management process with UPF 309, PCF 311 and UDM 311 to establish or modify a PDU session for UE 301. With the PC5 QoS information provided by UE 301, SMF 307 may be able to map the PC5 QoS flow to an existing QFI or create a new QFI identifying the QoS flow with the parameters equivalent to PC5 QoS parameters. In step 345, SMF 307 may return the response to AMF 305 indicating that the PDU session is ready for 5GC path communication.

In step 346, the AMF 305 may return the response to UE 301 indicating the PDU session is ready. Moreover, the AMF 305 may include an N2 message to RAN node 303 including the session information such as UPF 309 address or N3 tunnel information, so that RAN node 303 is able to create N3 tunnel with UPF 309 and forward the data traffic for UE 301. In step 347, if UE 301 indicates that it has not notified the UE 302 about the switching to 5GC path, the application server may identify UE 302, and send notification to UE 302 through application layer signal. After that, UE 302 may follow similar steps as UE 301 to establish or modify PDU session for the 5GC path.

Note that FIG. 29 may be based on the unicast communication. In case of multicast/broadcast communication, there may be some different scenarios. For example, some UEs remain on PC5 path for PC5 broadcast/multicast while other UEs in the group switch to 5GC path for receiving the data, or some data are broadcast/multicast over PC5 while other data are unicast via 5GC path. If some UEs will switch to 5GC path for receiving the multicast/broadcast data from the sender UE, the sender UE may indicate to the network that an MBS session needs to be established, and the network may assign a group ID (e.g., Temporary Mobile Group Identity (TMGI)) to identify the MBS group. Alternatively, the application server may communicate with the network requesting the group ID and providing the necessary information to establish or modify an MBS session. The PC5 QoS flow may be mapped to MBS QoS flow by the SMF 307 that supports the multicast service or broadcast service.

Supporting UE-to-Network Relay using N3IWF based Architecture

Enhanced N3IWF Selection Supporting UE-to-Network Relay

The conventional N3IWF selection mechanism was designed to consider the case of the non-3GPP access to 5GC. When the N3IWF based architecture is used to support UE-to-Network Relaying in 5G proximity service, it is necessary to enhance the N3IWF selection mechanism by taking selection of the UE-to-Network Relay into account. Relay selection may affect the N3IWF selection since different relay UEs may prefer to connect to different N3IWFs. In addition to information introduced with regard to access to PLMN services via Stand-alone Non-Public Network, it is disclosed herein to provide new information as follows to the remote UE for N3IWF selection to support UE-to-Network Relay. The new information may be provided to remote UE as a part of N3IWF selection policy. Specifically, the PCF can use the UE configuration update procedure to send the policy to UE via NAS message. Alternatively, the N3IWF selection policy may be provisioned as a part of Access Network Discovery and Selection Policy (ANDSP).

First, an indicator to indicate whether the remote UE should perform relay selection before selecting an N3IWF in order to connect to the network via UE-to-Network relay, or whether the UE should combine the selection process for both relay and N3IWF. In any one of those cases, the remote UE may retrieve a list of N3IWF information from the candidate relay UE for N3IWF selection, since the remote UE connects with the N3IWF via the relay UE's UP path. In other words, the relay UE has to support the connection to the selected N3IWF.

Second, service area of one or a list of N3IWFs. This may be used by remote UE to evaluate whether the candidate N3IWF serves the area where relay UE is.

Third, a prioritized list of N3IWFs supported by the UE-to-Network relay. Since N3IWF architecture may be used for different purposes, such as non-3GPP access to the 5GC, access to a non-public network, it is beneficial to indicate what types of connections the N3IWF supports.

Fourth, a location information, which indicates the area (e.g., tracking/registration area, cells, or geographic area) where the remote UE may apply the policy for the N3IWF selection.

Fifth, a validity time period, which indicates a time period during which the N3IWF selection policy is valid and can be used.

Sixth, a DNN or a list of DNNs, the remote UE can apply the policy when the remote UE wants to connect to the DNN or one of these DNNs.

Seventh, an indication that indicates whether N3IWF selection is performed first or the UE-to-Network relay selection is performed first.

From UE-to-Network relay perspective, when a UE broadcasts its UE-to-Network relay discovery information on the PC5 interface, it will include the following information with respect to N3IWF forwarding: First, an indication indicating whether the relay UE supports the connectivity to an N3IWF, and whether it supports to use its N3IWF connection for relaying traffic via its UP path. In other words, the relay UE may broadcast identifiers, or domain names, of N3IWF's or DNN's that the relay UE may be able to reach with a data plane connection. The relay UE may also broadcast an indication of whether the relay UE may be willing and able to use a PDU Session of the relay UE to send data towards the indicated N3IWF or DNN. Second, PLMN information with which the relay UE registers with. Note that the remote UE may register with a different PLMN, thus the remote UE may prefer different N3IWFs in respective PLMN. This will help remote UE be aware of PLMN information when it selects relay UE. Third, a list of PLMNs that the relay UE may prefer for N3IWF selection, and for each PLMN, there is a list of available N3IWFs identified by FQDN or IP address. This list may be a prioritized list which implies the preference for each PLMN with respect to the N3IWF selection.

After selecting an N3IWF, the remote UE may provide the relay UE with the N3IWF information, so that the selected relay UE knows the destination when it relays the remote UE's message, e.g., the selected N3IWF may be seen as a DN over N6 interface by the relay UE. Moreover, the relay UE may initiate PDU session establishment or modification process to get its UP path ready for relay. The remote UE may provide the relay with an N3IWF identifier. The N3IWF identifier may, based on internal policies that were received by the PCF via NAS, map the N3IWF to a DNN/S-NSSAI combination and establish a PDU Session that will be used to forward all traffic received from the UE to the N3IWF.

URSP Enhancement for Relaying Packet by UE-to-Network Relay: When the relay UE receives a control message or a data packet from the remote UE over PC5, it may select a PDU session to send the received message towards the N3IWF. In order to make the relay UE be capable of selecting a PDU session, there may be an enhancement of current URSP rules. The following enhancements to the URSP are disclosed.

In a first exemplary enhancement, in the traffic descriptor part, a UE-to-Network Relay Indicator is disclosed to describe whether this URSP rule may be applied for a relay traffic by a UE. Alternatively, a new value (UE-to-Network Relay service) may be added to connection capabilities field in traffic descriptor to indicate the URSP rule can be used for relay traffic.

Second, a new value is disclosed for the access type preference in route selection components to indicate that the URSP rule could be used to select a PDU session for transferring the relay traffic. This new value may be UE-to-Network Relay or relay for PC5 traffic. This may be necessary since the relay UE may not be able to access the application information when it relays the IP data traffic or NAS message for the remote UE. Alternatively, a UE-to-Network Relay enabling indicator may be introduced as a new Route selection component for the same purpose.

Third, a UE-to-Network relay selection attribute may be introduced as a Route selection component. This component may include one or a list of remote UE IDs, or one or a list of PC5 link IDs so that the relay UE knows the URSP may be used to select PDU session for relay traffic that is from some specific remote UEs or that is received over some specific PC5 links. In other words, this parameter associates the relay UE's PDU session with some remote UEs or some PC5 links.

Fourth, a relay traffic type selection attribute is disclosed as a new route selection component. This may be to indicate the type of traffic sent over PC5 for the relay, such as data traffic, control plane packet, or IP vs non-IP data. This may be used by relay UE to select PDU session to forward the UP and CP packets for the remote UE.

Figure 30:
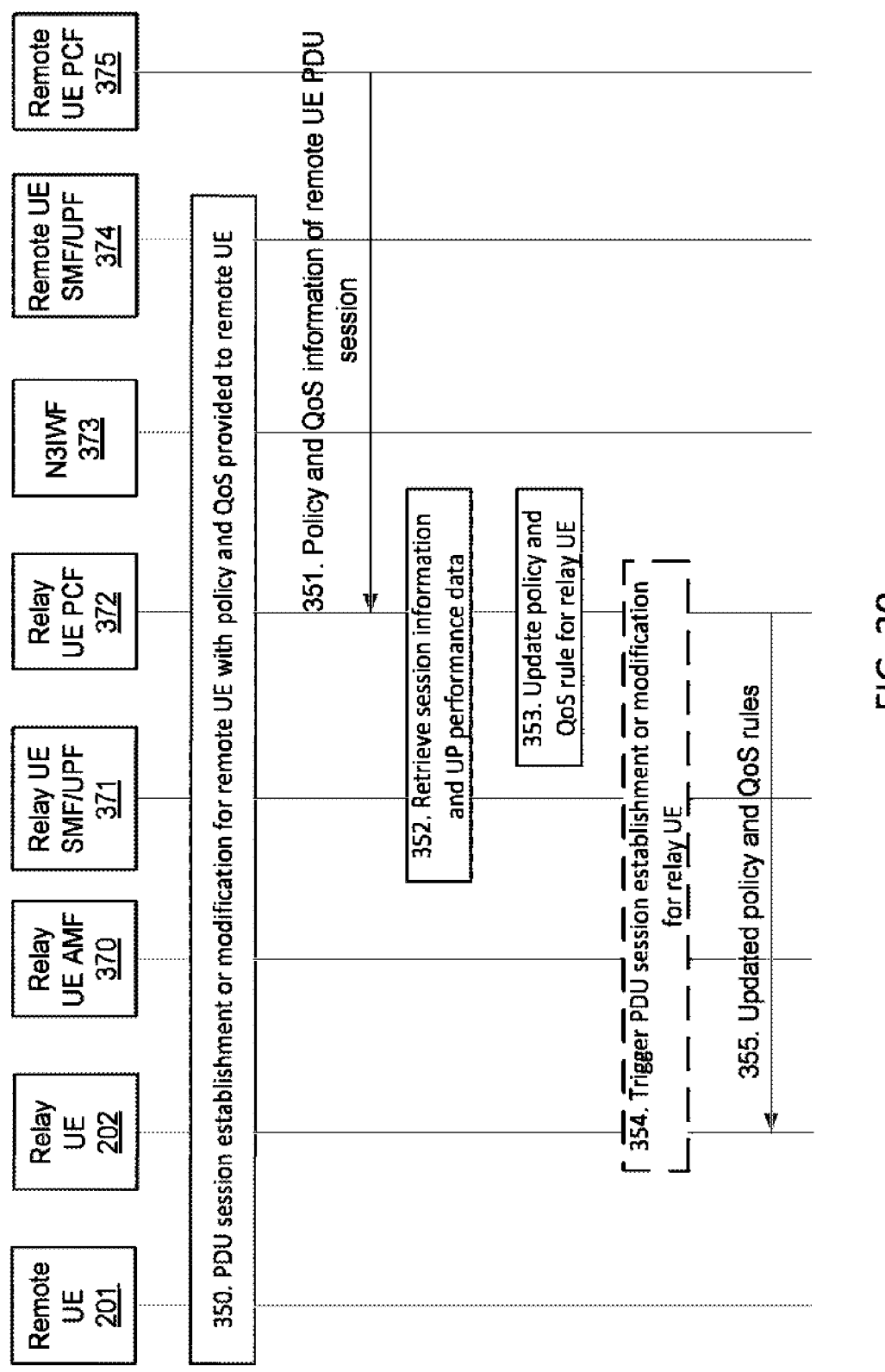
FIG. 30 shows an example Procedure of Policy and QoS Rule Update at Relay UE triggered by Session Management Operation for Remote UE.

FIG. 30 shows the procedure of updating the UE policy (e.g., URSP) or QoS rules at the relay UE 202, which may be triggered by the session management operations (e.g., PDU session establishment or modification) for the remote UE 201. The function or devices that may be involved in the procedure may include relay UE AMAF 370, relay UE SMF 371, relay UE PCF 372, N3IWF 373, remote UE SMF 374, or remote UE PCF 375. Step 350: the PDU session establishment or modification procedure is performed for the remote UE 201, and the UE policy (e.g. URSP) and QoS rules are provided to the remote UE 201 and the anchor UPF respectively.

Step 351: after URSP is provisioned to the remote UE 201, the remote UE 201's PCF communicates with relay UE 202's PCF. The purpose may be to notify the relay UE 202's PCF that there are PDU session management operations for the remote UE 201 which may affect relay UE 202's PDU session configuration. The following information may be provided to the relay UE 202's PCF: First, N3IWF address or ID: since remote UE 201's PDU session relies on N3IWF forwarding traffic treated as non-3GPP access to 5GC, the relay UE 202's network is not aware of any N3IWF information. The N3IWF (or a DNN that is associated with the N3IWF) may be used as destination DNN for the relay UE 202's session that carries the relaying traffic. Second, Location information of the N3IWF: for example, PLMN information where the N3IWF is serving, track area/registration area or geographic area information that the N3IWF is serving. Third, Context information of the remote UE 201's PDU session: since the remote UE 201's PDU session is transparent to the relay UE 202's network, relay UE 202's SMF/PCF need some session context information to establish/modify the relay UE 202's session to make sure that it aligns with policy control of remote UE 201. The example session context could be service area information of the remote UE 201's session, session and service continuity mode. In case that the PCFs are located in different PLMNs, e.g., remote UE 201 and relay UE 202 registers with different PLMNs, what session context information can be provided depending on the agreement between the PLMN operators. Fourth, QoS information: this may be used by PCF/SMF to generate QoS rules and mapping between relay UE 202's session and remote UE 201's session.

Step 352: after receiving the information from remote UE 201's PCF, relay UE 202's PCF may retrieve PDU session information and user plane performance data from relay UE 202's SMF/UPF and potentially from NWDAF. The purpose is to determine how to modify the existing PDU session, or whether it is necessary to establish a new PDU session for relaying traffic. Step 353: based on the information received in steps 2 and 3, relay UE 202's PCF may decide whether and how to update the policy such as URSP for any of relay UE 202's PDU session.

Step 354: the relay UE 202's PCF may initiate PDU session establishment or modification to transfer the relay traffic for the remote UE 201. The SMF may update or generate QoS rules based on the policy made by the PCF. Step 355: PCF may send the updated UE policies (e.g., URSP) and QoS rules (including QoS mapping between PC5 link and relay UE 202's PDU session) to the relay UE 202 so that relay UE 202 knows how to handle the remote UE 201's traffic received over the PC5, such as how to select a PDU session to use for forwarding remote UE 201's CP or UP traffic, how to map the PC5 QoS requirement to PDU session QoS. As disclosed herein, not all steps need to occur. For example, step 354 may be included or not included in this method.

Path Switching with UE-to-Network Relay in N3IWF based Architecture

Figure 31:
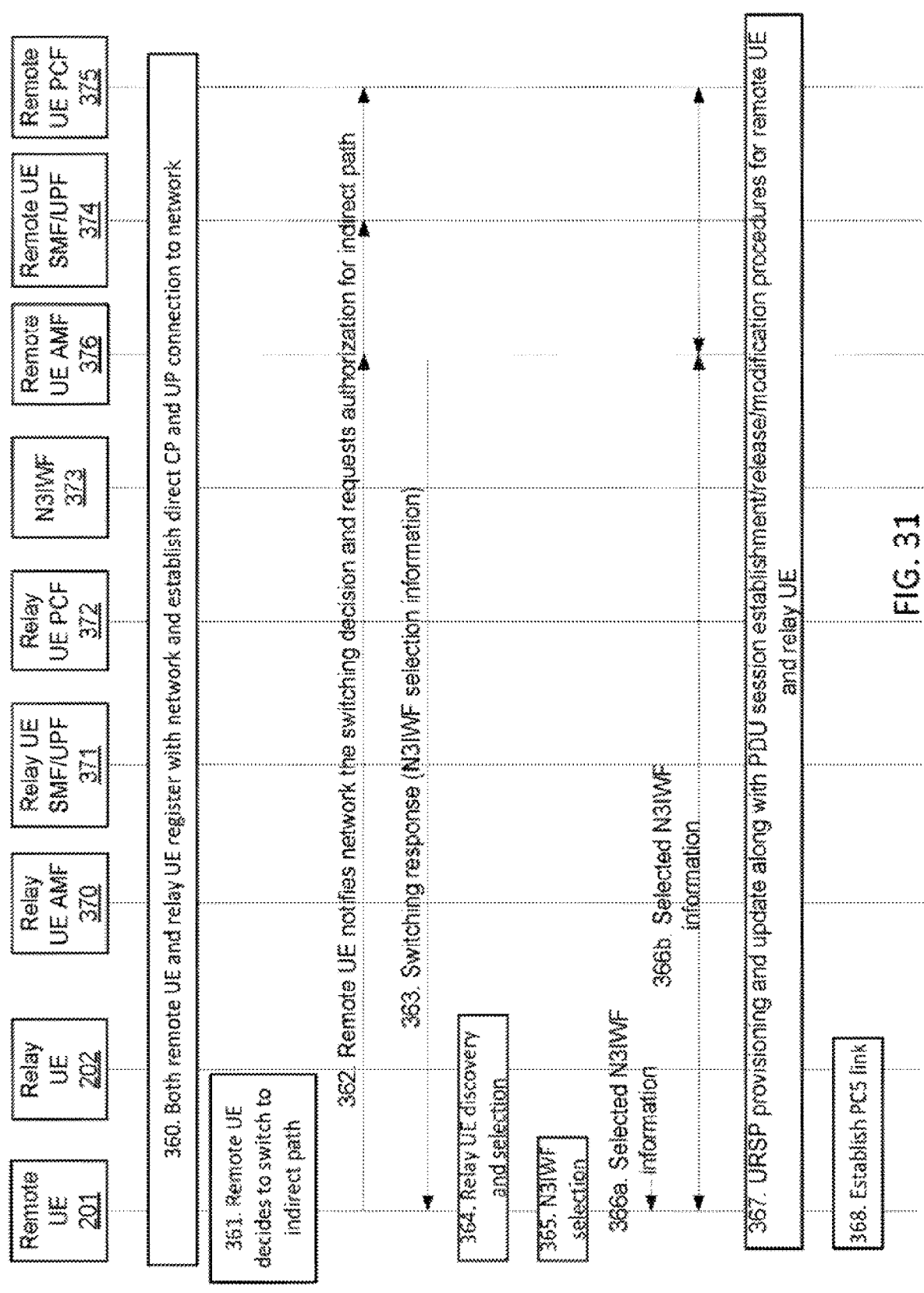
FIG. 31 shows an example Path Switching from Direct to Indirect Path with N3IWF involved.

This section presents the procedures of path switching for the remote UE 201 based on the N3IWF architecture to support the UE-to-Network relay. FIG. 31 shows the procedure of switching from direct path to indirect path, which may include the N3IWF forwarding for the remote UE 201. The following exemplary steps are presented with consideration of N3IWF related message and information exchange.

Step 360: both remote UE 201 and relay UE 202 register with their respective networks and have direct CP and UP connection to their respective network. Step 361: the remote UE 201 decides to switch to indirect path. This could be triggered on several triggering events as discussed herein. In addition, the RAN node and network functions may also trigger the switch (not shown in the figure). For example, RAN node may start the switch by finding that the signal is too weak for the remote UE 201. Network functions (such as SMF or AMF) may do so due to UP or network congestion.

Step 362: the remote UE 201 sends a switching request to network for authorization. The remote UE 201 may request whether the N3IWF based relay is supported or not and request the N3IWF information and corresponding PLMN information for N3IWF selection process. In addition, the remote UE 201 may indicate whether it prefers the N3IWF based indirect path, or traditional UE-to-Network Relay indirect path, or no preference. Step 363: the network performs the authorization for use of indirect path and sends back the response to the remote UE 201. It is assumed that the N3IWF based indirect path is authorized. In the response message, network may indicate that the N3IWF based indirect path is authorized, and a N3IWF selection policy/rule may be included to give the remote UE 201 some instructions on how to select a N3IWF. For example, the policy could include a list of N3IWFs with address/ID information, service area and associated PLMN information. The policy may also indicate that the remote UE 201 needs to perform the relay UE 202 selection first, and then N3IWF selection. Moreover, the policy may indicate that the N3IWF that is in the PLMN as the selected relay UE 202 is preferred. Alternatively, the remote UE 201 may perform the relay UE 202 selection along with the N3IWF selection, which may have better selection results.

Step 364: the remote UE 201 performs the relay UE 202 discovery and selection. During this process, the remote UE 201 may get some N3IWF information, DNN information, and PLMN information when the relay UE 202 broadcasts the discovery information, so that the remote UE 201 knows which relay UE 202$s$ support connecting to which N3IWF in which PLMN. This will help N3IWF selection later. Step 365: the remote UE 201 selects an N3IWF based on N3IWF selection policy rule and information received from network and the relay UE 202 in step 363 and step 364. Step 366: the remote UE 201 notifies the selected relay UE 202 which N3IWF it selects over the PC5, so that the relay UE 202 know where to forward the remote UE 201's message. As disclosed herein, not all steps need to occur. For example, step 366 may be included or not included in this method.

Step 367: PDU session establishment, release, or modification procedures are performed respectively for remote UE 201 and relay UE 202. For the relay UE 202, network may trigger PDU session establishment to establish a new PDU session, or PDU session modification to update the QoS rules and session context information (e.g., N3IWF ID as DNN) for relaying remote UE 201's CP/UP traffic. For the remote UE 201, the old session via the old AMF will be released or deactivated. A new end-to-end PDU session will be established with a new anchor UPF and the selected N3IWF in the path. In addition, both remote UE 201 and relay UE 202 are provided with updated URSP to reflect the user plane configuration change from PCF. The URSP provisioning may also be performed separately as the PCF may initiate the UE configuration update procedure. Step 368: PC5 communication link is established between the remote UE 201 and the relay UE 202.

Figure 32:
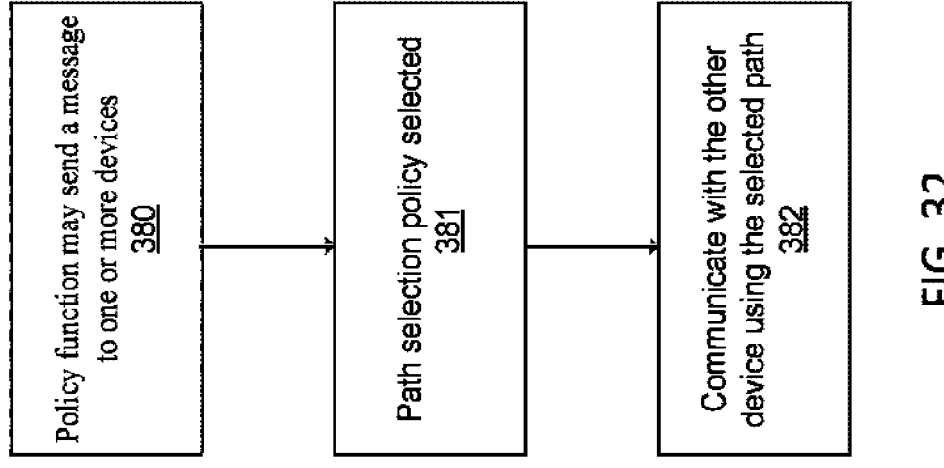
FIG. 32 shows an example of flow chart of Path Selection Policy Provisioning and Path Selection

FIG. 32 illustrates an exemplary method for a system that interacts with a policy control function. At step 380, a policy function may send a message to one or more devices (e.g., UE 201). The message may include a path selection policy. The path selection policy, for example, may include one or more policies for direct communication with other devices (e.g., UE 202). At step 381, the path selection policy may be generated, sent, selected, or executed based on configuration information from an application function or other network functions. In an example, a path may be selected for user equipment 201 to communicate with other user equipment, such as user equipment 202, based on the path selection policy. At step 382, the device (e.g., user equipment 201) may communicate with the other device using the selected path.

The method of FIG. 32 may include one or more of the following features. In a first example, an application descriptor may be used as a factor (e.g., trigger) to determine an application the path selection policy applies to. The application descriptor may include an application identifier. In a second example, the path selection policy may include radio quality criteria or another criteria as disclosed herein. The radio quality criteria may include a threshold radio measurement for determining communication path via a PC5 path or a 5GC path, for example. In a third example, the path selection policy may include location information. The location information may be indicative the area the path selection policy applies to. The location information may include tracking/registration area information or geographic area information, among others. In a fourth example, the path selection policy may include communication mode information. The communication mode information may be indicative of the path to select when executing a particular communication mode. For instance, the communication mode information may include a cast type (e.g., multicast, unicast, or the like). In a fifth example, the path selection policy may include a time period that is indicative of the period the path selection policy is valid.

With continued reference to the features, in a sixth example, the path selection policy may include DNN information or network slice information that is indicative of a data network or a network slice in which the policy is applied to. In a seventh example, there may be an indication of a selection of a new path. Based on the indication of the selection of the new path, there may be a switch from an old path to the new path. For instance, the switching from the old path to the new path may include switching from a 5GC path to a PC5 path, switching from the PC5 path to the 5GC path, or the like, as disclosed herein. In an eighth example, based on the indication of a switch (e.g., to a PC5 path in order to communicate with another user equipment), charging report may be forwarded to an account data forwarding function. In a ninth example, the message may include contact information for an account data forwarding function and configuration information on how to report PC5 communication to a network device. The configuration information, for instance, may include a process for 1) sending a PC5 charging report through a control plane path (NAS) or user plane path to the account data forwarding function; or 2) sending a PC5 charging report through a user plane path to the account data forwarding function among other things. In a tenth example, the message may include information, such as a parameter, as disclosed herein. The parameter may be indicative of a role of the user equipment. In eleventh example, the URSP provisioning may be performed separately as the PCF may initiate the UE configuration update procedure. In a twelfth example, the remote UE notifies the selected relay UE which N3IWF it selects over the PC5, so that the relay UE know where to forward the remote UE's message.

It is contemplated herein that steps (e.g., step 380, step 351, or features) may be processed on one or more physical or virtual devices. As described herein, the features or steps of a particular method associated with a figure, for example, is not generally exclusive to that figure and may be combined with other figures or subtracted from such method.

The parameters involved in path switch process may be provisioned by the end user (UE), network operator, or application service provider through a user interface. In addition, the switching UE, the relay UE, or network devices associated with a network operator's core network may retrieve or display the statistics through the user interface. The user interface may be implemented for configuring or programming those parameters with default values, as well as enabling or disabling path switch process. An exemplary user interface is shown in FIG. 33. FIG. 34 shows another exemplary user interface that may be implemented for configuring or programming a path selection policy for a NCIS application.

It is understood that the entities performing the steps illustrated herein, such as in FIG. 21, FIG. 22, FIG. 23, FIG. 24, FIG. 25, FIG. 26, FIG. 27, FIG. 29, FIG. 30, FIG. 31, or FIG. 32, among others, may be logical entities. The steps may be stored in a memory of, and executing on a processor of, a device, server, or computer system such as those illustrated in FIG. 35F or FIG. 35G. Skipping steps, combining steps, or adding steps between exemplary methods disclosed herein (e.g., FIG. 21, FIG. 22, FIG. 23, FIG. 24, FIG. 25, FIG. 26, FIG. 27, FIG. 28A-FIG. 28B, FIG. 29, FIG. 30, FIG. 31, or FIG. 32, or FIG. 33, among others) is contemplated.

Table 1 or Table 2 provide acronyms or definitions that may appear in the above description. Unless otherwise specified, the acronyms used herein refer to the corresponding term listed below.

TABLE 1

| Acronym | Term |
| --- | --- |
| 5GC | 5G Core Network |
| AMF | Access and Mobility Management Function |
| API | Application Program Interface |
| AS | Application Server |
| CM | Connection Management |
| CN | Core Network |
| CP | Control Plane |
| DL | Downlink |
| EM | Electro-Magnetic |
| EPC | Evolved Packet Core |
| EPS | Evolved Packet System |
| GUTI | Globally Unique Temporary UE Identity |
| HSS | Home Subscriber Server |
| IE | Information Element |
| IMSI | International Mobile Subscriber Identity |
| LTE | Long Term Evolution |
| MM | Mobility Management |
| MME | Mobility Management Entity |
| N3IWF | Non-3GPP Interworking Function |
| NAS | Non-Access Stratum |
| NF | Network Function |
| NIDD | Non-IP Data Delivery |
| NCIS | Network Controlled Interactive Service |
| NSI | Network Slice Instance |
| NWDAF | Network Data Analytics Function |
| PCF | Policy Control Function |
| PDN | Packet Data Network |
| PDU | Packet Data Unit |
| P-GW | PDN Gateway |
| ProSe | Proximity Service |
| QoS | Quality of Service |
| RAN | Radio Access Network |
| RAT | Radio Access Technology |
| RM | Registration Management |
| SSC | Session and Service Continuity |
| S-GW | Serving Gateway |
| SM | Session Management |
| SMF | Session Management Function |
| S-NSSAI | Single Network Slice Selection Assistance Information |
| UE | User Equipment |
| UL | Uplink |
| UP | User Plane |

The following is a list of definitions that may appear in the above description. Unless otherwise specified, the terms used herein refer to the corresponding definitions listed in Table 2.

TABLE 2

| Term | Definition |
| --- | --- |
| Network Function (NF) | A NF is a processing function in a network, which has defined functional behavior and defined interfaces. A NF can be implemented either as a network element on a dedicated hardware, or as a software instance running on a dedicated hardware, or as a virtualized function instantiated on an appropriate platform, e.g. on a cloud infrastructure. |
| Remote UE | A UE that is out of communication range of a base station and needs a relay UE to relay its traffic to/from mobile core network. In the context of multi-hop relay, a Remote UE is an end UE, which connects to a UE that is closer to the network. |
| Relay UE | A UE that forwards the traffic between a remote UE and mobile core network. A relay UE could be a UE-to-Network Relay or UE-to-UE relay. |

TABLE 2-continued

| Term | Definition |
|---|---|
| UE-to-Network Relay | A UE stays in the middle of a remote UE/UE-to-UE relay and base station. It directly connects to abase station and relays the traffic from (to) a remote UE to (from) the base station and core network. |
| UE-to-UE relay | A UE stays in the middle of a multi-hop relay chain but does not have direct connection to the base station. A UE-to-UE relay stays between remote UE and a UE-to-Network Relay and relies on the UE-to-Network Relay to connect to the network. |
| eRelay-UE | a Layer 2 relay in which a UE supports Indirect 3GPP Communication between an eRemote-UE and the 3 GPP network, using E-UTRA, WLAN or Bluetooth between the eRemote-UE and the relay. |
| eRemote-UE | a UE that is connected to a network using an Indirect 3GPP Communication. |
| Switching UE | A UE that intends to switch from indirect to direct path in order to connect to the network, or vice versa. |
| Direct Connection (Path) | A communication path to the core network that a UE can reach the network by directly connecting to a base station |
| Indirect Connection (Path) | A communication path to the core network that a UE has to go through at least 1 relay UE in order to reach a base station and the network |
| PDU Session Context | Information about a PDU Session, including a PDU Session ID, S-NSSAI, SSC Mode. PDLI Session Type, IP Address, and DNN |
| UE context information | May refer to AMF Context Information that may include the SUPI, DRX parameters, AM policy information, UE Radio Capability ID, PCF ID, UE network capability', used N1 security context information, event subscriptions by other consumer NF, and the list of SM PDU Session IDs along with the SMF handling the PDU Session. |
| Session Context Information | May refer to SM Context Information that may include an SM Context ID. PDU Session Context, UE location information (ULI), UE Time Zone. AN type, H-SMF SM Context ID (from H-SMF to V-SMF), QoS Rule and QoS Flow level QoS parameters if any for the QoS Flow associated with the QoS rule (from H-SMF to V-SMF), N9 Tunnel Info (from V-SMF to H-SMF), Information requested by UE for e.g. QoS (from V-SMF to H-SMF), 5GSM Core Network Capability. Infonnation necessary for V-SMF to build SM Message towards the UE (from H-SMF to V-SMF), Trigger PDU release indication (V-SMF to H-SMF), DN Request Container information, indication that the UE shall not be notified, EBI Allocation Parameters (ARP list), Secondary RAT usage data, indication that the access type of the PDU session can be changed (V-SMF to H-SMF), Small Data Rate Control Status (from H-SMF to V-SMF), APN Rate Control Status (from H-SMF to V-SMF). |
| UE-to-UE Communication in NCIS | The data transfer between two UEs for NCIS applications. Data may be routed through the 5GC path, or directly exchanged over PC5 interface (also called PC5 path). |
| 5GC path communications | Communications between UEs whose traffic are routed through the core network; this includes both Direct and Indirect communications. |
| PC5 path communications | Communications between UEs whose traffic are not routed through the core network |

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), LTE-Advanced standards, and New Radio (NR), which is also referred to as "5G". 3GPP NR standards development is expected to continue and include the definition of next generation radio access technology (new RAT), which is expected to include the provision of new flexible radio access below 7 GHz, and the provision of new ultra-mobile broadband radio access above 7 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 7 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (eM1) ultra-reliable low-latency Communication (URLLC), massive machine type communications (mMTC), network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, virtual reality, home automation, robotics, and aerial drones to name a few. All of these use cases and others are contemplated herein.

Figure 35A:
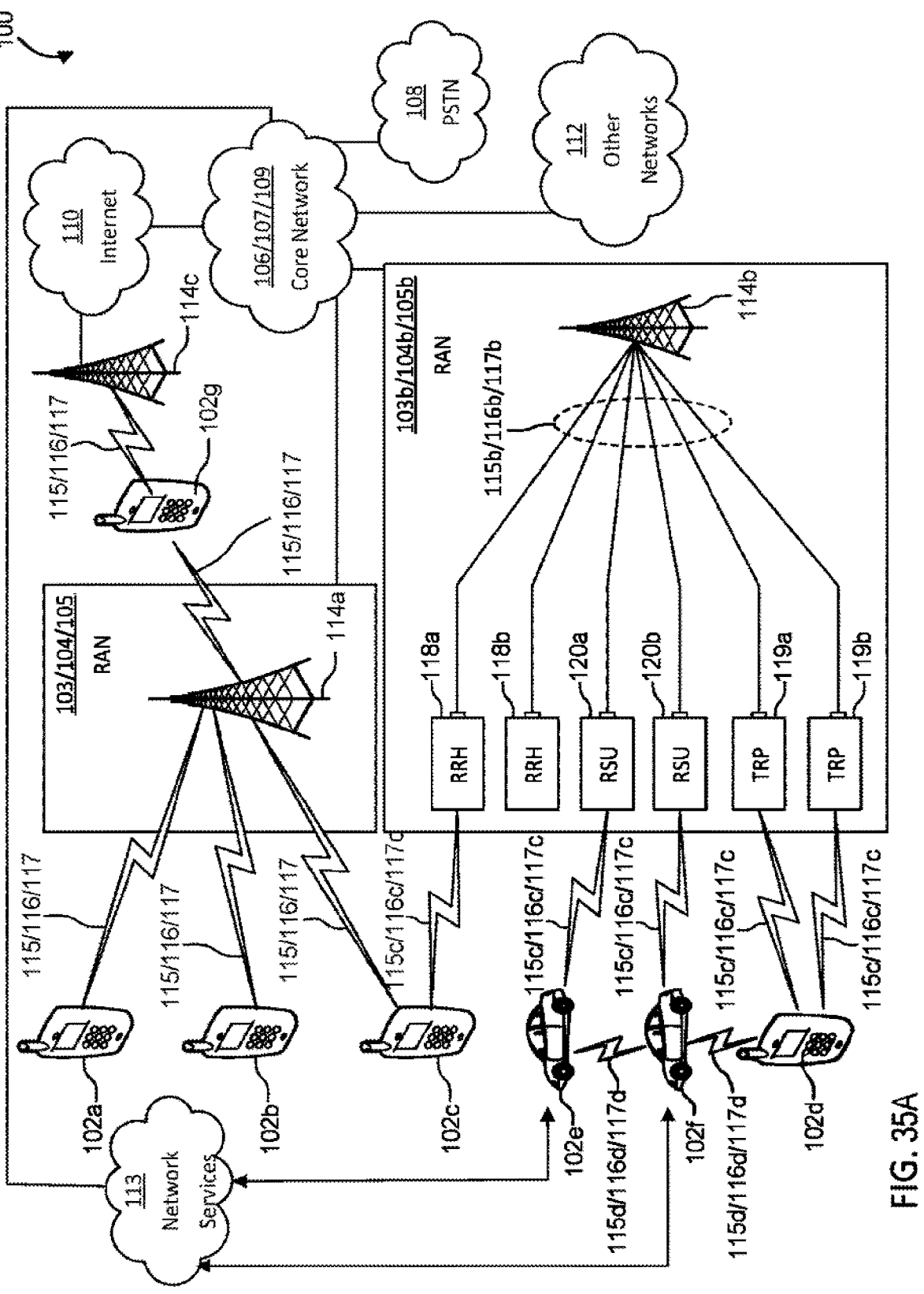
FIG. 35A illustrates an example communications system.

FIG. 35A illustrates an example communications system 100 in which the methods and apparatuses of path switching or NCIS, among other things as disclosed herein, such as the systems and methods illustrated in FIG. 1 through FIG. 32 described and claimed herein may be used. The communications system 100 may include wireless transmit/receive units (WTRUs) 102a, 102b, 102c, 102d, 102e, 102f, or 102g (which generally or collectively may be referred to as WTRU 102 or WTRUs 102). The communications system 100 may include, a radio access network (RAN) 103/104/105/103b/104b/105b, a core network 106/107/109, a public switched telephone network (PSTN) 108, the Internet 110, other networks 112, and Network Services 113. Network Services 113 may include, for example, a V2X server, V2X functions, a ProSe server, ProSe functions, IoT services, video streaming, or edge computing, etc.

It will be appreciated that the concepts disclosed herein may be used with any number of WTRUs, base stations, networks, or network elements. Each of the WTRUs 102a, 102b, 102c, 102d, 102e, 102f, or 102g may be any type of apparatus or device configured to operate or communicate in a wireless environment. Although each WTRU 102a, 102b, 102c, 102d, 102e, 102f, or 102g may be depicted in FIG. 35A, FIG. 35B, FIG. 35C, FIG. 35D, FIG. 35E, or FIG. 35F as a hand-held wireless communications apparatus, it is understood that with the wide variety of use cases contemplated for 5G wireless communications, each WTRU may comprise or be embodied in any type of apparatus or device configured to transmit or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, bus, truck, train, or airplane, and the like.

The communications system 100 may also include a base station 114a and a base station 114b. In the example of FIG. 35A, each base stations 114a and 114b is depicted as a single element. In practice, the base stations 114a and 114b may include any number of interconnected base stations or network elements. Base stations 114a may be any type of device configured to wirelessly interface with at least one of the WTRUs 102a, 102b, and 102c to facilitate access to one or more communication networks, such as the core network 106/107/109, the Internet 110, Network Services 113, or the other networks 112. Similarly, base station 114b may be any type of device configured to wiredly or wirelessly interface with at least one of the Remote Radio Heads (RRHs) 118a, 118b, Transmission and Reception Points (TRPs) 119a, 119b, or Roadside Units (RSUs) 120a and 120b to facilitate access to one or more communication networks, such as the core network 106/107/109, the Internet 110, other networks 112, or Network Services 113. RRHs 118a, 118b may be any type of device configured to wirelessly interface with at least one of the WTRUs 102, e.g., WTRU 102c, to facilitate access to one or more communication networks, such as the core network 106/107/109, the Internet 110, Network Services 113, or other networks 112

TRPs 119a, 119b may be any type of device configured to wirelessly interface with at least one of the WTRU 102d, to facilitate access to one or more communication networks, such as the core network 106/107/109, the Internet 110, Network Services 113, or other networks 112. RSUs 120a and 120b may be any type of device configured to wirelessly interface with at least one of the WTRU 102e or 102f, to facilitate access to one or more communication networks, such as the core network 106/107/109, the Internet 110, other networks 112, or Network Services 113. By way of example, the base stations 114a, 114b may be a Base Transceiver Station (BTS), a Node-B, an eNode B, a Home Node B, a Home eNode B, a Next Generation Node-B (gNode B), a satellite, a site controller, an access point (AP), a wireless router, and the like.

The base station 114a may be part of the RAN 103/104/105, which may also include other base stations or network elements (not shown), such as a Base Station Controller (BSC), a Radio Network Controller (RNC), relay nodes, etc. Similarly, the base station 114b may be part of the RAN 103b/104b/105b, which may also include other base stations or network elements (not shown), such as a BSC, a RNC, relay nodes, etc. The base station 114a may be configured to transmit or receive wireless signals within a particular geographic region, which may be referred to as a cell (not shown). Similarly, the base station 114b may be configured to transmit or receive wired or wireless signals within a particular geographic region, which may be referred to as a cell (not shown) for methods, systems, and devices of path switching or NCIS, among other things, as disclosed herein. Similarly, the base station 114b may be configured to transmit or receive wired or wireless signals within a particular geographic region, which may be referred to as a cell (not shown). The cell may further be divided into cell sectors. For example, the cell associated with the base station 114a may be divided into three sectors. Thus, in an example, the base station 114a may include three transceivers, e.g., one for each sector of the cell. In an example, the base station 114a may employ multiple-input multiple output (MIMO) technology and, therefore, may utilize multiple transceivers for each sector of the cell.

The base stations 114a may communicate with one or more of the WTRUs 102a, 102b, 102c, or 102g over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, or RSUs 120a, 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, or 102f may communicate with one another over an air interface 115d/

116*d*/117*d*, such as Sidelink communication, which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

The communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f,* may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) or Evolved HSPA (HSPA+). HSPA may include High-Speed Downlink Packet Access (HSDPA) or High-Speed Uplink Packet Access (HSUPA).

In an example, the base station 114*a* and the WTRUs 102*a*, 102*b*, 102*c*, or RRHs 118*a*, 118*b*, TRPs 119*a*, 119*b*, or RSUs 120*a*, 120*b* in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) or LTE-Advanced (LTE-A). In the future, the air interface 115/116/117 or 115*c*/116*c*/117*c* may implement 3GPP NR technology. The LTE and LTE-A technology may include LTE D2D and V2X technologies and interfaces (such as Sidelink communications, etc.). Similarly, the 3GPP NR technology includes NR V2X technologies and interface (such as Sidelink communications, etc.).

The base station 114*a* in the RAN 103/104/105 and the WTRUs 102*a*, 102*b*, 102*c*, and 102*g* or RRHs 118*a*, 118*b*, TRPS 119*a*, 119*b* or RSUs 120*a*, 120*b* in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 35A may be a wireless router, Home Node B, Home eNode B. or access point, for example, and may utilize any suitable RAT for facilitating wireless connectivity in a localized area, such as a place of business, a home, a vehicle, a train, an aerial, a satellite, a manufactory, a campus, and the like, for implementing the methods, systems, and devices of path switching or NCIS, among other things, as disclosed herein. In an example, the base station 114*c* and the WTRUs 102, e.g., WTRU 102*e*, may implement a radio technology such as IEEE 802.11 to establish a wireless local area network (WLAN). similarly, the base station 114*c* and the WTRUs 102*d*, may implement a radio technology such as IEEE 802.15 to establish a wireless personal area network (WPAN). In yet another example, the base station 114*c* and the WTRUs 102, e.g., WTRU 102*e*, may utilize a cellular-based RAT (e.g.; WCDMA, CDMA2000, GSM, LTE, LTE-A, NR, etc.) to establish a picocell or femtocell. As shown in FIG. 35A, the base station 114 may have a direct connection to the Internet 110. Thus, the base station 114*c* may not be required to access the Internet 110 via the core network 106/107/109.

The RAN 103/104/105 or RAN 103*b*/104*b*/105*b* may be in communication with the core network 106/107/109, which may be any type of network configured to provide voice, data, messaging, authorization and authentication, applications, or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, packet data network connectivity, Ethernet connectivity, video distribution, etc., or perform high-level security functions, such as user authentication.

Although not shown in FIG. 35A, it will be appreciated that the RAN 103/104/105 or RAN 103*b*/104*b*/105*b* or the core network 106/107/109 may be in direct or indirect communication with other RANs that employ the same RAT as the RAN 103/104/105 or RAN 103*b*/104*b*/105*b* or a different RAT. For example, in addition to being connected to the RAN 103/104/105 or RAN 103*b*/104*b*/105*b*, which may be utilizing an E-UTRA radio technology, the core network 106/107/109 may also be in communication with another RAN (not shown) employing a GSM or NR radio technology.

The core network 106/107/109 may also serve as a gateway for the WTRUs 102*a*, 102*b*, 102*c*, 102*d*, 102*e* to access the PSTN 108, the Internet 110, or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned or operated by other service providers. For example, the networks 112 may include any type of packet data network (e.g., an IEEE 802.3 Ethernet network) or another core network connected to one or more RANs, which may employ the same RAT as the RAN 103/104/105 or RAN 103*b*/104*b*/105*b* or a different RAT.

Some or all of the WTRUs 102*a*, 102*b*, 102*c*, 102*d*, 102*e*, and 102*f* in the communications system 100 may include multi-mode capabilities, e.g., the WTRUs 102*a*, 102*b*, 102*c*, 102*d*, 102*e*, and 102*f* may include multiple transceivers for communicating with different wireless networks over different wireless links for implementing methods, systems, and devices of path switching or NCIS; among other things, as disclosed herein. For example, the WTRU 102*g* shown in FIG. 35A may be configured to communicate with the base station 114*a*, which may employ a cellular-based radio technology, and with the base station 114*c*, which may employ an IEEE 802 radio technology.

Although not shown in FIG. 35A, it will be appreciated that a User Equipment may make a wired connection to a gateway. The gateway may be a Residential Gateway (RG). The RG may provide connectivity to a Core Network 106/107/109. It will be appreciated that much of the subject matter included herein may equally apply to UEs that are WTRUs and UEs that use a wired connection to connect with a network. For example, the subject matter that applies to the wireless interfaces 115, 116, 117 and 115*c*/116*c*/117*c* may equally apply to a wired connection.

Figure 35B:
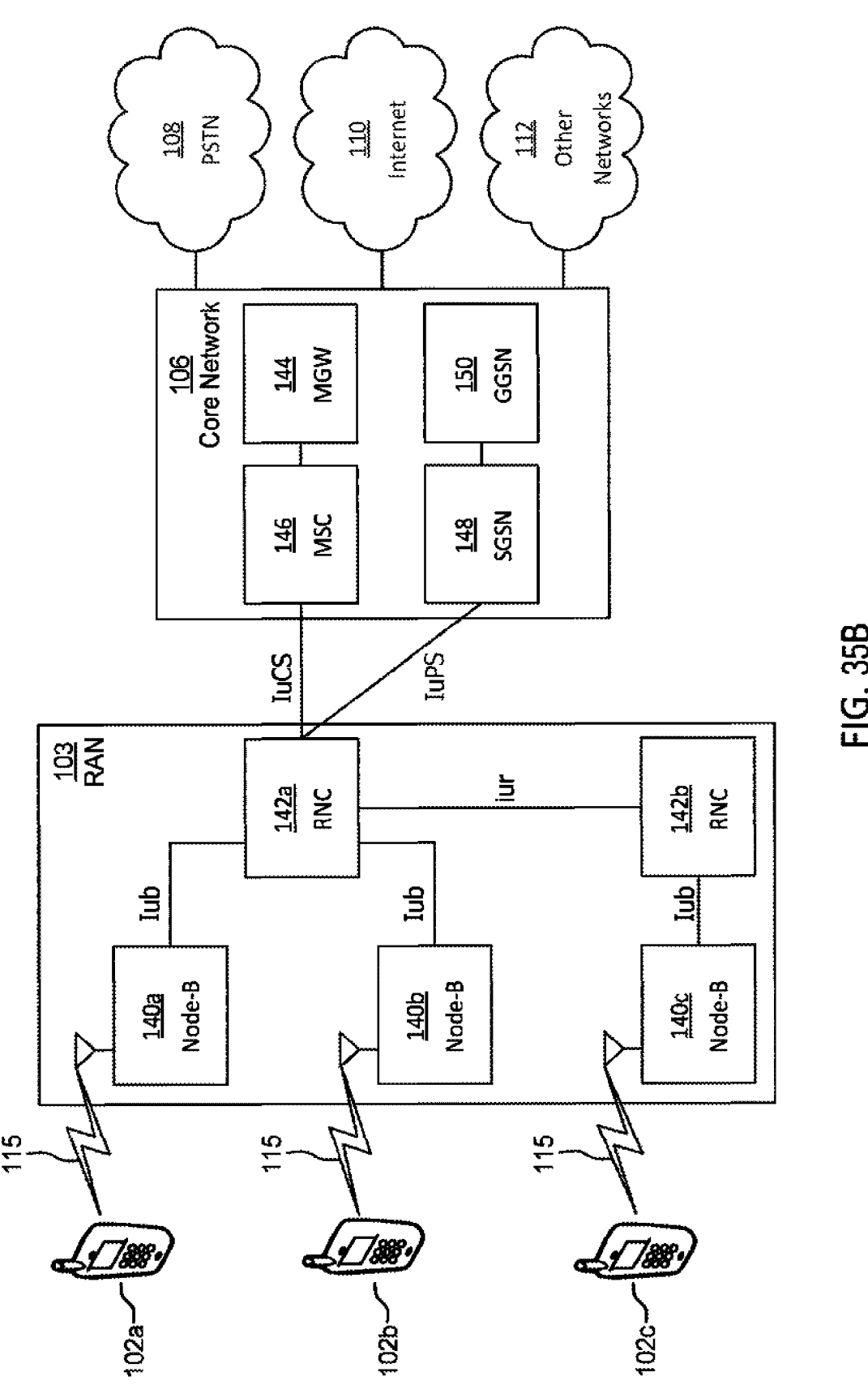
FIG. 35B illustrates an exemplary system that includes RANs and core networks.

FIG. 35B is a system diagram of an example RAN 103 and core network 106 that may implement methods, systems, and devices of path switching or NCIS, among other things, as disclosed herein. As noted above, the RAN 103 may employ a UTRA radio technology to communicate with the WTRUs 102a, 102b, and 102c over the air interface 115. The RAN 103 may also be in communication with the core network 106. As shown in FIG. 35B, the RAN 103 may include Node-Bs 140a, 140b, and 140c, which may each include one or more transceivers for communicating with the WTRUs 102a, 102b, and 102c over the air interface 115. The Node-Bs 140a, 140b, and 140c may each be associated with a particular cell (not shown) within the RAN 103. The RAN 103 may also include RNCs 142a, 142b. It will be appreciated that the RAN 103 may include any number of Node-Bs and Radio Network Controllers (RNCs.)

As shown in FIG. 35B, the Node-Bs 140a, 140b may be in communication with the RNC 142a. Additionally, the Node-B 140c may be in communication with the RNC 142b. The Node-Bs 140a, 140b, and 140c may communicate with the respective RNCs 142a and 142b via an Iub interface. The RNCs 142a and 142b may be in communication with one another via an Iur interface. Each of the RNCs 14212nd 142b may be configured to control the respective Node-Bs 140a, 140b, and 140c to which it is connected. In addition, each of the RNCs 14212nd 142b may be configured to carry out or support other functionality, such as outer loop power control, load control, admission control, packet scheduling, handover control, macro-diversity, security functions, data encryption, and the like.

The core network 106 shown in FIG. 35B may include a media gateway (MGW) 144, a Mobile Switching Center (MSC) 146, a Serving GPRS Support Node (SGSN) 148, or a Gateway GPRS Support Node (GGSN) 150. While each of the foregoing elements are depicted as part of the core network 106, it will be appreciated that any one of these elements may be owned or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and 102c with access to circuit-switched networks, such as the PSTN 108, to facilitate communications between the WTRUs 102a, 102b, and 102c, and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and 102c with access to packet-switched networks, such as the Internet 110, to facilitate communications between and the WTRUs 102a, 102b, and 102c, and IP-enabled devices.

The core network 106 may also be connected to the other networks 112, which may include other wired or wireless networks that are owned or operated by other service providers.

Figure 35C:
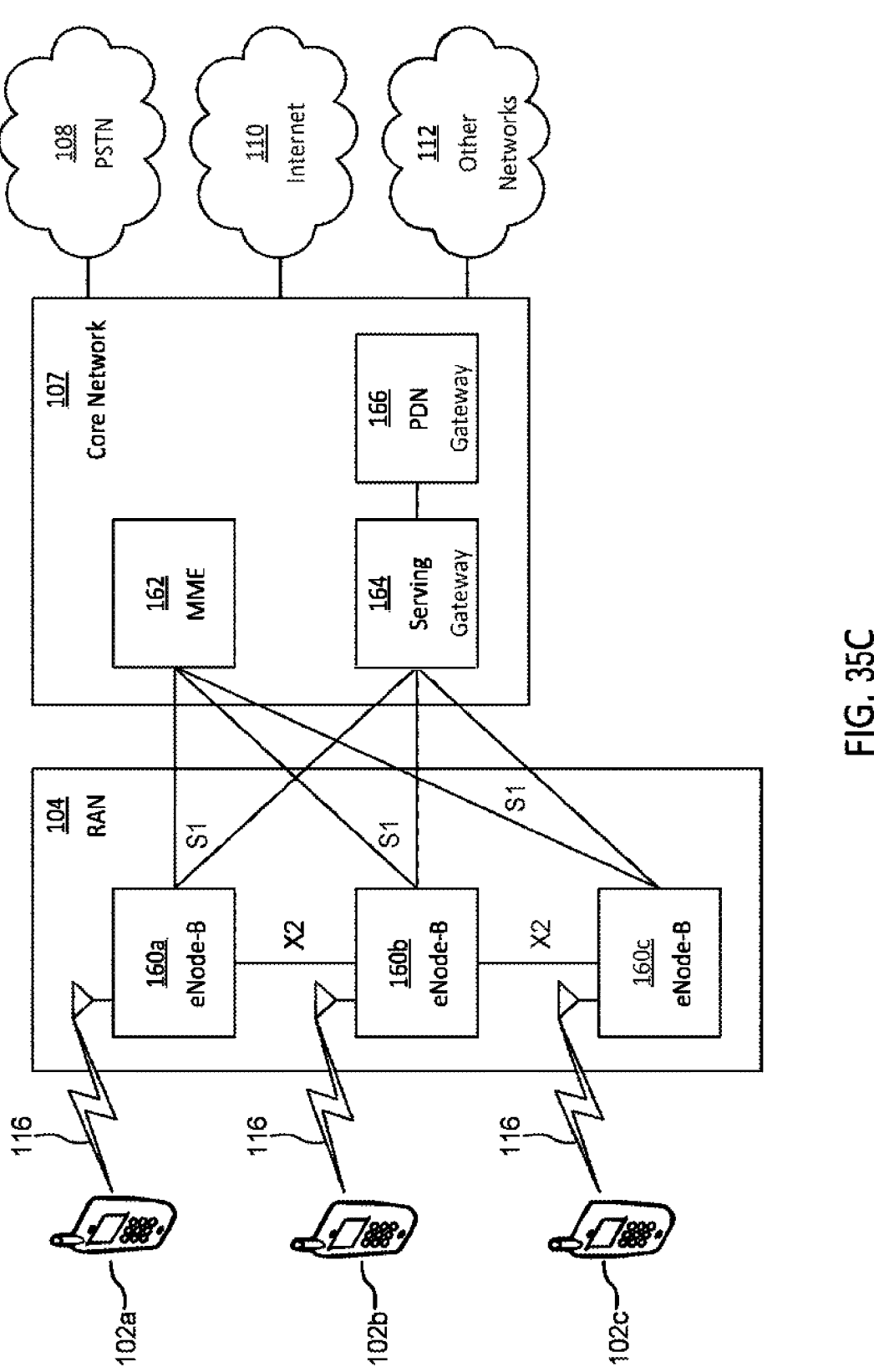
FIG. 35C illustrates an exemplary system that includes RANs and core networks.

FIG. 35C is a system diagram of an example RAN 104 and core network 107 that may implement methods, systems, and devices of path switching or NCIS, among other things, as disclosed herein. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, and 160c, though it will be appreciated that the RAN 104 may include any number of eNode-Bs. The eNode-Bs 160a, 160b, and 160c may each include one or more transceivers for communicating with the WTRUs 102a, 102b, and 102c over the air interface 116. For example, the eNode-Bs 160a, 160b, and 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink or downlink, and the like. As shown in FIG. 35C, the eNode-Bs 160a, 160b, and 160c may communicate with one another over an X2 interface.

The core network 107 shown in FIG. 35C may include a Mobility Management Gateway (MME) 162, a serving gateway 164, and a Packet Data Network (PDN) gateway 166. While each of the foregoing elements are depicted as part of the core network 107, it will be appreciated that any one of these elements may be owned or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, and 102c, bearer activation/deactivation, selecting a particular serving gateway during an initial attach of the WTRUs 102a, 102b, and 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, and 102c. The serving gateway 164 may also perform other functions, such as anchoring user planes during inter-eNode B handovers, triggering paging when downlink data is available for the WTRUs 102a, 102b, and 102c, managing and storing contexts of the WTRUs 102a, 102b, and 102c, and the like.

The serving gateway 164 may also be connected to the PDN gateway 166, which may provide the WTRUs 102a, 102b, and 102c with access to packet-switched networks, such as the Internet 110, to facilitate communications between the WTRUs 102a, 102b, 102c, and IP-enabled devices.

The core network 107 may facilitate communications with other networks. For example, the core network 107 may provide the WTRUs 102a, 102b, and 102c with access to circuit-switched networks, such as the PSTN 108, to facilitate communications between the WTRUs 102a, 102b, and 102c and traditional land-line communications devices. For example, the core network 107 may include, or may communicate with, an IP gateway (e.g., an IP Multimedia Subsystem (IMS) server) that serves as an interface between the core network 107 and the PSTN 108. In addition, the core network 107 may provide the WTRUs 102a, 102b, and 102c with access to the networks 112, which may include other wired or wireless networks that are owned or operated by other service providers.

Figure 35D:
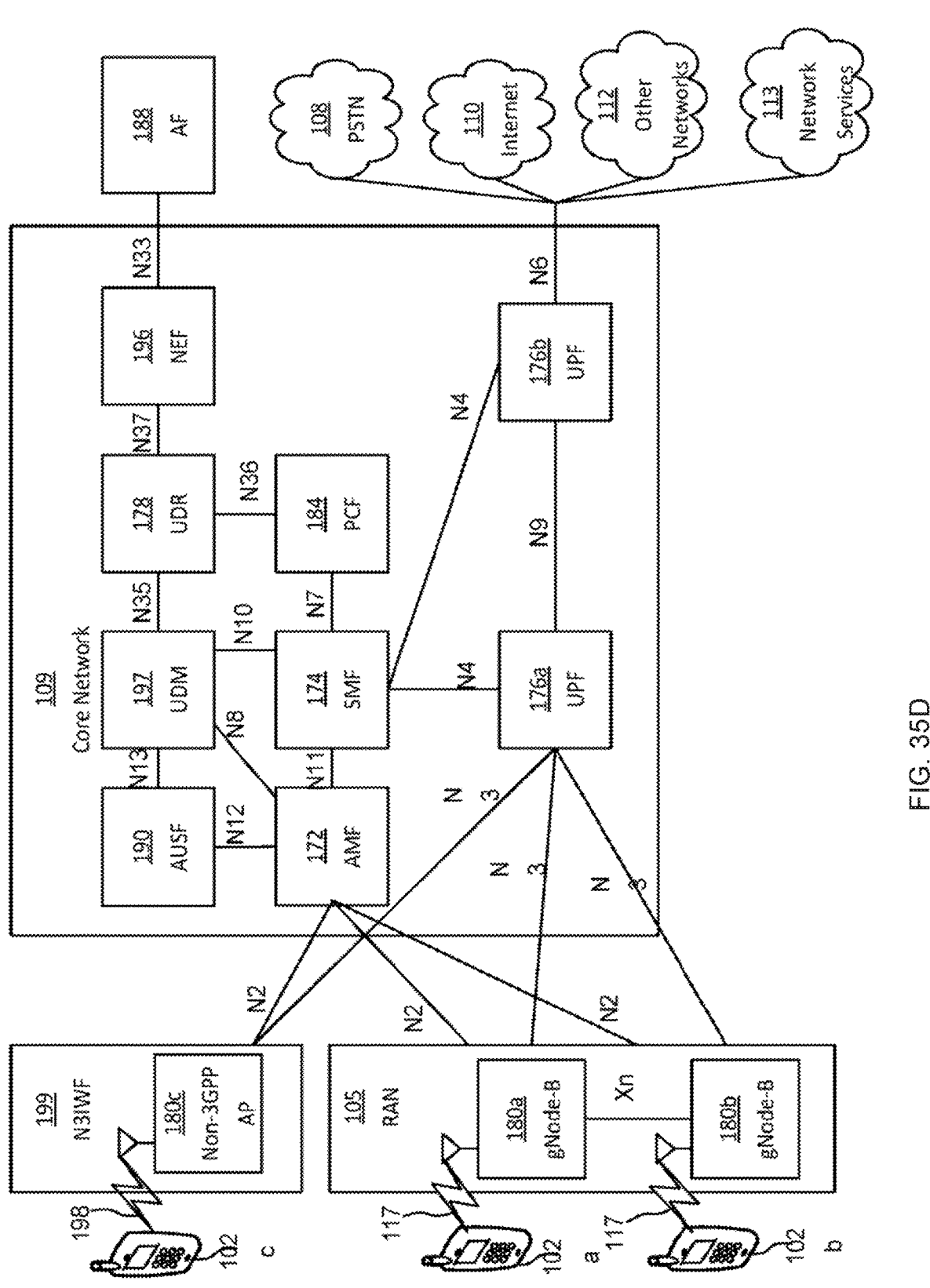
FIG. 35D illustrates an exemplary system that includes RANs and core networks.

FIG. 35D is a system diagram of an example RAN 105 and core network 109 that may implement methods, systems, and devices of path switching or NCIS, among other things, as disclosed herein. The RAN 105 may employ an NR radio technology to communicate with the WTRUs 102a and 102b over the air interface 117. The RAN 105 may also be in communication with the core network 109. A Non- 3GPP Interworking Function (N3IWF) 199 may employ a non-3GPP radio technology to communicate with the WTRU 102c over the air interface 198. The N3IWF 199 may also be in communication with the core network 109.

The RAN 105 may include gNode-Bs 180a and 180b. It will be appreciated that the RAN 105 may include any number of gNode-Bs. The gNode-Bs 180a and 180b may each include one or more transceivers for communicating with the WTRUs 102a and 102b over the air interface 117. When integrated access and backhaul connection are used, the same air interface may be used between the WTRUs and gNode-Bs, which may be the core network 109 via one or multiple gNBs. The gNode-Bs 180a and 180b may implement MIMO, MU-MIMO, or digital beamforming technology. Thus, the gNode-B 180a, for example, may use multiple antennas to transmit wireless signals to, and receive wireless signals from, the WTRU 102a. It should be appreciated that the RAN 105 may employ of other types of base stations such as an eNode-B. It will also be appreciated the RAN 105 may employ more than one type of base station. For example, the RAN may employ eNode-Bs and gNode-Bs.

The N3IWF 199 may include a non-3GPP Access Point 180c. It will be appreciated that the N3IWF 199 may include any number of non-3GPP Access Points. The non-3GPP Access Point 180c may include one or more transceivers for communicating with the WTRUs 102c over the air interface 198. The non-3GPP Access Point 180c may use the 802.11 protocol to communicate with the WTRU 102c over the air interface 198.

Each of the gNode-Bs 180a and 180b may be associated with a particular cell (not shown) and may be configured to handle radio resource management decisions, handover decisions, scheduling of users in the uplink or downlink, and the like. As shown in FIG. 35D, the gNode-Bs 180a and 180b may communicate with one another over an Xn interface, for example.

The core network 109 shown in FIG. 35D may be a 5G core network (5GC). The core network 109 may offer numerous communication services to customers who are interconnected by the radio access network. The core network 109 comprises a number of entities that perform the functionality of the core network. As used herein, the term "core network entity" or "network function" refers to any entity that performs one or more functionalities of a core network. It is understood that such core network entities may be logical entities that are implemented in the form of computer-executable instructions (software) stored in a memory of, and executing on a processor of, an apparatus configured for wireless or network communications or a computer system, such as system 90 illustrated in FIG. 35G.

In the example of FIG. 35D, the 5G Core Network 109 may include an access and mobility management function (AMF) 172, a Session Management Function (SMF) 174, User Plane Functions (UPFs) 176a and 176b, a User Data Management Function (UDM) 197, an Authentication Server Function (AUSF) 190, a Network Exposure Function (NEF 313) 196, a Policy Control Function (PCF) 184, a Non-3GPP Interworking Function (N3IWF) 199, a User Data Repository (UDR) 178. While each of the foregoing elements are depicted as part of the 5G core network 109, it will be appreciated that any one of these elements may be owned or operated by an entity other than the core network operator. It will also be appreciated that a 5G core network may not consist of all of these elements, may consist of additional elements, and may consist of multiple instances of each of these elements. FIG. 35D shows that network functions directly connect with one another, however, it should be appreciated that they may communicate via routing agents such as a diameter routing agent or message buses.

In the example of FIG. 35D, connectivity between network functions is achieved via a set of interfaces, or reference points. It will be appreciated that network functions could be modeled, described, or implemented as a set of services that are invoked, or called, by other network functions or services. Invocation of a Network Function service may be achieved via a direct connection between network functions, an exchange of messaging on a message bus, calling a software function, etc.

The AMF 172 may be connected to the RAN 105 via an N2 interface and may serve as a control node. For example, the AMF 172 may be responsible for registration management, connection management, reachability management, access authentication, access authorization. The AMF may be responsible forwarding user plane tunnel configuration information to the RAN 105 via the N2 interface. The AMF 172 may receive the user plane tunnel configuration information from the SMF via an N11 interface. The AMF 172 may generally route and forward NAS packets to/from the WTRUs 102a, 102b, and 102c via an N1 interface. The N1 interface is not shown in FIG. 35D.

The SMF 174 may be connected to the AMF 172 via an N11 interface. Similarly the SMF may be connected to the PCF 184 via an N7 interface, and to the UPFs 176a and 176b via an N4 interface. The SMF 174 may serve as a control node. For example, the SMF 174 may be responsible for Session Management, IP address allocation for the WTRUs 102a, 102b, and 102c, management and configuration of traffic steering rules in the UPF 176a and UPF 176b, and generation of downlink data notifications to the AMF 172.

The UPF 176a and UPF 176b may provide the WTRUs 102a, 102b, and 102c with access to a Packet Data Network (PDN), such as the Internet 110, to facilitate communications between the WTRUs 102a, 102b, and 102c and other devices. The UPF 176a and UPF 176b may also provide the WTRUs 102a, 102b, and 102c with access to other types of packet data networks. For example, Other Networks 112 may be Ethernet Networks or any type of network that exchanges packets of data. The UPF 176a and UPF 176b may receive traffic steering rules from the SMF 174 via the N4 interface. The UPF 176a and UPF 176b may provide access to a packet data network by connecting a packet data network with an N6 interface or by connecting to each other and to other UPFs via an N9 interface. In addition to providing access to packet data networks, the UPF 176 may be responsible packet routing and forwarding, policy rule enforcement, quality of service handling for user plane traffic, downlink packet buffering.

The AMF 172 may also be connected to the N3IWF 199, for example, via an N2 interface. The N3IWF facilitates a connection between the WTRU 102c and the 5G core network 170, for example, via radio interface technologies that are not defined by 3GPP. The AMF may interact with the N3IWF 199 in the same, or similar, manner that it interacts with the RAN 105.

The PCF 184 may be connected to the SMF 174 via an N7 interface, connected to the AMF 172 via an N15 interface, and to an Application Function (AF) 188 via an N5 interface. The N15 and N5 interfaces are not shown in FIG. 35D. The PCF 184 may provide policy rules to control plane nodes such as the AMF 172 and SMF 174, allowing the control plane nodes to enforce these rules. The PCF 184, may send policies to the AMF 172 for the WTRUs 102a, 102b, and 102c so that the AMF may deliver the policies to the WTRUs 102a, 102b, and 102c via an N1 interface. Policies may then be enforced, or applied, at the WTRUs 102a, 102b, and 102c.

The UDR 178 may act as a repository for authentication credentials and subscription information. The UDR may connect with network functions, so that network function can add to, read from, and modify the data that is in the repository. For example, the UDR 178 may connect with the PCF 184 via an N36 interface. Similarly, the UDR 178 may connect with the NEF 313 196 via an N37 interface, and the UDR 178 may connect with the UDM 197 via an N35 interface.

The UDM 197 may serve as an interface between the UDR 178 and other network functions. The UDM 197 may authorize network functions to access of the UDR 178. For example, the UDM 197 may connect with the AMF 172 via an N8 interface, the UDM 197 may connect with the SMF 174 via an N10 interface. Similarly, the UDM 197 may connect with the AUSF 190 via an N13 interface. The UDR 178 and UDM 197 may be tightly integrated.

The AUSF 190 performs authentication related operations and connect with the UDM 178 via an N13 interface and to the AMF 172 via an N12 interface.

The NEF 313 196 exposes capabilities and services in the 5G core network 109 to Application Functions (AF) 188. Exposure may occur on the N33 API interface. The NEF 313 may connect with an AF 188 via an N33 interface and it may connect with other network functions in order to expose the capabilities and services of the 5G core network 109.

Application Functions 188 may interact with network functions in the 5G Core Network 109. Interaction between the Application Functions 188 and network functions may be via a direct interface or may occur via the NEF 313 196. The Application Functions 188 may be considered part of the 5G Core Network 109 or may be external to the 5G Core Network 109 and deployed by enterprises that have a business relationship with the mobile network operator.

Network Slicing is a mechanism that could be used by mobile network operators to support one or more 'virtual' core networks behind the operator's air interface. This involves 'slicing' the core network into one or more virtual networks to support different RANs or different service types running across a single RAN. Network slicing enables the operator to create networks customized to provide optimized solutions for different market scenarios which demands diverse requirements, e.g. in the areas of functionality, performance and isolation.

3GPP has designed the 5G core network to support Network Slicing. Network Slicing is a good tool that network operators can use to support the diverse set of 5G use cases (e.g., massive IoT, critical communications, V2X, and enhanced mobile broadband) which demand very diverse and sometimes extreme requirements. Without the use of network slicing techniques, it is likely that the network architecture would not be flexible and scalable enough to efficiently support a wider range of use cases need when each use case has its own specific set of performance, scalability, and availability requirements. Furthermore, introduction of new network services should be made more efficient.

Referring again to FIG. 35D, in a network slicing scenario, a WTRU 102a, 102b, or 102c may connect with an AMF 172, via an N1 interface. The AMF may be logically part of one or more slices. The AMF may coordinate the connection or communication of WTRU 102a, 102b, or 102c with one or more UPF 176a and 176b, SMF 174, and other network functions. Each of the UPFs 176a and 176b, SMF 174, and other network functions may be part of the same slice or different slices. When they are part of different slices, they may be isolated from each other in the sense that they may utilize different computing resources, security credentials, etc.

The core network 109 may facilitate communications with other networks. For example, the core network 109 may include, or may communicate with, an IP gateway, such as an IP Multimedia Subsystem (IMS) server, that serves as an interface between the 5G core network 109 and a PSTN 108. For example, the core network 109 may include, or communicate with a short message service (SMS) service center that facilities communication via the short message service. For example, the 5G core network 109 may facilitate the exchange of non-IP data packets between the WTRUs 102a, 102b, and 102c and servers or applications functions 188. In addition, the core network 170 may provide the WTRUs 102a, 102b, and 102c with access to the networks 112, which may include other wired or wireless networks that are owned or operated by other service providers.

The core network entities described herein and illustrated in FIG. 35A, FIG. 35C, FIG. 35D, or FIG. 35E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIG. 35A, FIG. 35B, FIG. 35C, FIG. 35D, or FIG. 35E are provided by way of example only, and it is understood that the subject matter disclosed and claimed herein may be embodied or implemented in any similar communication system, whether presently defined or defined in the future.

Figure 35E:
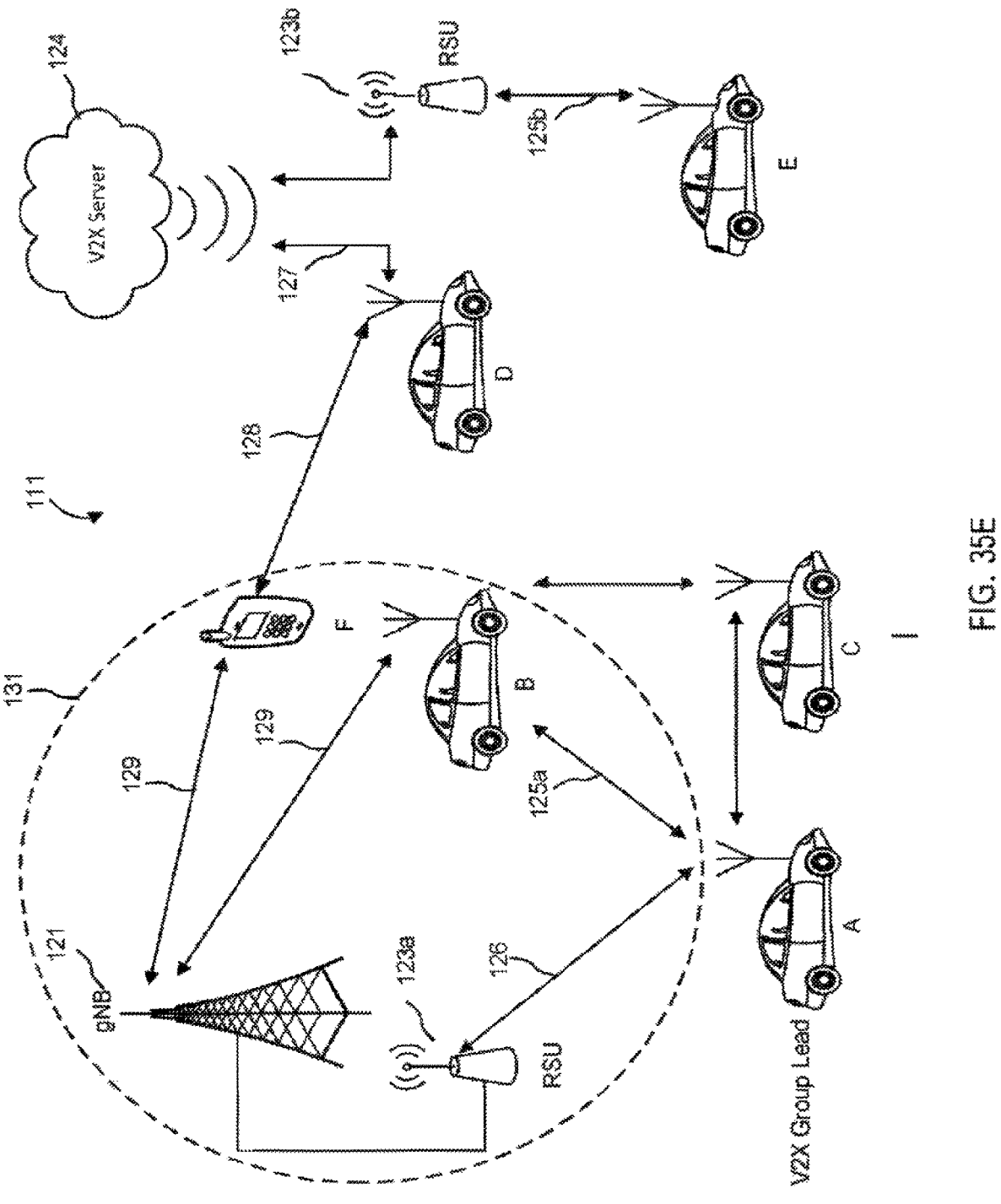
FIG. 35E illustrates another example communications system.

FIG. 35E illustrates an example communications system 111 in which the systems, methods, apparatuses that implement path switching or NCIS, among other things, described herein, may be used. Communications system 111 may include Wireless Transmit/Receive Units (WTRUs) A, B, C, D, E, F, a base station gNB 121, a V2X server 124, and Road Side Units (RSUs) 123a and 123b. In practice, the concepts presented herein may be applied to any number of WTRUs, base station gNBs, V2X networks, or other network elements. One or several or all WTRUs A, B, C, D, E, and F may be out of range of the access network coverage 131. WTRUs A, B, and C form a V2X group, among which WTRU A is the group lead and WTRUs B and C are group members.

WTRUs A, B, C, D, E, and F may communicate with each other over a Uu interface 129 via the gNB 121 if they are within the access network coverage 131. In the example of FIG. 35E, WTRUs B and F are shown within access network coverage 131. WTRUs A, B, C, D, E, and F may communicate with each other directly via a Sidelink interface (e.g., PC5 or NR PC5) such as interface 125a, 125b, or 128, whether they are under the access network coverage 131 or out of the access network coverage 131. For instance, in the example of FIG. 35E, WRTU D, which is outside of the access network coverage 131, communicates with WTRU F, which is inside the coverage 131.

WTRUs A, B, C, D, E, and F may communicate with RSU 123a or 123b via a Vehicle-to-Network (V2N) 133 or Sidelink interface 125b. WTRUs A, B, C, D, E, and F may communicate to a V2X Server 124 via a Vehicle-to-Infrastructure (V2I) interface 127. WTRUs A, B, C, D, E, and F may communicate to another UE via a Vehicle-to-Person (V2P) interface 128.

Figure 35F:
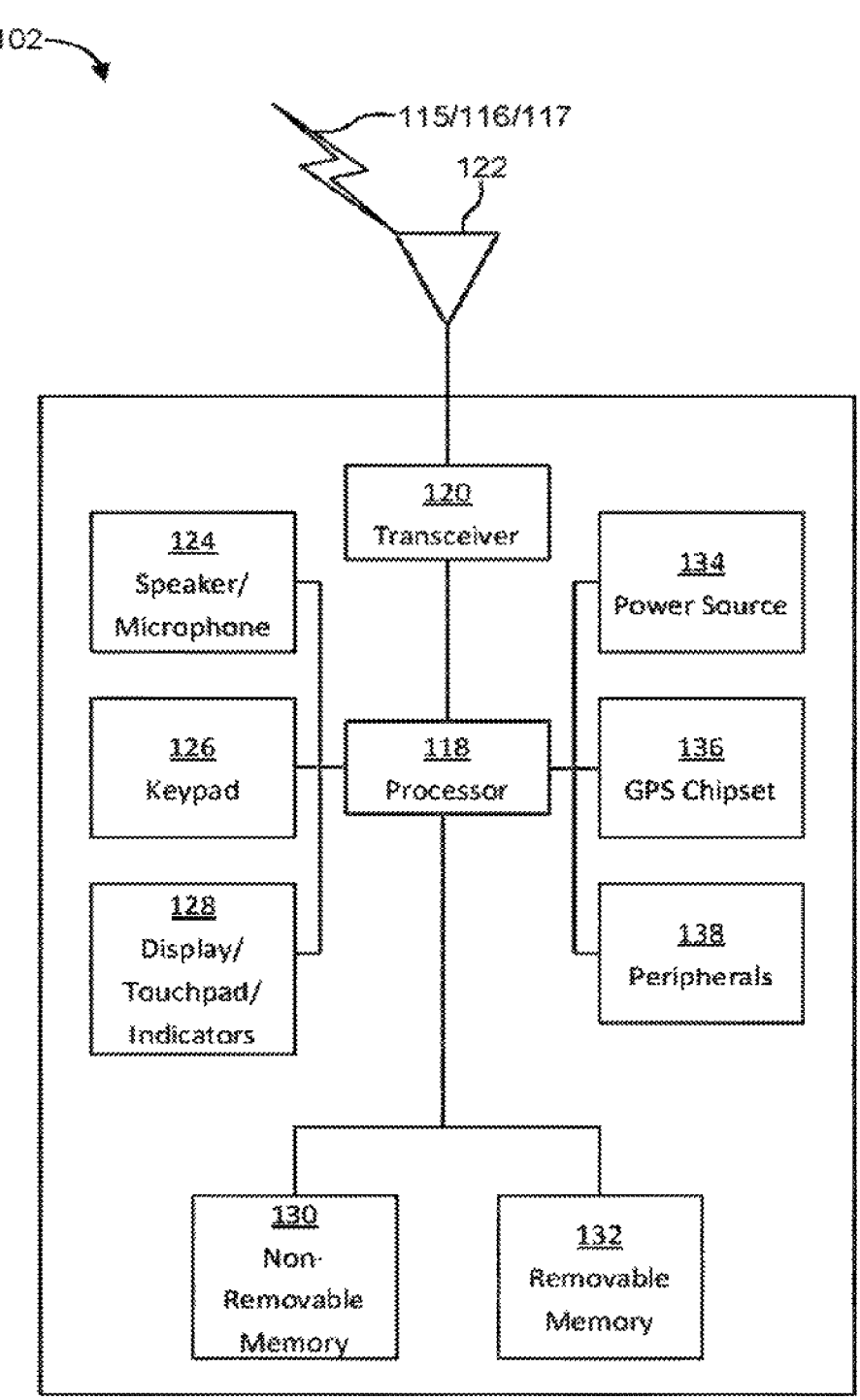
FIG. 35F is a block diagram of an example apparatus or device, such as a WTRU.

FIG. 35F is a block diagram of an example apparatus or device WTRU 102 that may be configured for wireless communications and operations in accordance with the systems, methods, and apparatuses that implement path switching or NCIS, among other things, described herein, such as a WTRU 102 of FIG. 35A, FIG. 35B, FIG. 35C, FIG. 35D, or FIG. 35E, or FIG. 21, FIG. 22, FIG. 23, FIG. 24, FIG. 25, FIG. 26, FIG. 27, FIG. 28A—FIG. 28B, FIG. 29, FIG. 30, FIG. 31, or FIG. 32, among others (e.g., switching UE 201 or UE 301). As shown in FIG. 35F, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements. Also, the base stations 114a and 114b, or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, a next generation node-B (gNode-B), and proxy nodes, among others, may include some or all of the elements depicted in FIG. 35F and may be an exemplary implementation that performs the disclosed systems and methods for path switching or NCIS, among other things described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, or any other functionality that enables the WTRU 102 to operate in a wireless environment. The processor 118 may be coupled to the transceiver 120, which may be coupled to the transmit/receive element 122. While FIG. 35F depicts the processor 118 and the transceiver 120 as separate components, it will be appreciated that the processor 118 and the transceiver 120 may be integrated together in an electronic package or chip.

The transmit/receive element 122 of a UE may be configured to transmit signals to, or receive signals from, a base station (e.g., the base station 114a of FIG. 35A) over the air interface 115/116/117 or another UE over the air interface 115d/116d/117d. For example, the transmit/receive element 122 may be an antenna configured to transmit or receive RF signals. The transmit/receive element 122 may be an emitter/detector configured to transmit or receive IR, UV, or visible light signals, for example. The transmit/receive element 122 may be configured to transmit and receive both RF and light signals. It will be appreciated that the transmit/receive element 122 may be configured to transmit or receive any combination of wireless or wired signals.

In addition, although the transmit/receive element 122 is depicted in FIG. 35F as a single element, the WTRU 102 may include any number of transmit/receive elements 122. More specifically, the WTRU 102 may employ MIMO technology. Thus, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, for example NR and IEEE 802.11 or NR and E-UTRA, or to communicate with the same RAT via multiple beams to different RRHs, TRPs, RSUs, or nodes.

The processor 118 of the WTRU 102 may be coupled to, and may receive user input data from, the speaker/microphone 124, the keypad 126, or the display/touchpad/indicators 128 (e.g., a liquid crystal display (LCD) display unit or organic light-emitting diode (OLED) display unit. The processor 118 may also output user data to the speaker/microphone 124, the keypad 126, or the display/touchpad/indicators 128. In addition, the processor 118 may access information from, and store data in, any type of suitable memory, such as the non-removable memory 130 or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. The processor 118 may access information from, and store data in, memory that is not physically located on the WTRU 102, such as on a server that is hosted in the cloud or in an edge computing platform or in a home computer (not shown). The processor 118 may be configured to control lighting patterns, images, or colors on the display or indicators 128 in response to whether the setup of the path switching or NCIS, among other things, in some of the examples described herein are successful or unsuccessful, or otherwise indicate a status of path switching or NCIS, among other things, and associated components. The control lighting patterns, images, or colors on the display or indicators 128 may be reflective of the status of any of the method flows or components in the FIGS. illustrated or disclosed herein (e.g., FIG. 21, FIG. 22, FIG. 23, FIG. 24, FIG. 25, FIG. 26, FIG. 27, FIG. 28A-FIG. 28B, FIG. 29, FIG. 30, FIG. 31, or FIG. 32, etc.). Disclosed herein are messages and procedures of path switching or NCIS, among other things. The messages and procedures may be extended to provide interface/API for users to request resources via an input source (e.g., speaker/microphone 124, keypad 126, or display/touchpad/indicators 128) and request, configure, or query path switching or NCIS related information, among other things that may be displayed on display 128.

The processor 118 may receive power from the power source 134 and may be configured to distribute or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) or determine its location based on the timing of the signals being received from two or more nearby base stations. It will be appreciated that the WTRU 102 may acquire location information by way of any suitable location-determination method.

The processor 118 may further be coupled to other peripherals 138, which may include one or more software or hardware modules that provide additional features, functionality, or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be included in other apparatuses or devices, such as a sensor, consumer electronics, a wearable device such as a smart watch or smart clothing, a medical or eHealth device, a robot, industrial equipment, a drone, a vehicle such as a car, truck, train, or an airplane. The WTRU 102 may connect with other components, modules, or systems of such apparatuses or devices via one or more interconnect interfaces, such as an interconnect interface that may comprise one of the peripherals 138.

Figure 35G:
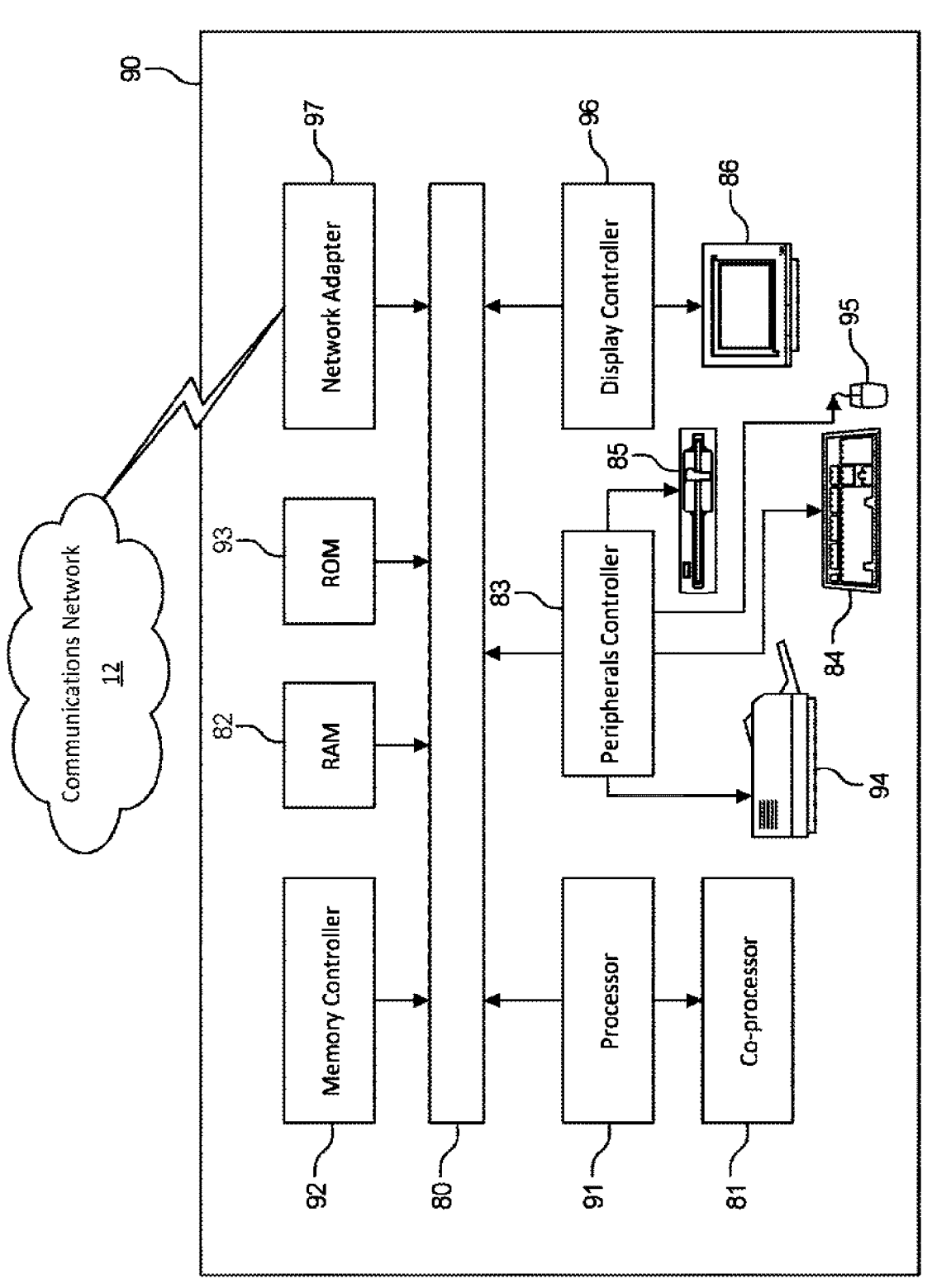
FIG. 35G is a block diagram of an exemplary computing system.

FIG. 35G is a block diagram of an exemplary computing system 90 in which one or more apparatuses of the communications networks illustrated in FIG. 35A, FIG. 35C, FIG. 35D and FIG. 35E as well as path switching or NCIS, among other things, such as the systems and methods illustrated in FIG. 21, FIG. 22, FIG. 23, FIG. 24, FIG. 25, FIG. 26, FIG. 27, FIG. 29, FIG. 30, FIG. 31, or FIG. 32 described and claimed herein may be embodied, such as certain nodes or functional entities in the RAN 103/104/105, Core Network 106/107/109, PSTN 108, Internet 110, Other Networks 112, or Network Services 113. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, or any other functionality that enables the computing system 90 to operate in a communications network. Coprocessor 81 is an optional processor, distinct from main processor 91, that may perform additional functions or assist processor 91. Processor 91 or coprocessor 81 may receive, generate, and process data related to the methods and apparatuses disclosed herein for path switching or NCIS, among other things, such as receiving an indication of a session modification request.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally include stored data that cannot easily be modified. Data stored in RAM 82 may be read or changed by processor 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may include peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may include communication circuitry, such as for example a wireless or wired network adapter 97, that may be used to connect computing system 90 to an external communications network or devices, such as the RAN 103/104/105, Core Network 106/107/109, PSTN 108, Internet 110, WTRUs 102, or Other Networks 112 of FIG. 35A, FIG. 35B, FIG. 35C, FIG. 35D, or FIG. 35E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform or implement the systems, methods and processes described herein. Specifically, any of the steps, operations, or functions described herein may be implemented in the form of such computer executable instructions, executing on the processor of an apparatus or computing system configured for wireless or wired network communications. Computer readable storage media includes volatile and nonvolatile, removable and non-removable media implemented in any non-transitory (e.g., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

In describing preferred methods, systems, or apparatuses of the subject matter of the present disclosure—path switching or NCIS, among other things—as illustrated in the Figures, specific terminology is employed for the sake of clarity. The claimed subject matter, however, is not intended to be limited to the specific terminology so selected.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples for the disclosed subject matter, including the best mode, and also to enable any person skilled in the art to practice the disclosed subject matter, including making and using any devices or systems and performing any incorporated methods. The disclosed subject matter may include other examples that occur to those skilled in the art (e.g., skipping steps, combining steps, or adding steps between exemplary methods disclosed herein). For example, step 241 of FIG. 22 may not be shown as executed or some of step 233—step 239 may be removed (e.g., step 236 or step 237).

Methods, systems, and apparatuses, among other things, as described herein may provide for means for path switching or NCIS, among other things. A method, system, computer readable storage medium, or apparatus has means to determine to switch from a direct connection to a network (e.g., core network) to an indirect connection to the network; select an appropriate relay UE based on configuration or discovery results; send a request message to the network that may indicate the intention of the apparatus to switch from the direct connection to the indirect connection to the network; receive a response message from the network indicating the switching may be authorized; or establish a connection with a relay user equipment for the indirect connection to the network. The message may be a Non-Access Stratum (NAS) message. The message may be sent to an Access and Mobility Management Function (AMF). The request message may include switching user equipment information, network slice information, relay user equipment information, Packet Data Unit (PDU) session information, or user equipment policy information. A method, system, computer readable storage medium, or apparatus may determine a relay user equipment for the indirect connection to the network. The determining to switch from the direct connection to the network to the indirect connection to the network ma include determining at least one of to move out of the network coverage or to save power. The determining to switch from the direct connection to the network to the indirect connection to the network may include receiving a message from the network. A method, system, computer readable storage medium, or apparatus has means to determine to switch from one of a direct connection to a network or an indirect connection to the network to the other of the direct connection to the network or the indirect connection to the network; select an appropriate relay UE based on discovery results or configuration; send a message that may indicate the intention of the apparatus to switch from one of the direct connection to the network or the indirect connection to the network to the other of the direct connection to the network or the indirect connection to the network; receive a response message associated with the switch from one of the direct connection to the network or the indirect connection to the network to the other of the direct connection to the network or the indirect connection to the network; or establish a connection with a device for the direct connection to the network or the indirect connection to the network. All combinations in this paragraph (including the removal or addition of steps) and the following paragraph(s) are contemplated in a manner that is consistent with the other portions of the detailed description.

Methods, systems, and apparatuses, among other things, as described herein may provide for means for path switching or NCIS, among other things. A method, system, computer readable storage medium, or apparatus has means for receiving a message from a policy control function (PCF); based on the message from the PCF, determining that the user equipment may be a member of a services group; and determining a reporting process for activity within the services group; and communicating charging reports based on the reporting process. A method, system, computer readable storage medium receiving a message from a policy control function (PCF), based on the message from the PCF, determining that the user equipment may be a member of a services group; based on the user equipment being a member of the services group, determining a reporting process for activity within the services group; and communicating charging reports based on the reporting process. The message may include contact information for an account data forwarding function, and wherein the communicating of the charging reports may be to the account data forwarding function. The reporting process may indicate that charging reports may be sent to an account data forwarding function. The charging reports may be for activity with regards to switching from an indirect path (a PC5 interface). There may be tracking of the receiving of first information or sending of second information over a PC5 interface; and based on the reporting process, sending third information to the account data forwarding function. The charging reports may be communicated using PC3ch. All combinations in this paragraph (including the removal or addition of steps) and the following paragraph(s) are contemplated in a manner that is consistent with the other portions of the detailed description.

A method, system, computer readable storage medium, or apparatus has means for receiving a message from a policy control function (PCF), wherein the message may include a path selection policy for direct communication with one or more user equipment, wherein the path selection policy may be based on configuration information from an application function or other network functions; selecting a path for communicating with other user equipment based on the path selection policy; and communicating with the one or more user equipment through the selected path. A method, system, computer readable storage medium, or apparatus has means for receiving a message from a policy control function (PCF), wherein the message may include a path selection policy for direct communication with one or more user equipment, wherein the path selection policy may be based on configuration information from an application function; and communicating with the one or more user equipment based on the path selection policy. The method, system, computer readable storage medium, or apparatus has means for using an application descriptor to determine an application the path selection policy applies to. The method, system, computer readable storage medium, or apparatus has means for using an application descriptor to determine an application the path selection policy applies to, wherein the application descriptor may be an application identifier, among other things. The path selection policy may include radio quality criteria, wherein the radio quality criteria may include a threshold radio measurement for determining communication via a PC5 path or a 5GC path. The path selection policy may include location information indicating where the policy applies to, wherein the location information could be the tracking/registration may be or the geographic area information. All combinations in this paragraph (including the removal or addition of steps) and the following paragraph(s) are contemplated in a manner that is consistent with the other portions of the detailed description.

The path selection policy may include communication mode indicating which path should be selected for a communication mode, wherein the communication mode may be cast type, e.g., unicast, multicast or broadcast. The path selection policy may include a time window indicating during which time period the policy may be valid. The path selection policy may include one or more DNNs, network slices, or combination of both, indicating the data networks, network slices or combination of both that the policy can be applied to. Selection of a new path may trigger the path switch procedure that switch the path from a 5GC path to a PC5 path, or vice versa. The message receiving from PCF may include the contact information for an account data forwarding function, configuration on how to report PC5 communication to network, wherein the method on how the UE can send PC5 charging report through control plane path (NAS) or user plane path to the account data forwarding function. The message receiving from PCF further may include what information or parameters UE needs to report, wherein the parameters include the role of the UE (e.g., it may be remote UE or relay UE). The method, system, computer readable storage medium, or apparatus has means for switching to PC5 path to communicate with other UE may trigger PC5 charging report that the UE sends to the account data forwarding function. The method, system, computer readable storage medium, or apparatus has means for receiving a message from a policy control function (PCF), wherein the message comprises a path selection policy for selecting communication path with other user equipment, wherein the path selection policy is based on configuration information from an application function and other network functions; selecting a path for communicating with other user equipment based on the path selection policy; and communicating with the other user equipment through the selected path. All combinations in this paragraph (including the removal or addition of steps) are contemplated in a manner that is consistent with the other portions of the detailed description.

What is claimed is:

1. A first wireless transmit/receive unit (WTRU) comprising:

a processor and a memory, the processor and memory configured to:

receive a message from a policy control function (PCF), wherein the message comprises a network controlled interactive services (NCIS) policy for selecting a communication path with one or more other WTRUs, wherein the first WTRU is part of a NCIS group, the NCIS policy comprises an accounting data forwarding (ADF) function contact information associated with a corresponding NCIS service and comprises a transmission identifier, wherein the NCIS policy comprises an indication of whether online charging, offline charging, both online and offline charging, or neither are enabled for the NCIS group;

select a path for communicating with the one or more other WTRUs based on the NCIS policy;

communicate with the one or more other WTRUs through the selected path; and send a charging report to the ADF function among one or more ADFs and identified by the ADF function contact information, wherein the charging report comprises the indication of whether online charging, offline charging, or both is enabled, and the transmission identifier, wherein the transmission identifier indicates that the first WTRU communicated with the one or more other WTRUs.

2. The WTRU of claim 1, an application descriptor to determine an application the NCIS policy applies to, wherein the application descriptor is an application identifier.

3. The WTRU claim 1, wherein the NCIS policy further comprises radio quality criteria, wherein the radio quality criteria comprises a threshold radio measurement for determining communication via a PC5 path or a 5GC path.

4. The WTRU of claim 1, wherein the NCIS policy further comprises location information indicating an area the path selection policy applies to, wherein the location information comprises tracking/registration area information or geographic area information.

5. The WTRU of claim 1, wherein the NCIS policy further comprises communication mode information indicating which path to select for a communication mode, wherein the communication mode information comprises a cast type.

6. The WTRU of claim 1, wherein the NCIS policy further comprises a time period the path selection policy is valid.

7. The WTRU of claim 1, wherein the NCIS policy further comprises data network name (DNN) information or network slice information associated with a data network or a network slice in which the NCIS policy applies.

8. The WTRU of claim 1, wherein the processor is further configured to:

determine the occurrence of a triggering event;

switch from the old path to the selected path based on the determination that the triggering event occurred, wherein the switch from the old path to the selected path comprises:

a switch from a 5GC path to a PC5 path, or a switch from the PC5 path to the 5GC path.

9. The WTRU of claim 1, wherein the processor and memory are further configured to: send the charging report to the ADF based on switching from a 5GC path to a PC5 path.

10. The WTRU of claim 1, wherein the ADF contact information comprises information associated with:

reporting PC5 communication to a network device; and sending a PC5 charging report through a control plane path (NAS) to the ADF, or sending a PC5 charging report through a user plane path to the ADF.

11. A method implemented by a first wireless transmit/receive unit (WTRU), the method comprising:

receiving a first message from a policy control function (PCF), wherein the message comprises a network controlled interactive services (NCIS) policy for selecting a communication path with one or more other WTRUs, wherein the first WTRU is part of a NCIS group the NCIS policy comprises an accounting data forwarding (ADF) function contact information associated with a corresponding NCIS service and comprises a transmission identifier, wherein the NICS policy comprises an indication of whether online charging, offline charging, both online and offline charging, or neither are enabled for the NCIS group;

selecting a path for communicating with the one or more other WTRUs based on the NCIS policy;

communicating with the one or more other WTRUs through the selected path; and sending a charging report to the ADF function among one or more ADFs and identified by the ADF function contact information, wherein the charging report comprises the indication of whether online charging, offline charging, or both is enabled, and the transmission identifier, wherein the transmission identifier indicates that the first WTRU communicated with the one or more other WTRUs.

12. The method of claim 11, wherein the NCIS policy further uses an application descriptor to determine an application the NCIS policy applies to, wherein the application descriptor is an application identifier.

13. The method of claim 11, wherein the path selection policy further comprises radio quality criteria, wherein the radio quality criteria comprises a threshold radio measurement for determining communication via a PC5 path or a 5GC path.

14. The method of claim 11, wherein the NCIS policy further comprises location information indicating an area the path selection policy applies to, wherein the location information comprises tracking/registration area information or geographic area information.

15. The method of claim 11, wherein the NCIS policy further comprises communication mode information indicating which path to select for a communication mode, wherein the communication mode information comprises a cast type.

16. The method of claim 11, wherein the NCIS policy further comprises a time period the path selection policy is valid.

17. The method of claim 11, wherein the NCIS policy further comprises data network name (DNN) information or network slice information associated with a data network or a network slice in which the NCIS policy applies.

18. A computer-readable storage medium storing computer executable instructions implemented in a non-transitory computer readable medium that when executed by a computing device are configured to cause said computing device to:

receive a message from a policy control function (PCF), wherein the message comprises a network controlled interactive services (NCIS) policy for direct communication path with one or more other WTRUs, wherein the first WTRU is part of a NCIS group, the NCIS policy comprises an accounting data forwarding (ADF) function contact information associated with a corresponding NCIS service and comprises a transmission identifier wherein the NCIS policy comprises an indication of whether online charging, offline charging, both online and offline charging, or neither are enabled for the NCIS group:

select a path for communicating with other user equipment based on the NCIS policy;

communicate with the one or more other WTRUs through the selected path; and send a charging report to the ADF function among one or more ADFs and identified by the ADF function contact information, wherein the charging report comprises the indication of whether online charging, offline charging, or both is enabled, and the transmission identifier, wherein the transmission identifier indicates that the first WTRU communicated with the one or more other WTRUs.

19. The computer-readable storage medium of claim 18, wherein the NCIS policy further comprises an application descriptor to determine an application the NCIS policy applies to, wherein the application descriptor is an application identifier.

\* \* \* \* \*